United States Patent
Takeda et al.

(10) Patent No.: US 7,626,608 B2
(45) Date of Patent: Dec. 1, 2009

(54) OBJECT DETECTING APPARATUS AND METHOD, PROGRAM AND RECORDING MEDIUM USED THEREWITH, MONITORING SYSTEM AND METHOD, INFORMATION PROCESSING APPARATUS AND METHOD, AND RECORDING MEDIUM AND PROGRAM USED THEREWITH

(75) Inventors: Naoki Takeda, Tokyo (JP); Tetsujiro Kondo, Tokyo (JP); Yasuhiro Fujimori, Kanagawa (JP); Naoki Kobayashi, Tokyo (JP); Yoshinori Watanabe, Kanagawa (JP); Tsuyoshi Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 937 days.

(21) Appl. No.: 10/885,637

(22) Filed: Jul. 8, 2004

(65) Prior Publication Data
US 2005/0073580 A1    Apr. 7, 2005

(30) Foreign Application Priority Data
Jul. 10, 2003   (JP) ............................. 2003-272656
Jul. 16, 2003   (JP) ............................. 2003-275457

(51) Int. Cl.
*H04N 7/18*    (2006.01)
*G08B 13/00*   (2006.01)

(52) U.S. Cl. ..................... 348/143; 340/541
(58) Field of Classification Search ................ 348/155, 348/170, 150, 169, 143, 142, 144, 145, 146, 348/147, 149, 151, 152, 153, 154, 156, 157, 348/158, 159, 160, 161, 162, 163, 164, 165, 348/166, 167; 342/27, 28, 127, 109, 113, 342/114, 99, 100; 340/541, 552, 554
See application file for complete search history.

(56) References Cited

U.S. PATENT DOCUMENTS

| | | | | |
|---|---|---|---|---|
| 3,845,461 | A * | 10/1974 | Foreman | 367/94 |
| 5,465,115 | A * | 11/1995 | Conrad et al. | 348/155 |
| 6,351,234 | B1 * | 2/2002 | Choy | 342/53 |
| 6,677,887 | B2 * | 1/2004 | Harman | 342/28 |
| 6,697,104 | B1 * | 2/2004 | Yakobi et al. | 348/143 |
| 6,720,874 | B2 * | 4/2004 | Fufido et al. | 340/541 |
| 7,079,030 | B2 * | 7/2006 | Tsuji | 340/552 |
| 7,400,344 | B2 * | 7/2008 | Ito et al. | 348/169 |
| 2003/0179127 | A1 * | 9/2003 | Wienand | 342/28 |

(Continued)

FOREIGN PATENT DOCUMENTS

JP        56-105592       8/1981

(Continued)

OTHER PUBLICATIONS

U.S. Appl. No. 11/847,642, filed Aug. 30, 2007, Kondo, et al.

*Primary Examiner*—Behrooz Senfi
(74) *Attorney, Agent, or Firm*—Oblon, Spivak, McClelland, Maier & Neustadt, L.L.P.

(57) ABSTRACT

An object detecting apparatus and method accurately detect an event while reducing power consumption. A photosensor is used to detect an object entering a monitoring region, and a microwave sensor is used to detect the object, which enters another monitoring region. State data representing the state of the object is generated based on detection information obtained by both sensors.

8 Claims, 71 Drawing Sheets

U.S. PATENT DOCUMENTS

2004/0193323 A1 * 9/2004 Higaki et al. ............... 700/259

FOREIGN PATENT DOCUMENTS

| JP | 2-58893 | 4/1990 |
| --- | --- | --- |
| JP | 5-21570 | 3/1993 |
| JP | 8-126002 | 5/1996 |
| JP | 8-317374 | 11/1996 |
| JP | 9-297057 | 11/1997 |
| JP | 10-20026 | 1/1998 |
| JP | 2001-167365 | 6/2001 |
| JP | 2002-27435 | 1/2002 |
| JP | 2002-245571 | 8/2002 |

* cited by examiner

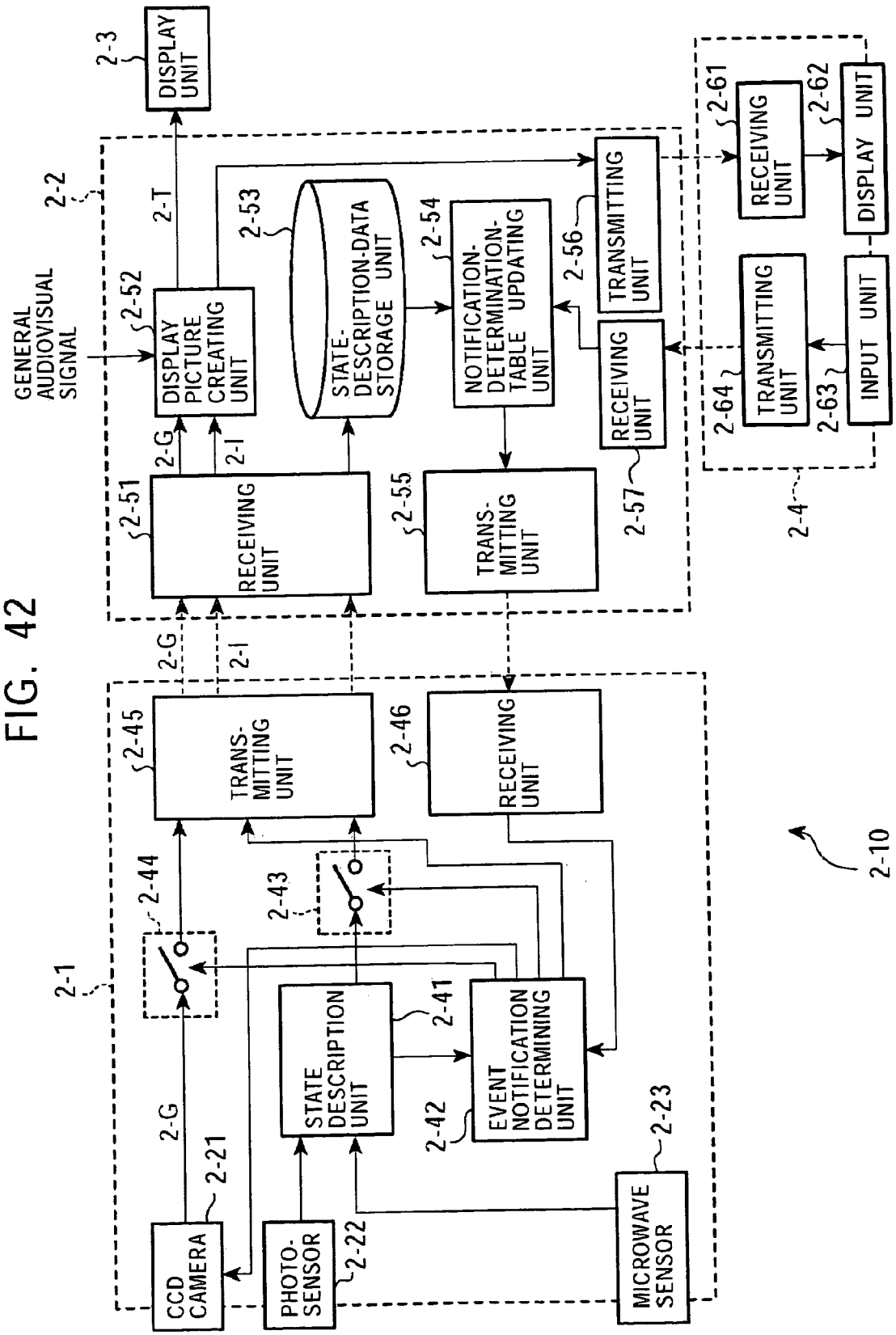

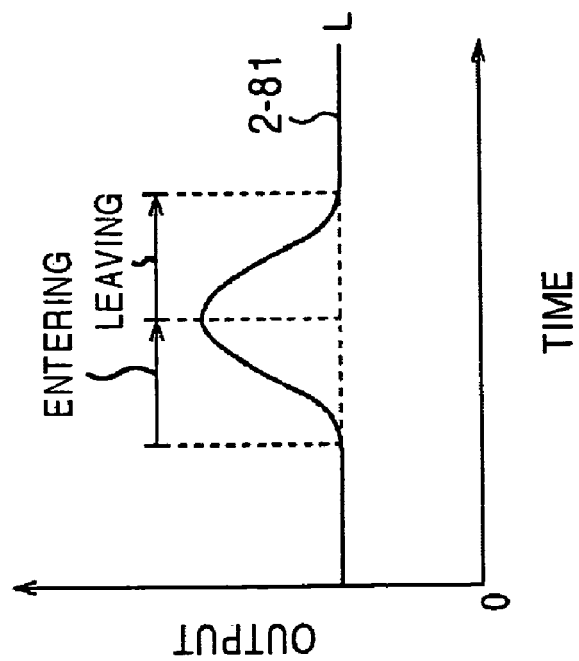
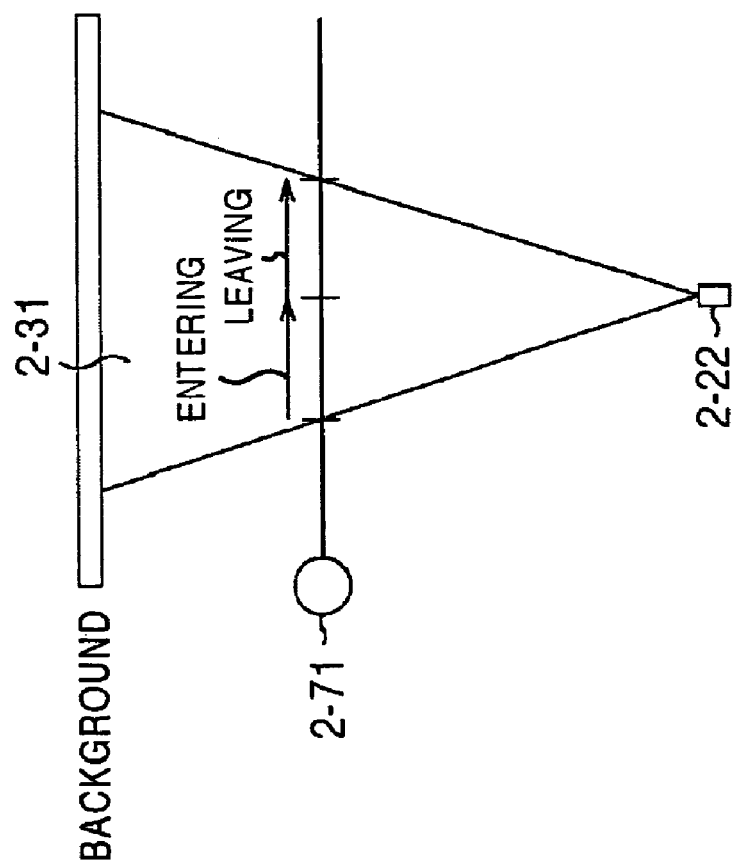

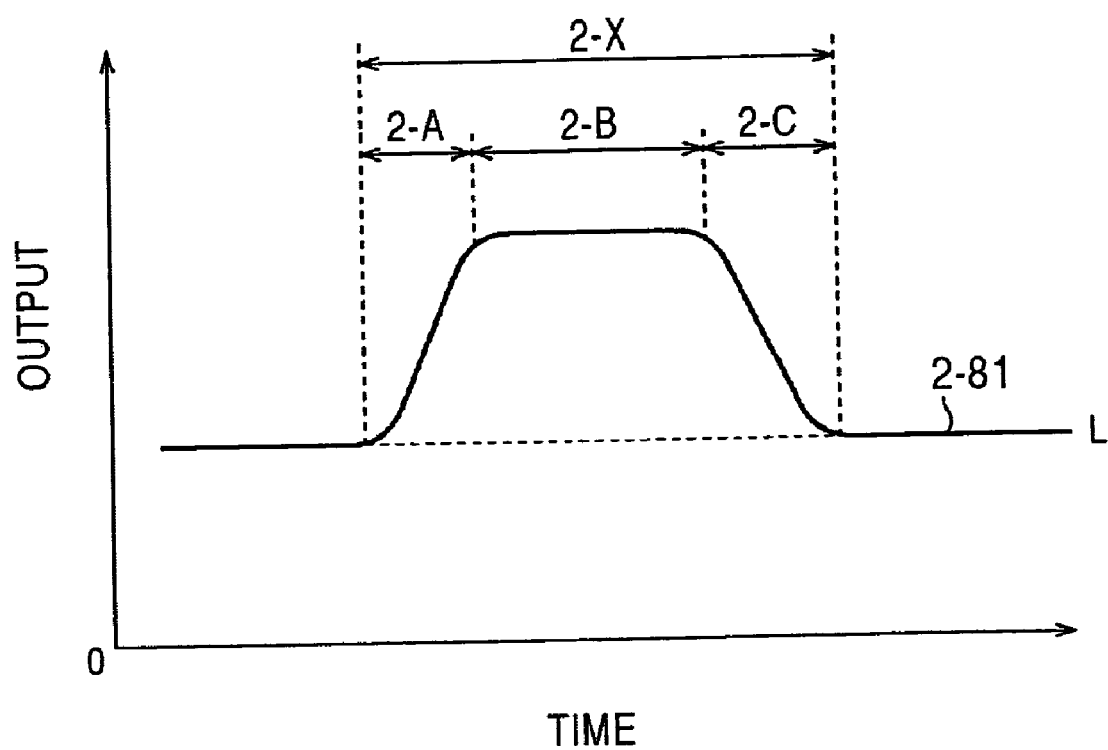

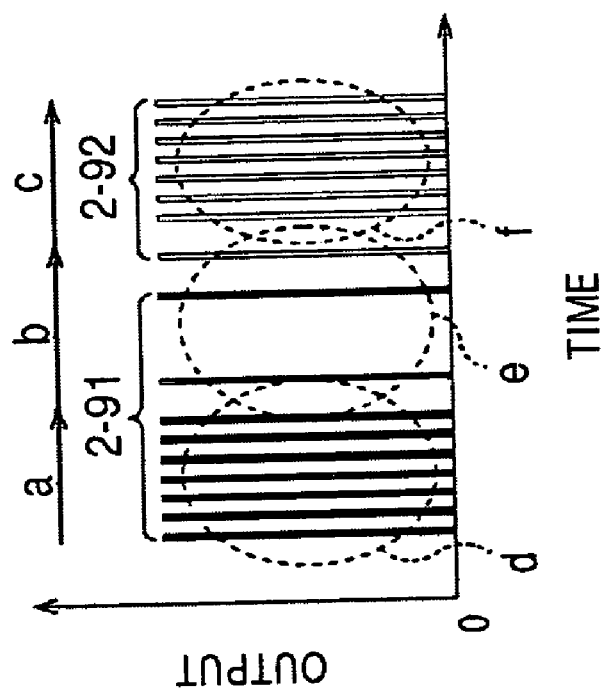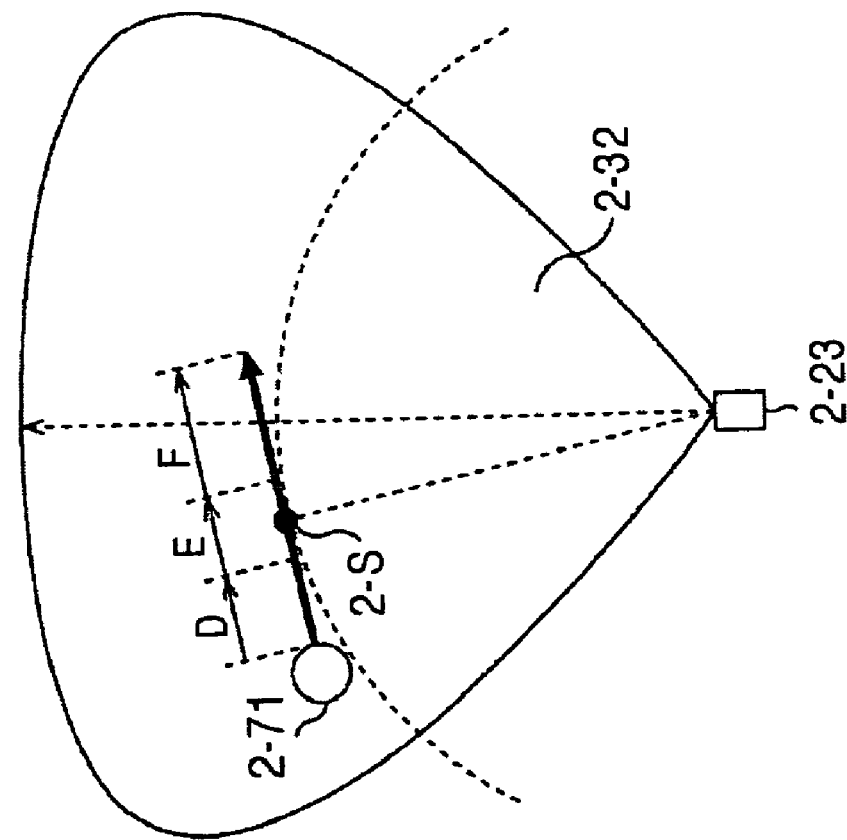

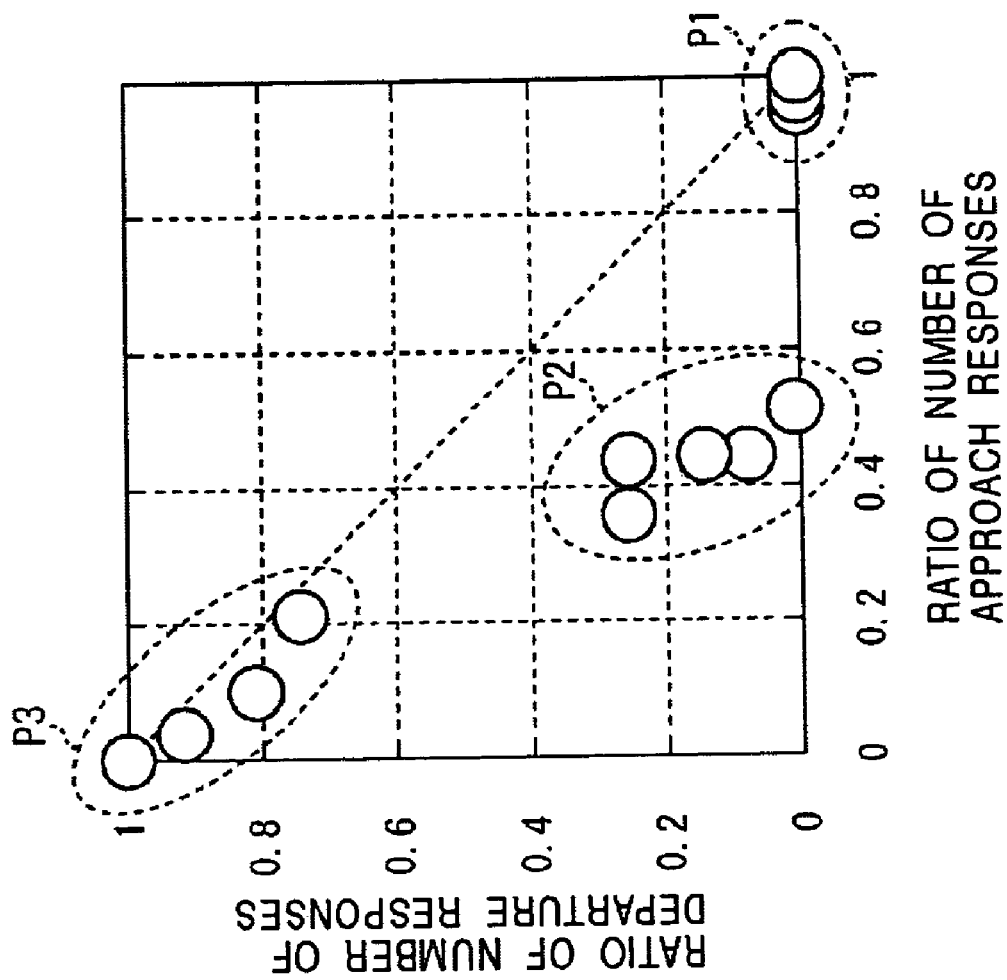
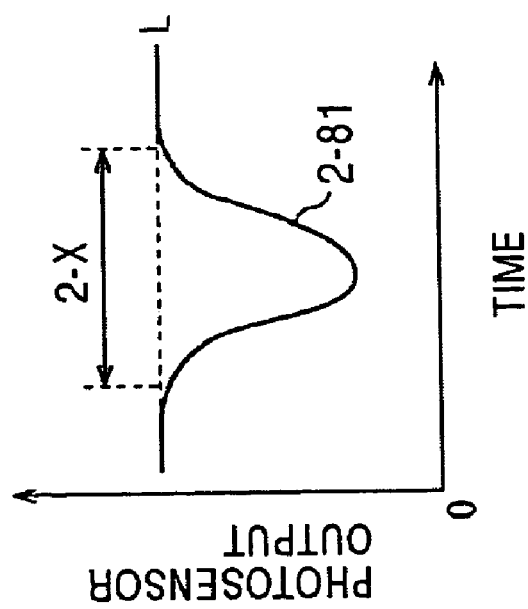
FIG. 53B
FIG. 53A

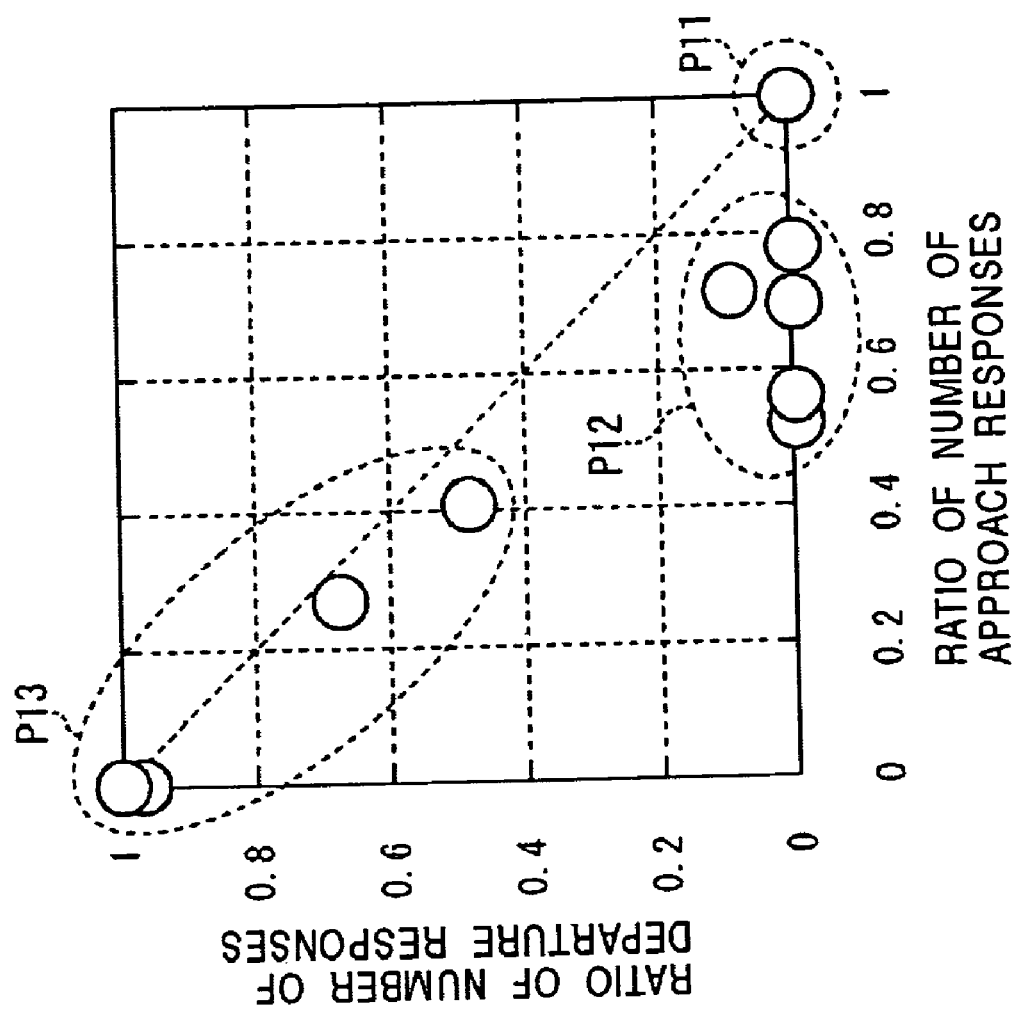
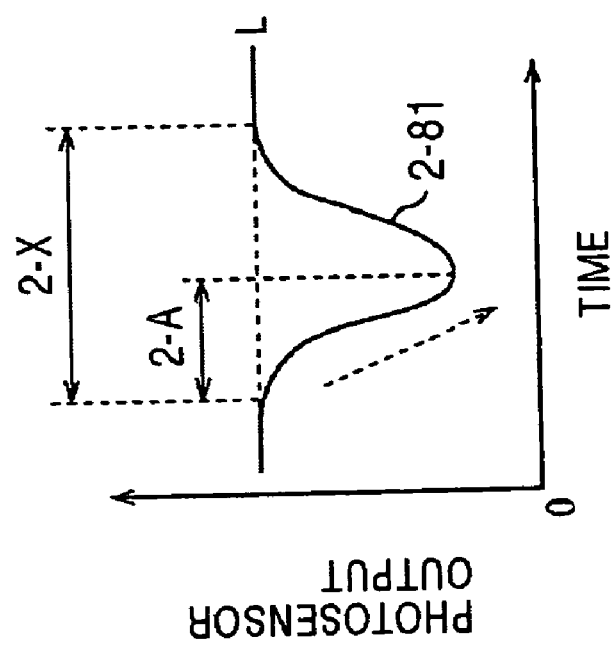

FIG. 72

| | | POSITION OF PHOTOSENSOR IN RESPONDING STATE | | |
|---|---|---|---|---|
| | | LEFT | CENTER | RIGHT |
| DIRECTION IN WHICH PHOTOSENSOR RESPONDS | DEPARTING FROM REFERENCE VALUE | LA | CA | RA |
| | NO CHANGE | LB | CB | RB |
| | CLOSE TO REFERENCE VALUE | LC | CC | RC |

OBJECT DETECTING APPARATUS AND METHOD, PROGRAM AND RECORDING MEDIUM USED THEREWITH, MONITORING SYSTEM AND METHOD, INFORMATION PROCESSING APPARATUS AND METHOD, AND RECORDING MEDIUM AND PROGRAM USED THEREWITH

BACKGROUND OF THE INVENTION

1. Field of the Invention

The present invention relates to object detecting apparatuses and methods, and to programs and recording media used therewith, and in particular, to an object detecting apparatus and method for accurately detecting an event while suppressing power consumption, and to a program and recording medium used therewith. The present invention also relates to monitoring systems and methods, to information processing apparatuses and methods, and to recording media and programs used therewith, and in particular, to a monitoring system and method, and to an information processing apparatus and method for identifying human actions and sending notification, and a recording medium and program used therewith.

2. Description of the Related Art

Conventionally, for home security systems, a technique in which sensor information can be grasped by viewing a video monitor displaying monitor pictures transmitted from an image capturing device has been proposed (for example, Japanese Unexamined Patent Application Publication No. 8-124078).

In addition, a method in which the accuracy of monitoring of an intruder is increased by using a monitoring device composed of a microwave sensor and an image sensor in combination has been proposed (for example, Japanese Unexamined Patent Application Publication No. 11-161860).

Also, a technique (for example, Japanese Unexamined Patent Application Publication No. 2000-339554) has been proposed in which a human body entering a monitoring region is detected such that the presence of the human body and detection of an action are determined by a monitoring device composed of an infrared sensor and an image sensor in combination.

Moreover, a technique in which an abnormality in a monitoring region is detected by a monitoring camera system having a plurality of intelligent cameras and in which detected video and sound are recorded or played back has been proposed (for example, Japanese Unexamined Patent Application Publication No. 7-212748).

In the inventions disclosed in the above three Japanese Unexamined Patent Application Publications, only a particular abnormality (event) is detected.

In the invention as disclosed in Japanese Unexamined Patent Application Publication No. 8-124078, the image capturing device has a problem in that its battery only has a short life since it is continuously battery-driven to constantly transmit pictures and sound, etc.

The technology as disclosed in Japanese Unexamined Patent Application Publication No. 11-161860 has a problem in that it is impossible to accurately detect information such as the direction along which the intruder is moving and whether the intruder is approaching or going away.

In each invention disclosed in Japanese Unexamined Patent Application Publication Nos. 8-124078, 2000-339554, and 7-212748, a human body entering the monitoring region can be detected, but there is a problem in that the action (for example, whether the person is approaching or going away) by the human body cannot be identified.

As is clear, for example, by using a video camera to perform constant monitoring, the action can be identified. However, this technique causes large power consumption, so that it is difficult to apply this technique to battery-driven systems.

SUMMARY OF THE INVENTION

The present invention has been made in view of the above-described circumstances. It is an object of the present invention to enable accurate detection of an event while reducing power consumption.

In addition, it is another object of the present invention to enable identification of an action performed by a person entering a monitoring region and notification concerning the identified action.

According to an aspect of the present invention, an object detecting apparatus is provided which includes at least one first sensor which detects an object and which outputs a detection signal representing the presence of the object, a second sensor which performs object detection and which outputs a discrimination signal representing approach or departure of the object, an acquiring unit which acquires information concerning the object, and a control unit which, based on the detection signal output from at least the one first sensor and the discrimination signal output from the second sensor, generates state data representing the state of the object, and which, based on the state data, controls driving of the acquiring unit.

Preferably, the state data is detection information representing movement of the object.

The first sensors may output a plurality of detection signals, respectively, and the control unit may specify, based on the detection signals output from the first sensors, a direction in which the object moves, and may generate the state data by identifying, based on the discrimination signal output from the second sensor, the approach or departure of the object.

The first sensors may be photosensors, and the second sensor may be a microwave sensor.

Preferably, the object detecting apparatus further include a transmitting unit which transmits the information acquired by the acquiring unit to an information processing apparatus. Based on a user's instruction, the control unit determines whether the information acquired by the acquiring unit needs to be transmitted, and, when the control unit determines that the information acquired by the acquiring unit needs to be transmitted, the control unit controls the acquiring unit to be driven within a preset time, and when the control unit determines that the information acquired by the acquiring unit does not need to be transmitted, the control unit stops driving of the acquiring unit.

According to another aspect of the present invention, an object detecting method is provided which includes a first determination step of determining whether or not a first sensor, which detects an object and which outputs a detection signal representing the presence of the object, has responded, a second determination step of determining whether or not a second sensor, which performs object detection and which outputs a discrimination signal representing approach or departure of the object, has responded, a generating step of generating state data representing the state of the object based on the result of determination in the first determination step and the result of determination in the second determination step, and an acquiring step of acquiring information concerning the object based on the state data generated in the generating step.

According to another aspect of the present invention, a program to be executed by a computer is provided which includes a first determination step of determining whether or not a first sensor, which detects an object and which outputs a detection signal representing the presence of the object, has responded, a second determination step of determining whether or not a second sensor, which performs object detection and which outputs a discrimination signal representing approach or departure of the object, has responded, a generating step of generating state data representing the state of the object based on the result of determination in the first determination step and the result of determination in the second determination step, and an acquiring step of acquiring information concerning the object, based on the state data generated in the generating step.

According to another aspect of the present invention, a recording medium having a computer-readable program recorded thereon is provided. The program includes a first determination step of determining whether or not a first sensor, which detects an object and which outputs a detection signal representing the presence of the object, has responded, a second determination step of determining whether or not a second sensor, which performs object detection and which outputs a discrimination signal representing approach or departure of the object, has responded, a generating step of generating state data representing the state of the object based on the result of determination in the first determination step and the result of determination in the second determination step, and an acquiring step of acquiring information concerning the object, based on the state data generated in the generating step.

According to another aspect of the present invention, a monitoring system is provided which includes an acquiring unit which acquires first sensor data from a first sensor and second sensor data from a second sensor, a state-data description unit which, based on the first sensor data and second sensor data acquired by the acquiring unit, describes state data concerning response states of the first and second sensors, a determining unit which, by comparing the state data described by the state-data description unit with a determination table, determines whether or not an event is to be reported, a creating unit which, when the determining unit determines that the event is to be reported, creates display data for reporting the event which includes event data, and a display unit which displays a picture based on the display data created by the creating unit.

According to another aspect of the present invention, a monitoring method is provided which includes an acquiring step of acquiring first sensor data from a first sensor and second sensor data from a second sensor, a state-data description step of describing, based on the first sensor data and second sensor data acquired in the acquiring step, state data concerning response states of the first and second sensors, a determining step of determining, by comparing the state data described in the state-data description step with a determination table, whether or not an event is to be reported, a creating step of, when it is determined in the determining step that the event is to be reported, creating display data for reporting the event which includes event data, and a display step of displaying a picture based on the display data created in the creating step.

According to another aspect of the present invention, a recording medium having a computer-readable program recorded thereon is provided. The program includes an acquiring step of acquiring first sensor data from a first sensor and second sensor data from a second sensor, a state-data description step of describing, based on the first sensor data and second sensor data acquired in the acquiring step, state data concerning response states of the first and second sensors, a determining step of determining, by comparing the state data described in the state-data description step with a determination table, whether or not an event is to be reported, a creating step of, when it is determined in the determining step that the event is to be reported, creating display data for reporting the event which includes event data, and a display step of displaying a picture based on the display data created in the creating step.

According to another aspect of the present invention, a program to be executed by a computer is provided. The program includes an acquiring step of acquiring first sensor data from a first sensor and second sensor data from a second sensor, a state-data description step of describing, based on the first sensor data and second sensor data acquired in the acquiring step, state data concerning response states of the first and second sensors, a determining step of determining, by comparing the state data described in the state-data description step with a determination table, whether or not an event is to be reported, a creating step of, when it is determined in the determining step that the event is to be reported, creating display data for reporting the event which includes event data, and a display step of displaying a picture based on the display data created in the creating step.

According to another aspect of the present invention, an information processing apparatus is provided which includes an acquiring unit which acquires first sensor data from a first sensor and second sensor data from a second sensor data, a state-data description unit which, based on the first sensor data and second sensor data acquired by the acquiring unit, describes state data concerning response states of the first and second sensors, a determining unit which, by comparing the state data described by the state-data description unit with a determination table, determines whether or not an event is to be reported, and a transmitting unit which transmits, to a different apparatus, event data for reporting the event when the determining unit determines that the event is to be reported.

According to another aspect of the present invention, an information processing method is provided which includes an acquiring step of acquiring first sensor data from a first sensor and second sensor data from a second sensor, a state-data description step of describing, based on the first sensor data and second sensor data acquired in the acquiring step, state data concerning response states of the first and second sensors, a determining step of determining, by comparing the state data described in the state-data description step with a determination table, whether or not an event is to be reported, and a transmitting step of, when it is determined in the determining step that the event is to be reported, transmitting, to a different apparatus, event data for reporting the event.

According to another aspect of the present invention, a recording medium having a computer-readable program recorded thereon is provided. The program includes an acquiring step of acquiring first sensor data from a first sensor and second sensor data from a second sensor, a state-data description step of describing, based on the first sensor data and second sensor data acquired in the acquiring step, state data concerning response states of the first and second sensors, a determining step of determining, by comparing the state data described in the state-data description step with a determination table, whether or not an event is to be reported, and a transmitting step of, when it is determined in the determining step that the event is to be reported, transmitting, to a different apparatus, event data for reporting the event.

According to another aspect of the present invention, a program to be executed by a computer is provided. The program includes an acquiring step of acquiring first sensor data from a first sensor and second sensor data from a second sensor, a state-data description step of describing, based on the first sensor data and second sensor data acquired in the acquiring step, state data concerning response states of the first and second sensors, a determining step of determining, by comparing the state data described in the state-data description step with a determination table, whether or not an event is to be reported, and a transmitting step of, when it is determined in the determining step that the event is to be reported, transmitting, to a different apparatus, event data for reporting the event.

According to another aspect of the present invention, an information processing apparatus is provided which includes a storage unit for receiving state data concerning response states of first and second sensors which is described in a different apparatus, and storing the received state data as a determination table, and a creating unit which, when an event is reported from the different apparatus to the information processing apparatus, creates display data by inserting, in data based on a predetermined signal, event data transmitted with the event.

According to another aspect of the present invention, an information processing method is provided which includes a storage step of receiving state data concerning response states of first and second sensors which is described in a different apparatus, and storing the received state data as a determination table, and a creating step of, when an event is reported from the different apparatus, creating display data by inserting, in data based on a predetermined signal, event data transmitted with the event.

According to another aspect of the present invention, a recording medium having a computer-readable program recorded thereon is provided. The program includes a storage step of receiving state data concerning response states of first and second sensors which is described in a different apparatus, and storing the received state data as a determination table, and a creating step of, when an event is reported from the different apparatus, creating display data by inserting, in data based on a predetermined signal, event data transmitted with the event.

According to another aspect of the present invention, a program to be executed by a computer is provided. The program includes a storage step of receiving state data concerning response states of first and second sensors which is described in a different apparatus, and storing the received state data as a determination table, and a creating step of, when an event is reported from the different apparatus, creating display data by inserting, in data based on a predetermined signal, event data transmitted with the event.

BRIEF DESCRIPTION OF THE DRAWINGS

FIG. 42 is a functional block diagram showing the monitoring system shown in FIG. 39;

FIGS. 43A and 43B are a schematic illustration and graph of an example of a detection signal output by a photosensor;

FIG. 45 is a graph showing the relationship between changes in level of a detection signal output by a photosensor and actions of a person;

FIGS. 49A and 49B are a schematic illustration and graph of other examples of the detection signals output by the microwave sensor;

FIGS. 53A and 53B are graphs showing examples of characteristic values of the microwave sensor in a response interval of the photosensor;

FIGS. 54A and 54B are graphs illustrating examples of characteristic values of the microwave sensor in an interval in the response interval in which the level of a detection signal output from a photosensor departs from a reference value;

FIGS. 58A and 57B are graphs illustrating examples of detection signals output by a photosensor and a microwave sensor when a person violently steps (HA) at the same position;

FIG. 72 is a chart showing examples of response symbols described by the state description unit shown in FIG. 70.

DESCRIPTION OF THE PREFERRED EMBODIMENTS

A first embodiment of the present invention is described below with reference to the accompanying drawings.

Figure 1:
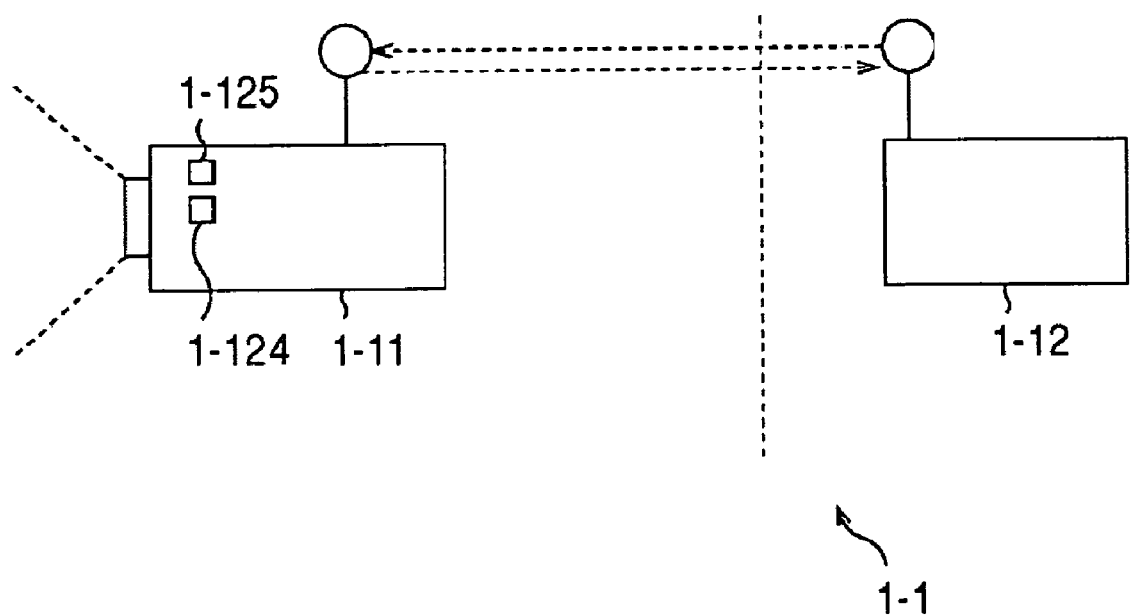
FIG. 1 is a block diagram showing an example of a security system to which the present invention is applied.

FIG. 1 shows the entire configuration of a security system 1-1 to which the present invention is applied. The security system 1-1 includes a security camera 1-11 and a receiver 1-12.

The security camera 1-11 is installed outside (for example, outside the front door of a house, a garden, etc.), and the receiver 1-12 is installed indoors (for example, a hall inside a house, a living room, etc.). The security camera 1-11 has a built-in photosensor 1-124 and microwave sensor 1-125 (described later with reference to FIG. 14), and detects an event such as movement of an object. The security camera 1-11 and the receiver 1-12 can wirelessly communicate with each other. Based on information detected by the photosensor 1-124 and the microwave sensor 1-125, the security camera 1-11 controls a built-in video camera 1-122 and microphone 1-123 (described later with reference to FIG. 14), and transmits both or one of a picture signal and an audio signal to the receiver 1-12.

The receiver 1-12 receives the picture signal, the audio signal, or the detected information transmitted from the security camera 1-11, supplies the received picture signal, audio signal, or detected information to a display unit (formed by a liquid crystal display) and speaker provided in of the receiver 1-12, and outputs the received picture signal, audio signal, or detected information from the display unit and the speaker. This enables a user, who is indoors, to know an outside situation, such as the presence of an intruder at an outside.

The receiver 1-12 communicates with apparatuses (not shown) such as television receivers, cellular phones, and personal computers, and pictures, sound, or the detected information may be displayed or output by the apparatuses (not shown) such as television receivers, cellular phones, and personal computers.

Figure 2:
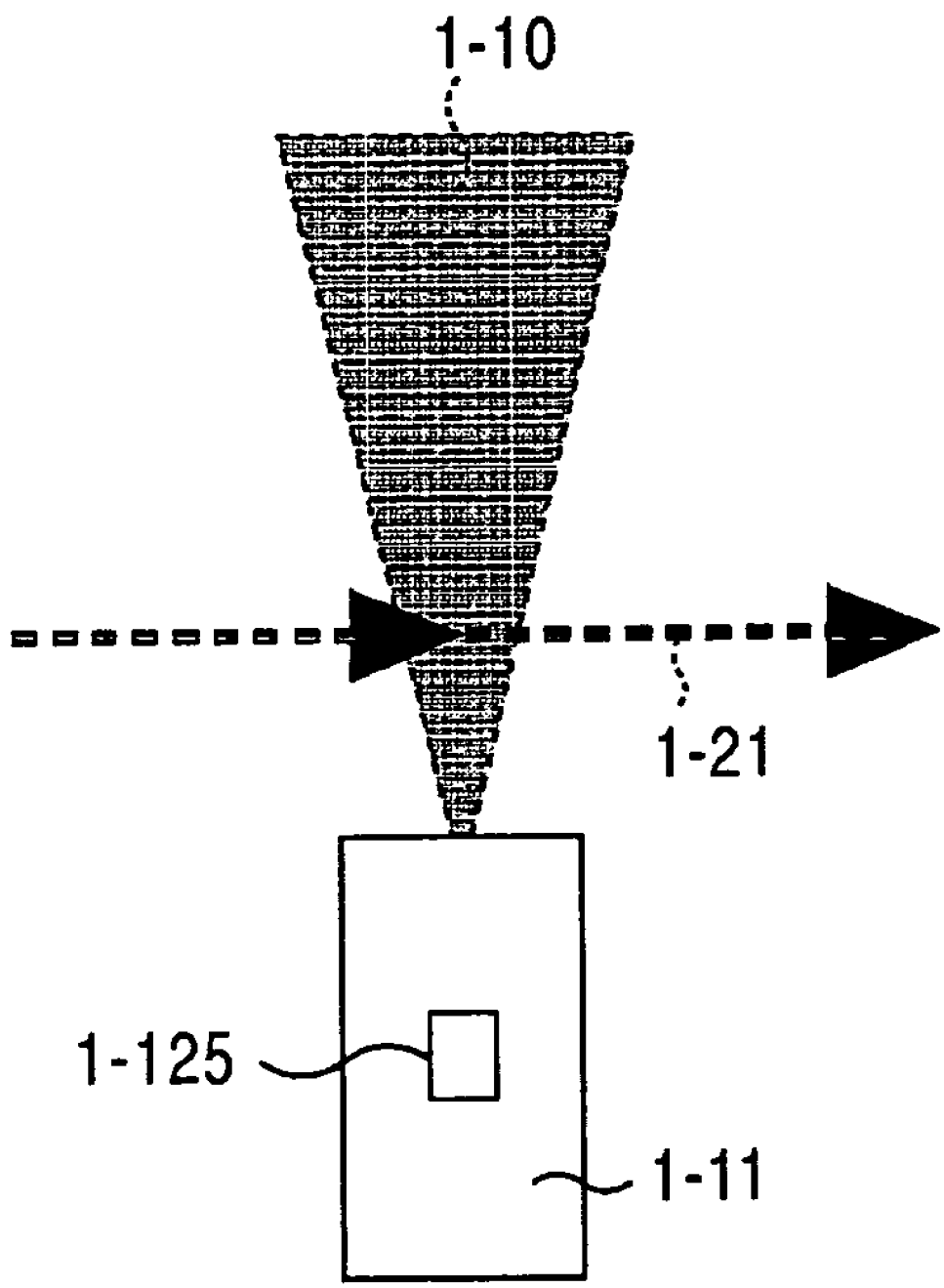
FIG. 2 is a schematic illustration of a state in which horizontal movement of an object is detected by a microwave sensor.
Figure 3:
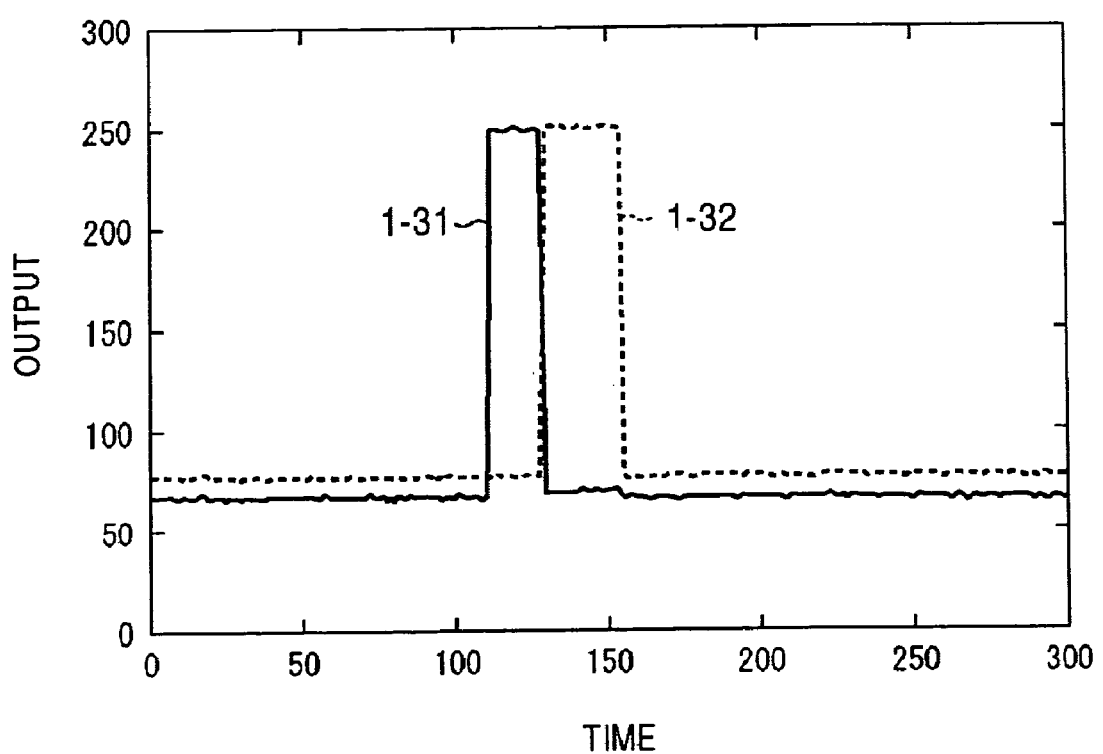
FIG. 3 is a graph showing detection signals from the microwave sensor shown in FIG. 2.
Figure 4:
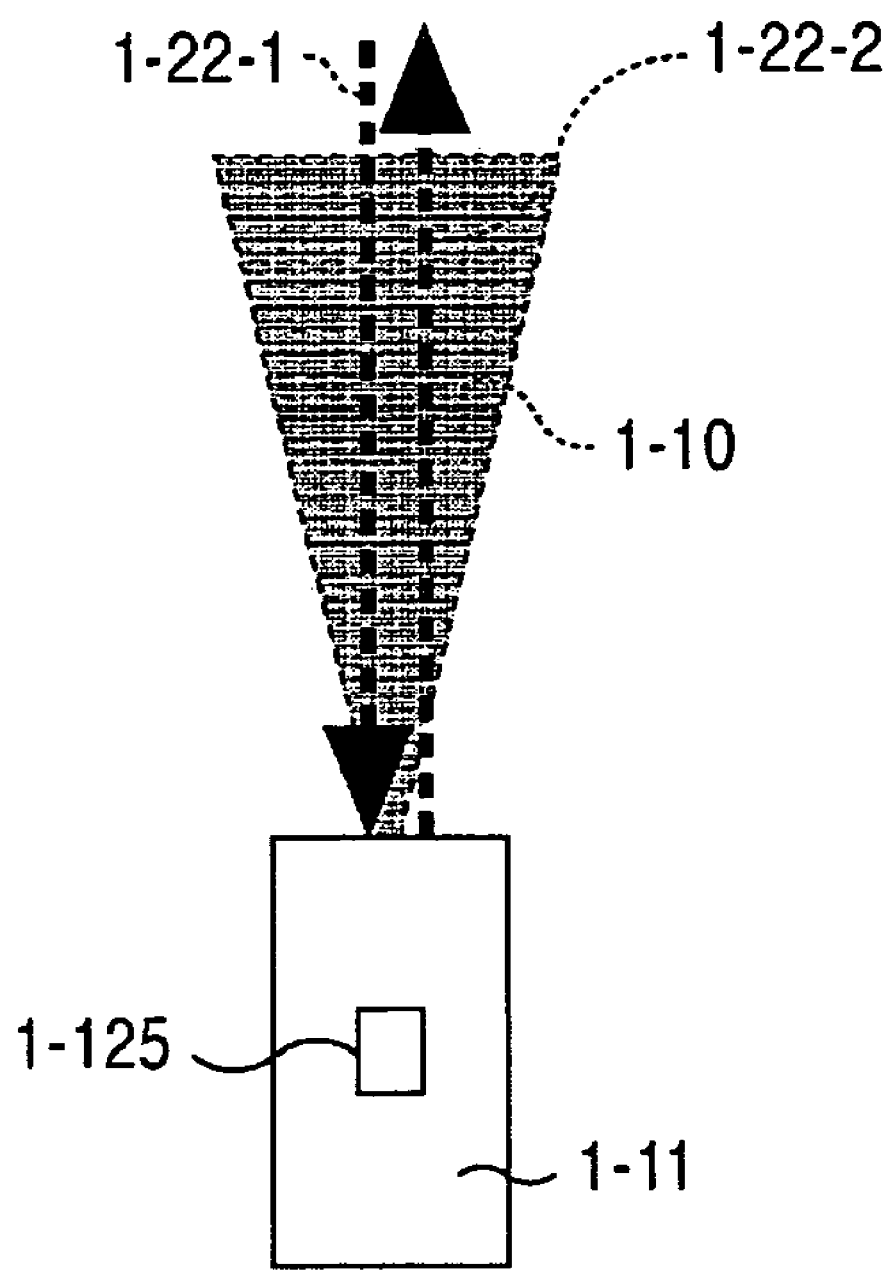
FIG. 4 is a schematic illustration of a state in which vertical movement of an object is detected by a microwave sensor.

FIGS. 2 to 4 show the principle of detecting movement of an object by the microwave sensor 1-125. The microwave sensor 1-125 emits microwaves to a region 1-10, and outputs a detection signal by detecting microwaves reflected by an object. The microwave sensor 1-125 outputs a detection signal 1-31 when the object approaches the microwave sensor 1-125, while it outputs a detection signal 1-32 when the object goes away (departs) from it.

As shown in FIG. 2, when an object (not shown) moves (horizontally moves in front of the security camera 1-11) along the arrow 1-21 from left to right in front of the security camera 1-11 including the microwave sensor 1-125, it is regarded as approaching until it arrives in front of the microwave sensor 1-125, and it is regarded as departing thereafter. The output of the microwave sensor 1-125 in this case is as shown in FIG. 3. FIG. 3 is a graph showing the waveforms of detection signals output from the microwave sensor 1-125, where the horizontal axis indicates time, and the vertical axis indicates output.

In other words, in the period until the object arrives in front of the microwave sensor 1-125, the level of a detection signal 1-31 representing approach of the object is high (the detection signal 1-31 is output by the microwave sensor 1-125). Conversely, in the period after the object passes in front of the microwave sensor 1-125, the level of a detection signal 1-32 representing departure of the object is high (the detection signal 1-32 is output).

As shown in FIG. 4, when an object (not shown) moves along the arrow 1-22-1 from upward to downward in FIG. 4 in front of the security camera 1-11 including the microwave sensor 1-125 (in other words, the object vertically approaches the security camera 1-11), or the object moves along the arrow 1-22-2 from downward to upward (in other words, the object vertically goes away from the security camera 1-11), the microwave sensor 1-125 detects the object and outputs the detection signal 1-31 indicating that the object approaches, or the detection signal 1-32 indicating that the object goes away. Examples of the signals output in both cases are shown in FIG. 5.

Figure 5:
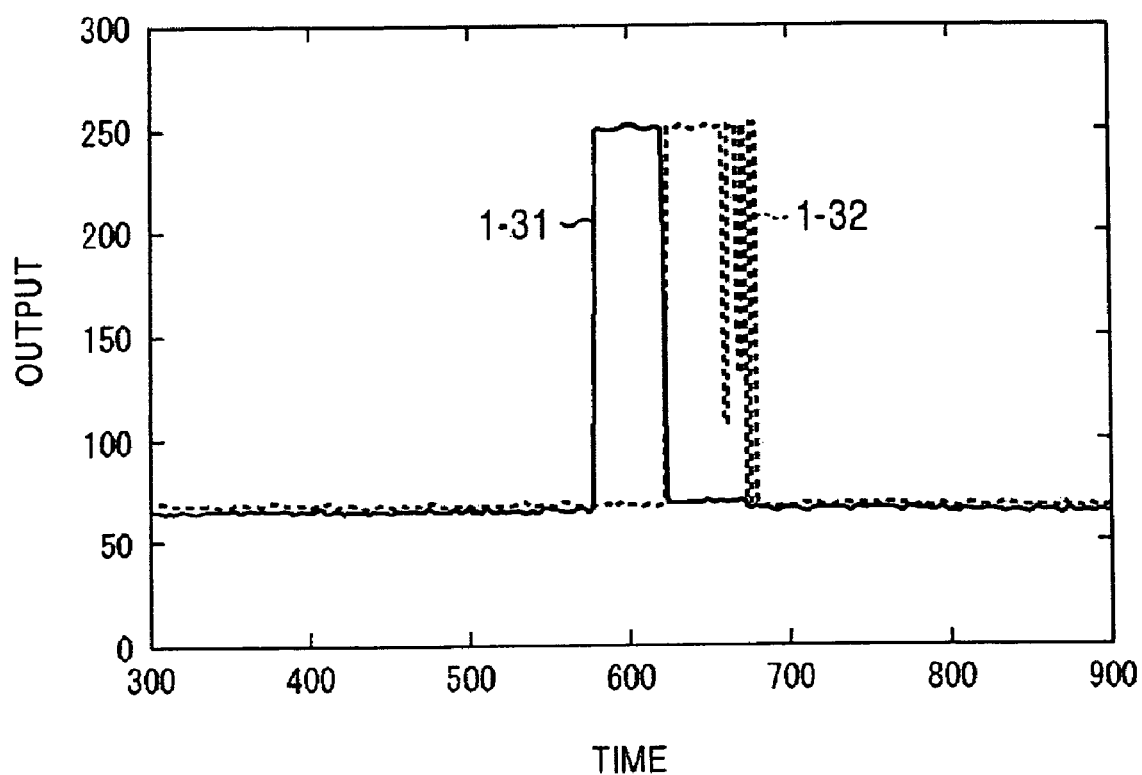
FIG. 5 is a graph showing detection signals from the microwave sensor shown in FIG. 4.

Similarly to FIG. 3, as shown in FIG. 5, the microwave sensor 1-125 outputs the detection signal 1-31 and the detection signal 1-32. As described above, based on only the outputs from the microwave sensor 1-125, it can be determined that the object approaches or goes away. However, it cannot be determined whether the object is horizontally moving as indicated by the arrow 1-21 (FIG. 2), and it cannot be determined whether the object is vertically moving as indicated by the arrows 1-22-1 and 1-22-2 (FIG. 4).

In addition, when the object is vertically moving, the use of only the photosensor 1-124 cannot accurately determine whether the object is approaching or going away. This point is described below with reference to FIGS. 6 to 12.

Figure 6:
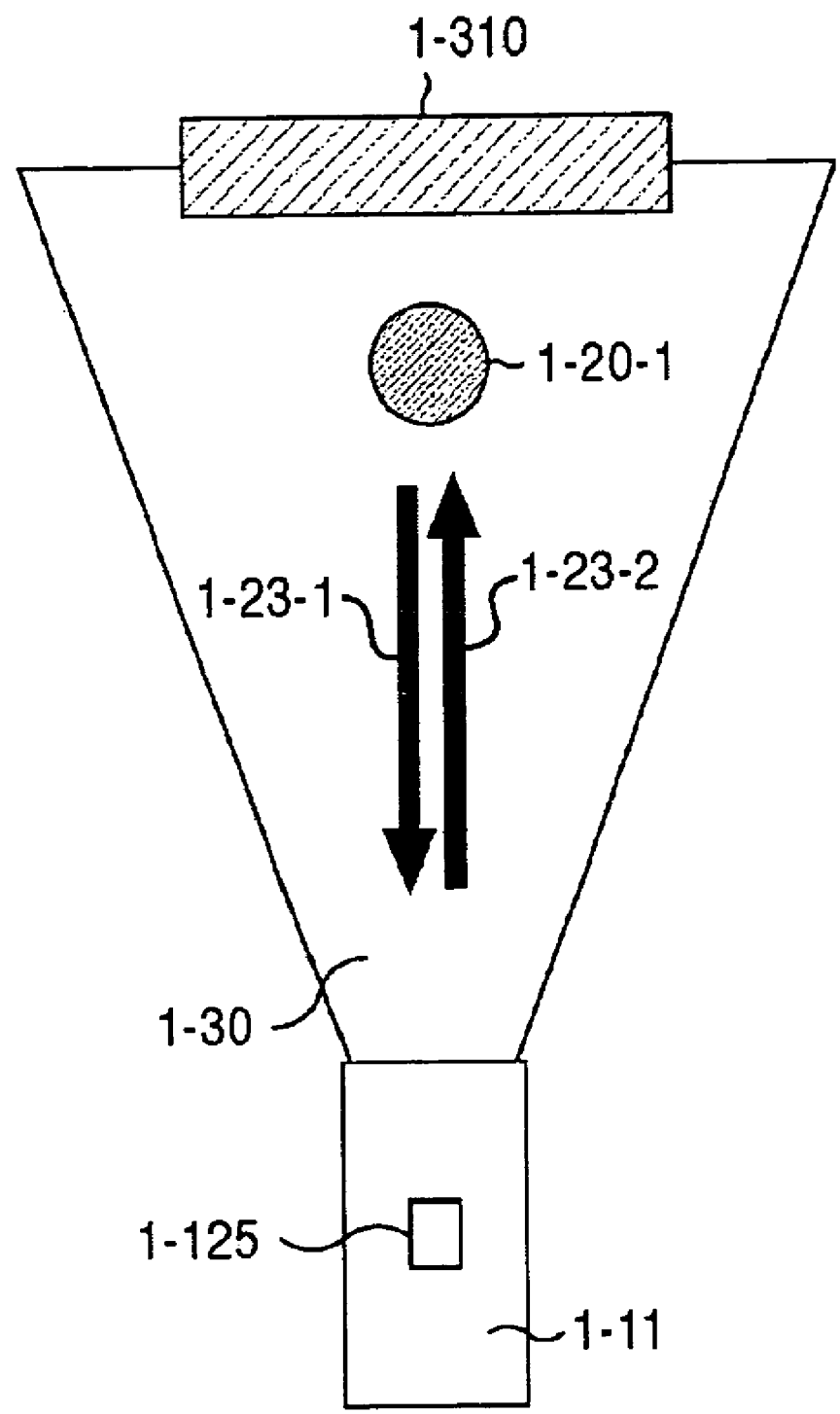
FIG. 6 is a schematic illustration of a state in which vertical movement of an object is detected by a photosensor.

FIG. 6 shows a state in which an object 1-20-1 having brightness lower than that of a background 1-310 vertically approaches the security camera 1-11 including the photosensor 1-124, which outputs a detection signal based on light received from a region 1-30, and subsequently goes away along the arrow 1-23-2. In this case, photosensor 1-124 outputs a detection signal 1-51 as shown in FIG. 7.

Figure 7:
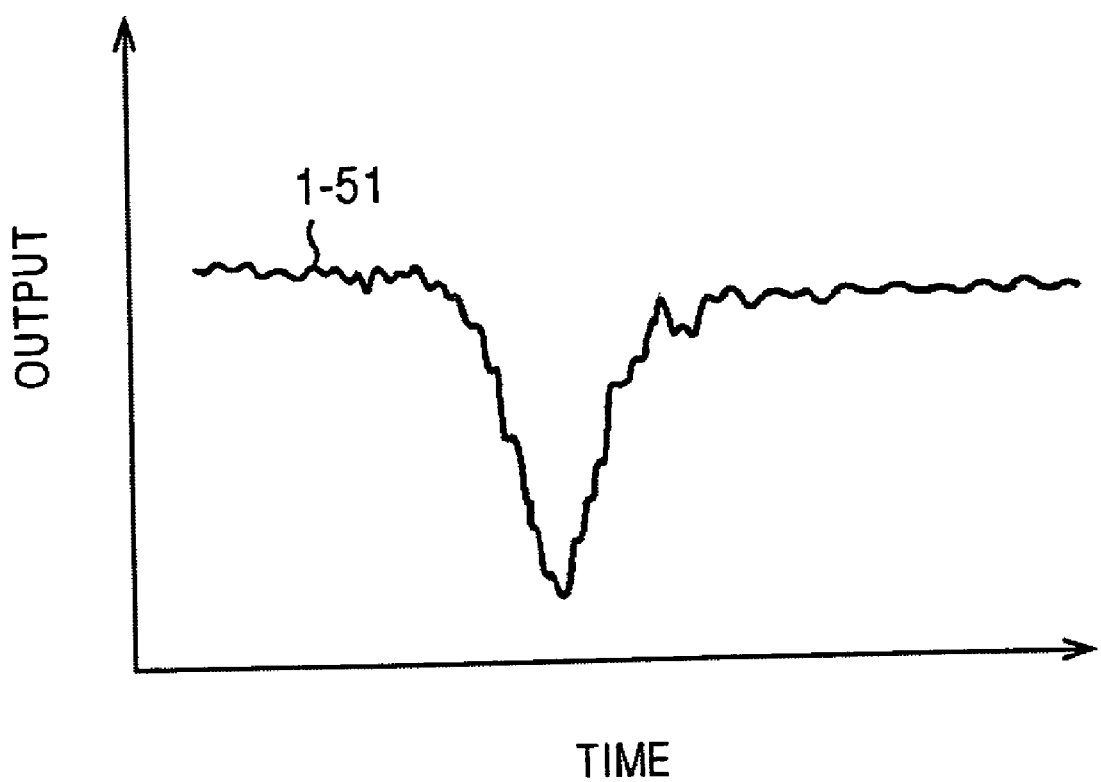
FIG. 7 is a graph showing a detection signal from the photosensor shown in FIG. 6.

FIG. 7 is a graph showing the waveform of the detection signal output from the photosensor 1-124, where the horizontal axis indicates time, and the vertical axis indicates output. The photosensor 1-124 detects light from the object 1-20-1 in the region 1-30 (or light reflected by the object 1-20-1 after impinging on the object 1-20-1), and changes the level of the detection signal to be output. In this example, since the object 1-20-1 has brightness lower than that of the background 1-310, as the object 1-20-1 comes closer to the photosensor 1-124, the level of the detection signal 1-51 decreases. After that, the level of the detection signal 1-51 increases as the object 1-20-1 goes away from the photosensor 1-124.

Figure 8:
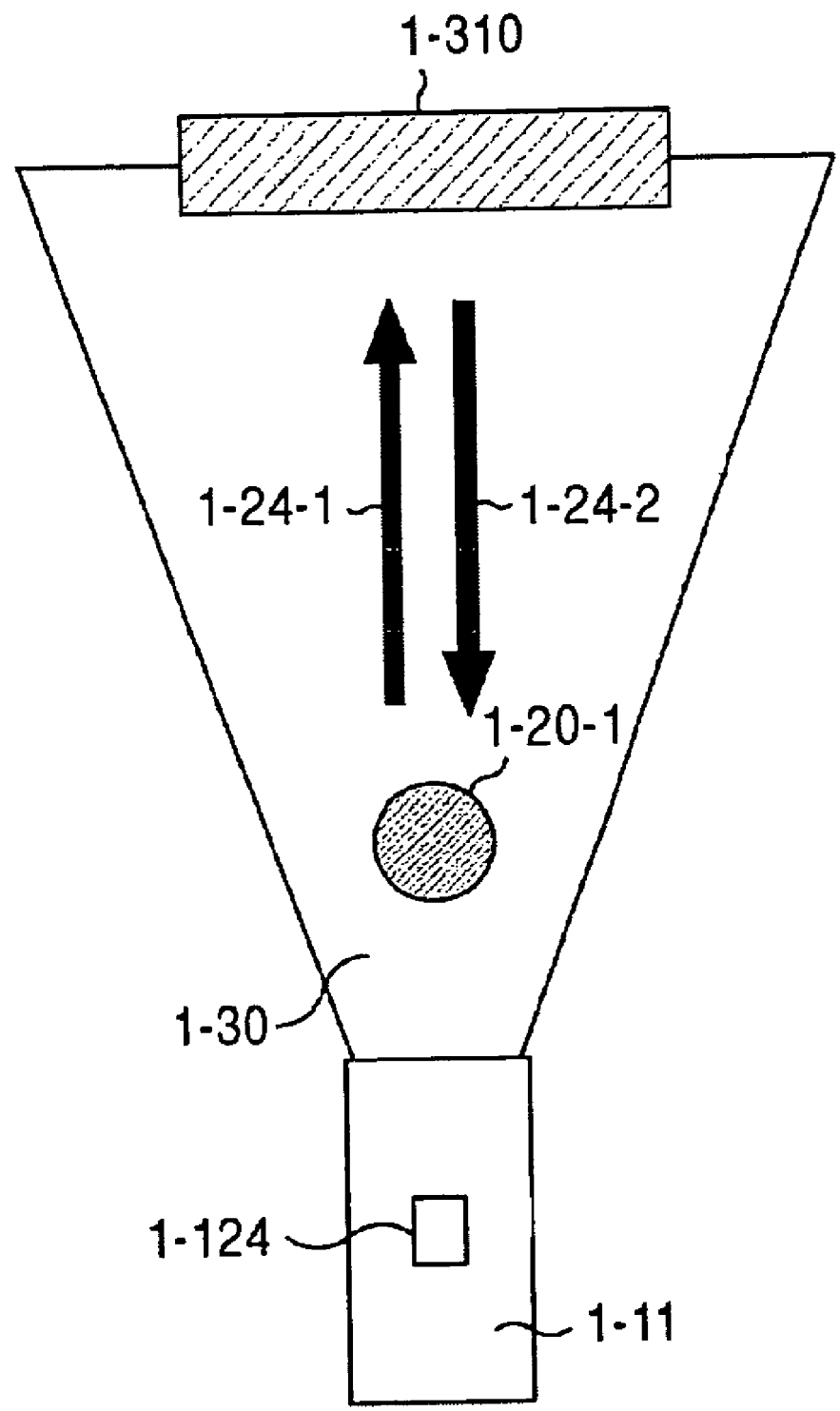
FIG. 8 is a schematic illustration of a state in which vertical movement of an object is detected by a photosensor.
Figure 9:
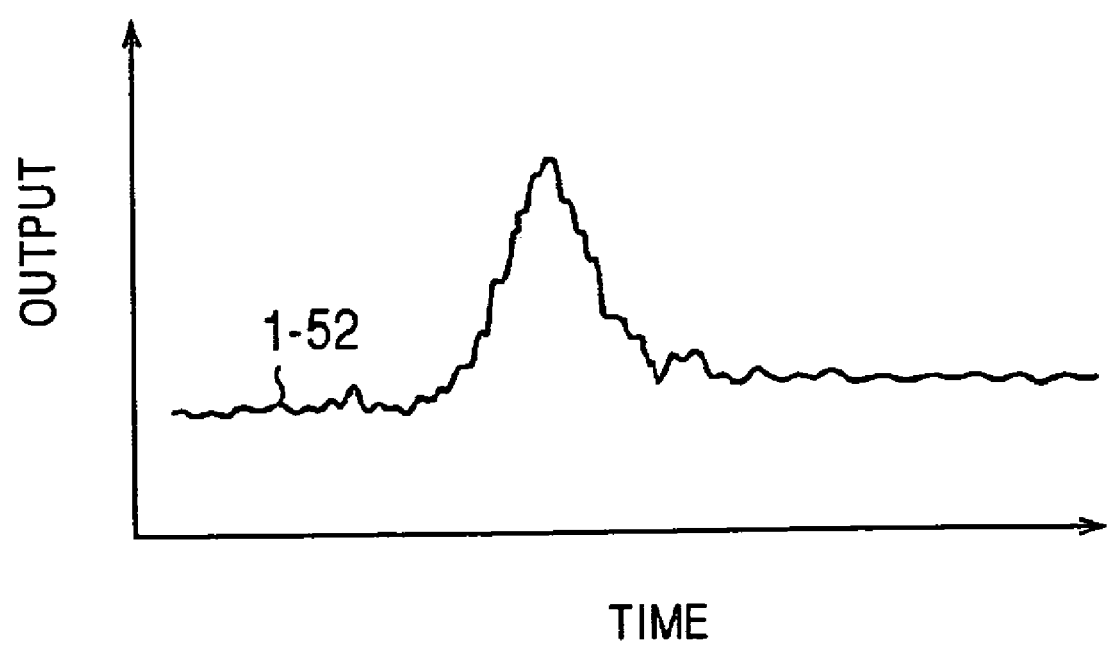
FIG. 9 is a graph showing a detection signal from the photosensor shown in FIG. 8.

FIG. 8 shows a state in which the object 1-20-1 having brightness lower than that of the background 1-310 vertically goes away along the security camera 1-11 including the arrow 1-24-1, and vertically approaches along the arrow 1-24-2 thereafter. In this case, the photosensor 1-124 detects a detection signal 1-52 as shown in FIG. 9. In other words, since the object 1-20-1 has brightness lower than that of the background 1-310, as the object 1-20-1 goes away from the photosensor 1-124, the level of the detection signal 1-52 increases. After that, as the object 1-20-1 approaches, the level of the detection signal 1-52 decreases.

Figure 10:
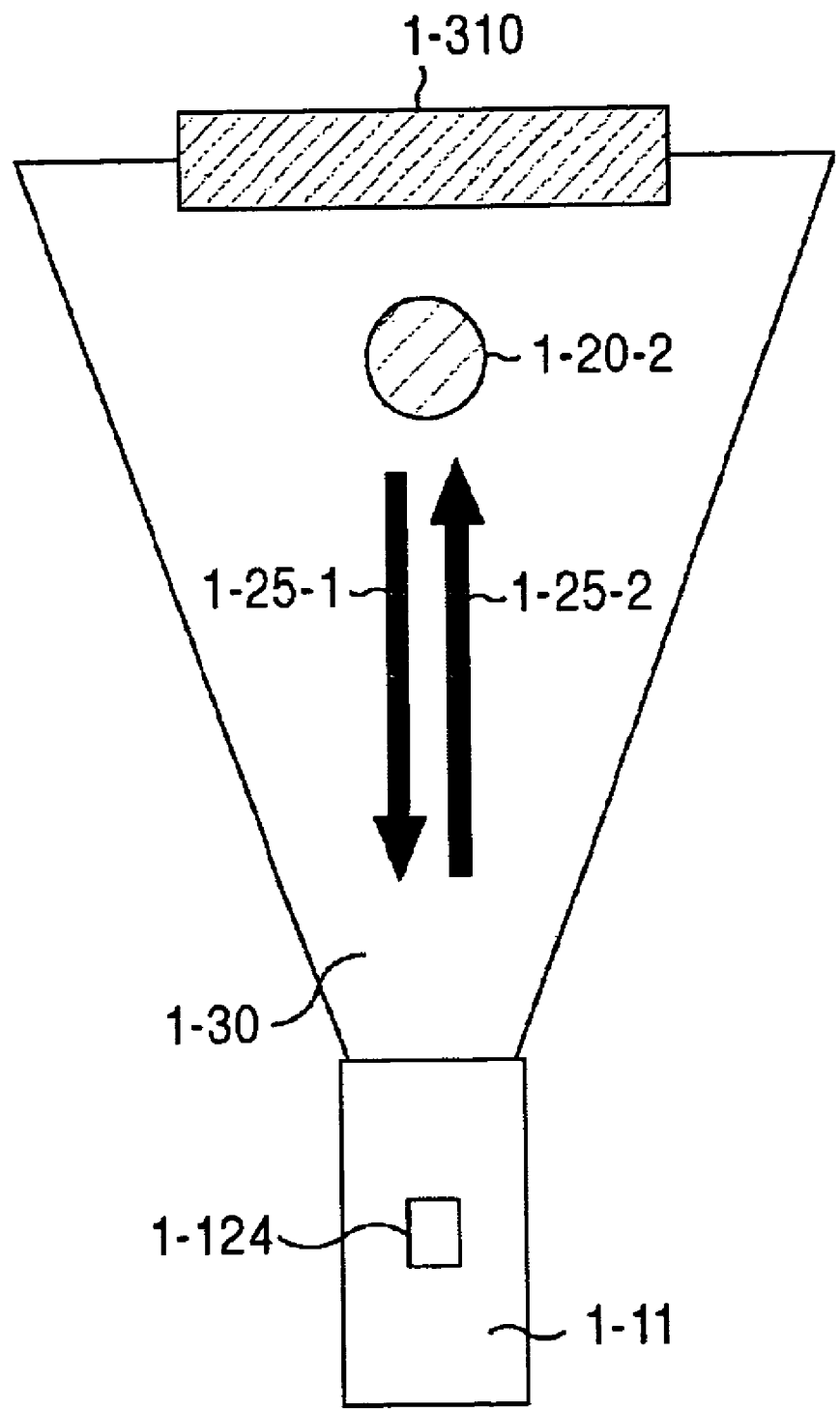
FIG. 10 is a schematic illustration of a state in which vertical movement of an object is detected by a photosensor.
Figure 11:
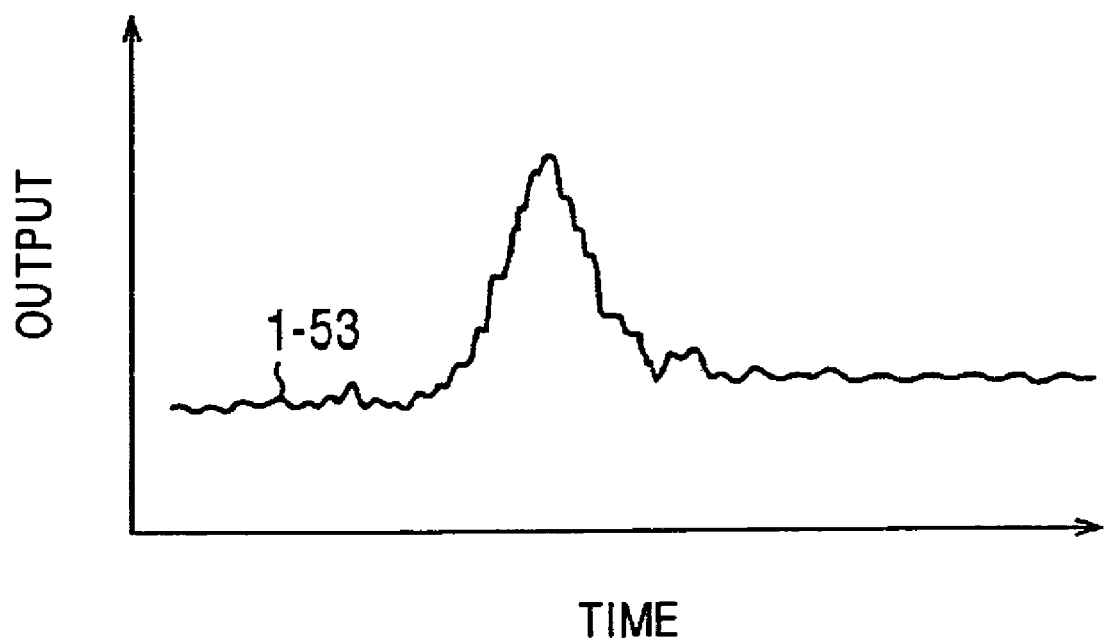
FIG. 11 is a graph showing a detection signal from the photosensor shown in FIG. 10.

FIG. 10 shows a state in which an object 1-20-2 having brightness higher than that of the background 1-310 vertically approaches the security camera 1-11 including the photosensor 1-124 along the arrow 1-25-1, and vertically goes away along the arrow 1-25-2 thereafter. In this case, the photosensor 1-124 outputs a detection signal 1-53 as shown in FIG. 11. In other words, since the object 1-20-2 has brightness higher than that of the background 1-310, the level of the detection signal 1-53 increases as the object 1-20-2 approaches the photosensor 1-124, and decreases as the object 1-20-2 go away from the photosensor 1-124.

Figure 12:
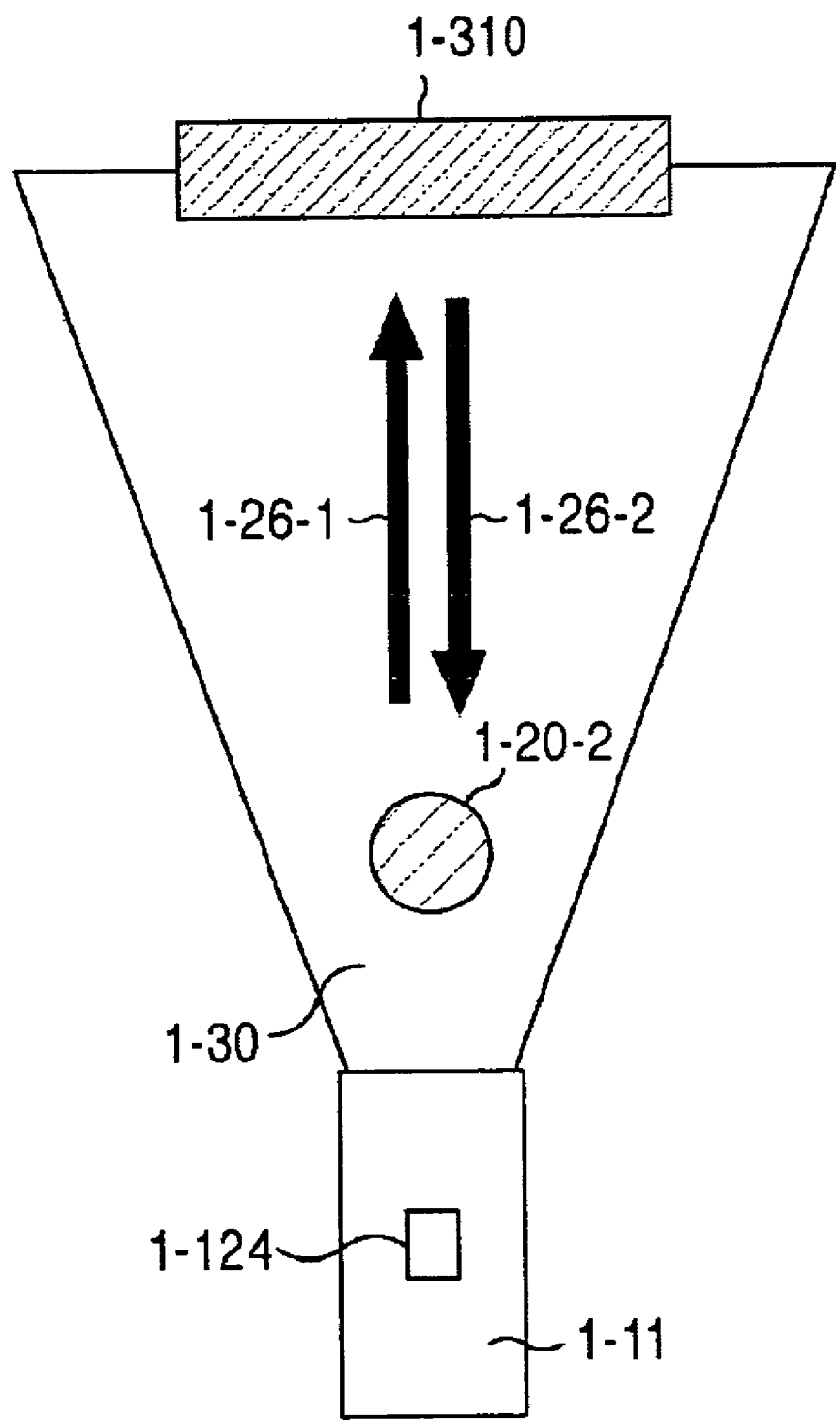
FIG. 12 is a schematic illustration of a state in which vertical movement of an object is detected by a photosensor.
Figure 13:
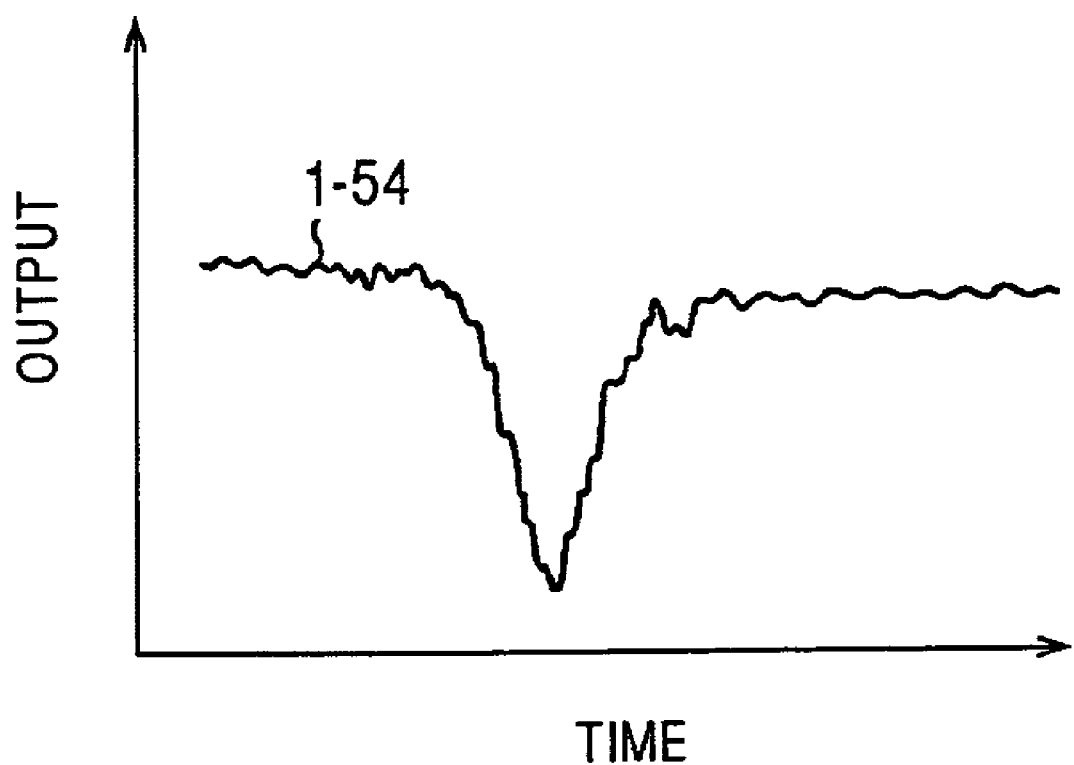
FIG. 13 is a graph showing a detection signal from the photosensor shown in FIG. 12.

FIG. 12 shows a state in which the object 1-20-2 having brightness higher than that of the background 1-310 vertically goes away from the security camera 1-11 including the photosensor 1-124 along the arrow 1-26-1, and vertically approaches along the arrow 1-26-2. In this case, the photosensor 1-124 outputs a detection signal 1-54 as shown in FIG. 13. In other words, since the object 1-20-2 has brightness higher than that of the background 1-310, the level of the detection signal 1-54 decreases as the object 1-20-2 goes away from the photosensor 1-124, and increases as the object 1-20-2 approaches the photosensor 1-124.

As shown in FIGS. 7 and 13, in a case (the case shown in FIG. 6) in which the object 1-20-1 having brightness lower than that of the background 1-310 goes away after approaching, and in a case (the case shown in FIG. 12) in which the object 1-20-2 having brightness higher than that of the background 1-310 approaches after going away, the detection signal 1-51 and detection signal 1-54 from the photosensor 1-124 have the same waveform. In addition, as shown in FIGS. 9 and 11, in a case (the case shown in FIG. 8) in which the object 1-20-1 having brightness lower than that of the background 1-310 approaches after going away, and in a case (the case shown in FIG. 10) in which the object 1-20-2 having brightness higher than that of the background 1-310 goes away after approaching, the detection signal 1-52 and detection signal 1-53 from the photosensor 1-124 have the same waveform. Accordingly, on based on the detection signal from the photosensor 1-124, it cannot be accurately determined whether an object comes closer or goes away.

However, for example, by providing two photosensors on the right and left sides of the security camera 1-11 so that their detection ranges cannot overlap with each other, and analyzing detection signals from the photosensors, it can be determined that the object horizontally moves. Each photosensor detects light emitted by an object (or light reflected by an object after impinging on the object), and outputs a detection signal. Thus, when the object moves from left to right, at first, the detection signal output by the left photosensor changes, and, next, the detection signal output by the right photosensor changes. This can determine that the object is moving horizontally (from left to right side).

Figure 14:
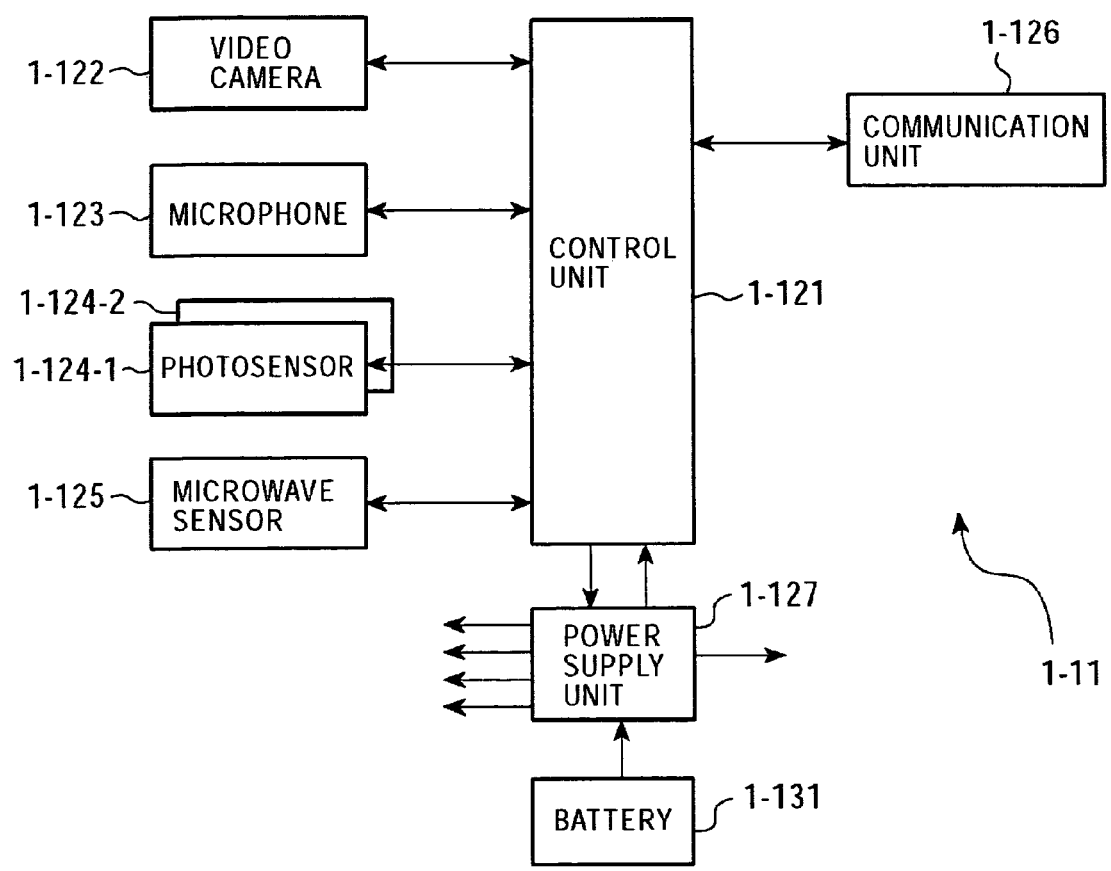
FIG. 14 is a block diagram showing an example of the security camera shown in FIG. 1.

Accordingly, in Embodiment 1 of the present invention, the security camera 1-11 includes one microwave sensor 1-125 and two photosensors 1-124-1 and 1-124-2 (referred to as "photosensors 1-124" when both do not need to be distinguished). FIG. 14 is a block diagram showing the configuration of the security camera 1-11.

The security camera 1-11 includes a control unit 1-121, a video camera 1-122, a microphone 1-123, the photosensors 1-124-1 and 1-124-2, the microwave sensor 1-125, a communication unit 1-126, and a power supply unit 1-127. A battery 1-131 supplies necessary power to the units of the security camera 1-11.

The control unit 1-121 is formed by, for example, a microcomputer or the like. The control unit 1-121 controls the operations of the video camera 1-122, the microphone 1-123, the photosensors 1-124-1 and 1-124-2, the microwave sensor 1-125, the communication unit 1-126, and the power supply unit 1-127. The functional configuration of the control unit 1-121 is described later with reference to FIG. 15.

The video camera 1-122 captures, on demand, images of a situation (for example, the situation of the outside of the front door of a house, the situation of a garden, etc.) in an outside image-capturing area under the control of the control unit 1-121. As a result, when there is a visitor, an illegal intruder, another type of person, or an object (these are each referred to as an "object" in this Specification), images of the object are acquired. The microphone 1-123 collects sounds (e.g., a voice and action sound of an intruder, object breaking sound by an intruder, etc.) in a sound collecting area, converts the collected sounds into an electric signal, and supplies the electric signal to the control unit 1-121.

Each of the photosensors 1-124-1 and 1-124-2 receives light emitted by an object (not shown) or light reflected by the object, converts the received light into an electric signal, and supplies the electric signal to the control unit 1-121. The microwave sensor 1-125 generates microwaves, and detects reflected waves obtained such that the microwaves are reflected by the object after impinging on the object. The microwave sensor 1-125 also generates a detection signal indicating that the reflected waves are ahead of or behind a reference phase, and supplies the generated detection signal to the control unit 1-121. This phase lead and lag are caused by the Doppler effect, and correspond to a state in which the object approaches or goes away.

The communication unit 1-126 acquires, based on a communication control signal from the control unit 1-121, a picture signal supplied from the video camera 1-122 or an audio signal supplied from the microphone 1-123, and transmits the acquired signal to a communication unit (not shown) in the receiver 1-12. Under the control of the control unit 1-121, the power supply unit 1-127 supplies the power from the battery 1-131 to the video camera 1-122, the microphone 1-123, the photosensors 1-124, the microwave sensor 1-125, and the communication unit 1-126. The battery 1-131 may be either a primary battery or a secondary battery.

Power consumption of the video camera 1-122 and the microphone 1-123 greatly exceeds power consumption of the microwave sensor 1-125 and the photosensors 1-124. In comparison between the video camera 1-122 and the microphone 1-123, the former has larger power consumption. In comparison between the microwave sensor 1-125 and the photosensors 1-124, the former has larger power consumption.

Figure 15:
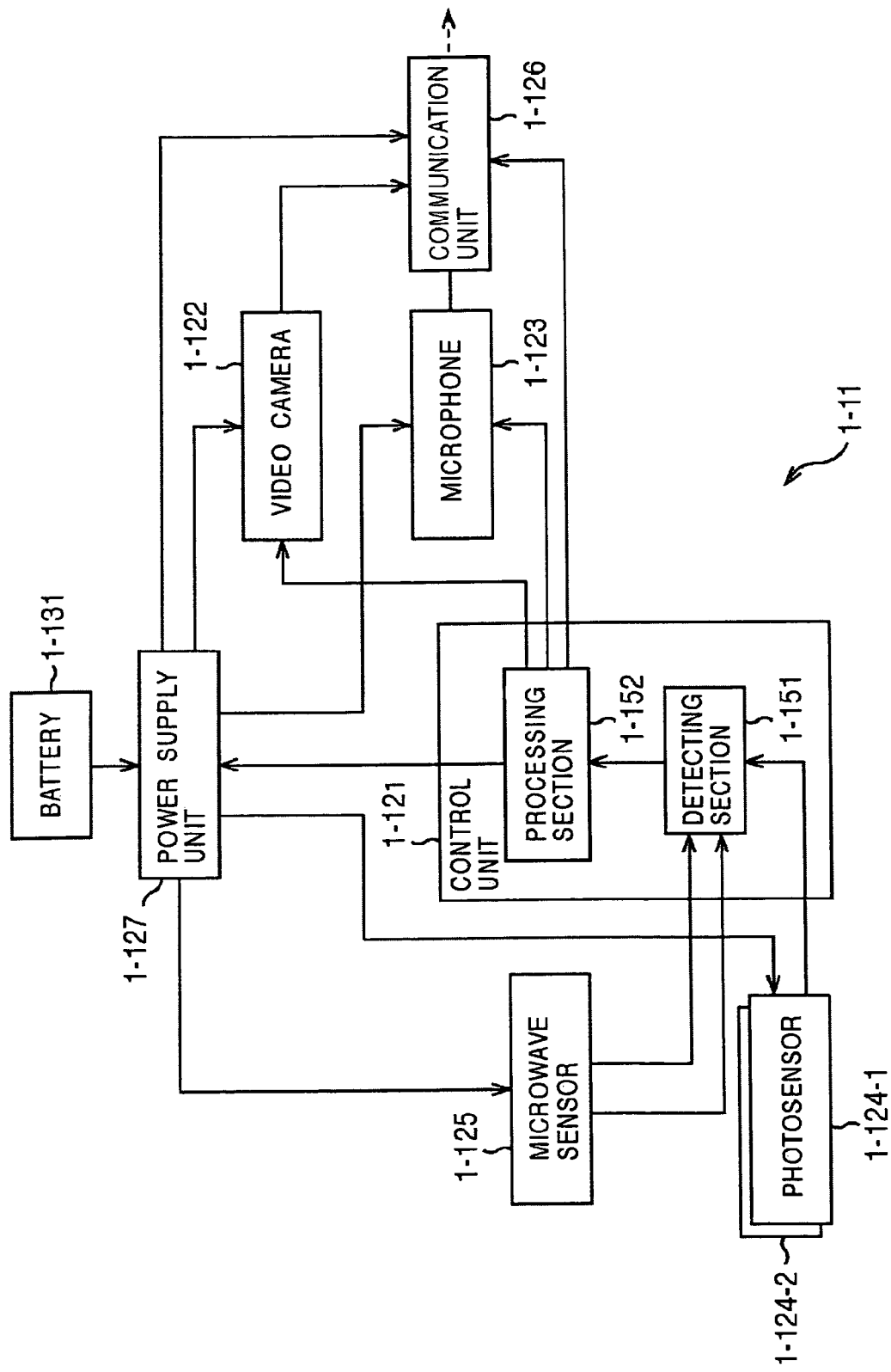
FIG. 15 is a functional block diagram showing the security camera shown in FIG. 1.

FIG. 15 is a block diagram showing the functional configuration of the security camera 1-11 shown in FIG. 1. In FIG. 15, portions corresponding to those in the security camera 1-11 in FIG. 14 are denoted by identical reference numerals, a description thereof is omitted. The control unit 1-121 includes a detecting section 1-151 and a processing section 1-152.

The detecting section 1-151 determines, based on a detection signal from the photosensors 1-124, whether an event (such as movement of the object) has been detected, and determines, based on a detection signal from the microwave sensor 1-125, whether an event has been detected. Based on the result of determination concerning whether the event has been detected by the photosensors 1-124 and the microwave sensor 1-125, the detecting section 1-151 outputs detection information to the processing section 1-152. Based on the detection information, the processing section 1-152 controls the power supply unit 1-127 by using a video-camera power control signal, a microphone power control signal, and a communication power control signal. This controls power supply from the battery 1-131 to the video camera 1-122, the microphone 1-123, and the power supply unit 1-127.

Figure 16A:
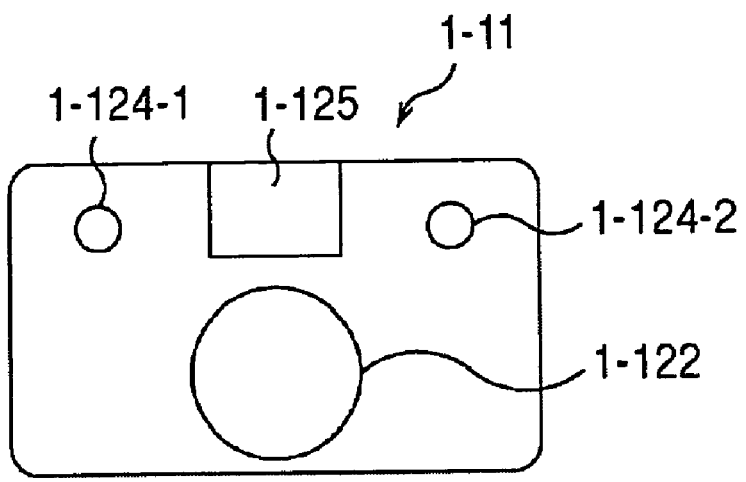
FIGS. 16A and 16B are a front exterior view and top exterior view of the security camera shown in FIG. 1.
Figure 16B:
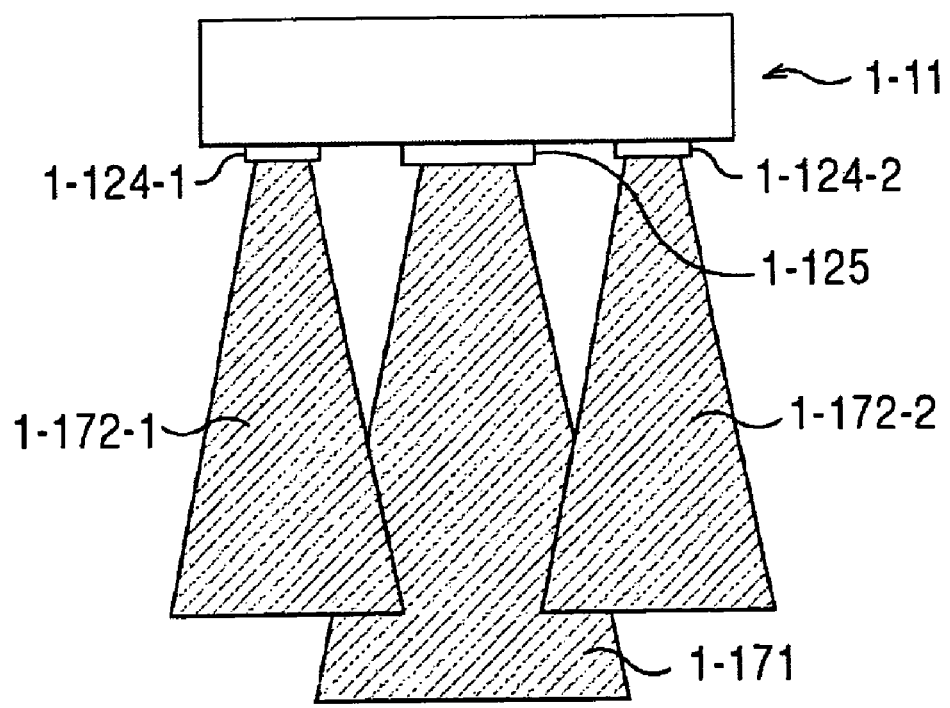

FIGS. 16A and 16B show the exterior shape of the security camera 1-11. FIG. 16A is a front view of the security camera 1-11. In this example, in the lower center of the security camera 1-11, the video camera 1-122, which is formed by a CCD or the like, is provided. Above the video camera 1-122, the microwave sensor 1-125 is provided. On the right and left sides of the microwave sensor 1-125, the photosensors 1-124-1 and 1-124-2 are provided.

FIG. 16B shows a top view of the security camera 1-11 shown in FIG. 16A. In FIG. 16B, the hatched region 1-171 indicates a detectable range of reflected waves which are generated such that microwaves are generated by the microwave sensor 1-125 and are reflected by the object. The hatched region 1-171 indicates the directivity of the microwave sensor 1-125.

Similarly, the hatched regions 1-171-1 and 1-171-2 respectively indicate a range in which the photosensor 1-124-1 can detect light emitted from the object, or light reflected by the object after impinging on the object, and a range in which the photosensor 1-124-2 can detect light emitted from the object, or light reflected by the object after impinging on the object. The hatched regions 1-171-1 and 1-171-2 indicate the directivities of the photosensors 1-124-1 and 1-124-2, respectively.

Detection of a horizontal movement of an object by the photosensors 1-124-1 and 1-124-2 is described below with reference to FIGS. 17 to 20.

Figure 17:
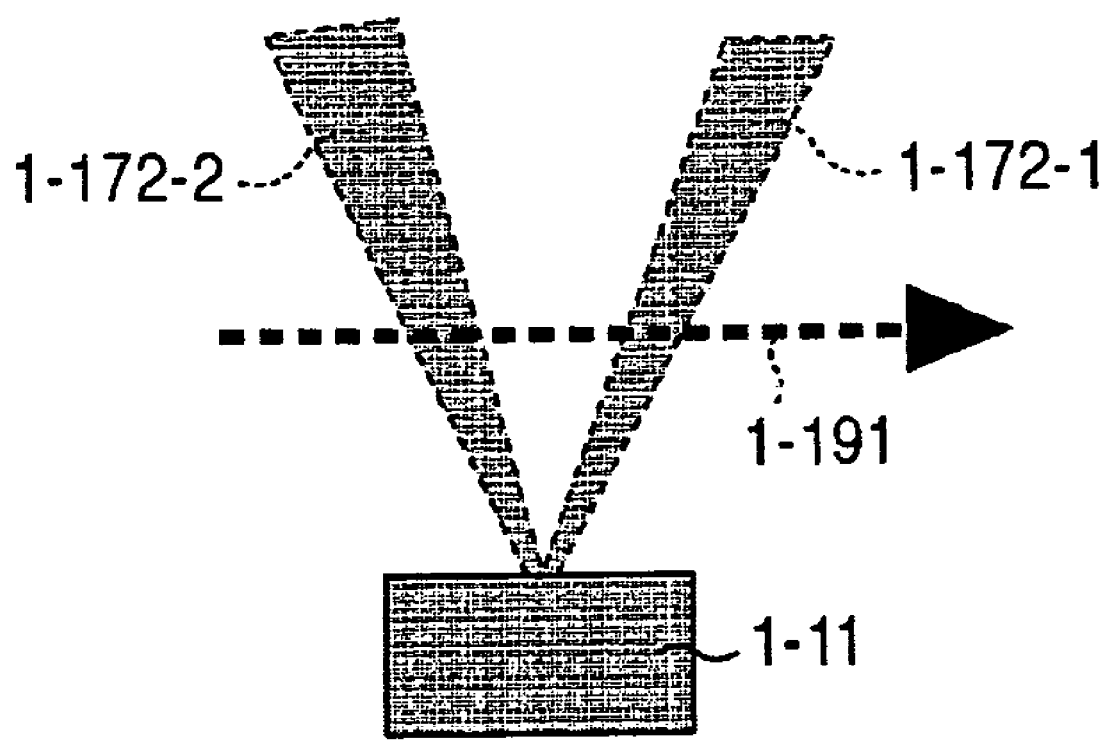
FIG. 17 is a schematic illustration of a state in which an object moving from left to right is detected by two photosensors.

FIG. 17 shows a state in which an object (not shown) horizontally moves along the arrow 1-191 from left to right side in front of the security camera 1-11. In this case, the photosensors 1-124-1 and 1-124-2 provided on the security camera 1-11 output their detection signals.

When the object moving from left in FIG. 17 firstly enters the region 1-172-2, the photosensor 1-124-2 detects light emitted from the object, and the level of the detection signal from the photosensor 1-124-2 changes. After that, when the object further moves to the right and goes out of the region 1-172-2, the level of the detection signal from the photosensor 1-124-2 changes. When the object further moves to the right and enters the region 1-172-1, the photosensor 1-124-1 detects light emitted from the object, and the level of the detection signal from the photosensor 1-124-1 changes. After that, when the object further moves to the right and goes out of the region 1-172-1, the level of the detection signal from the photosensor 1-124-1 changes.

Figure 18:
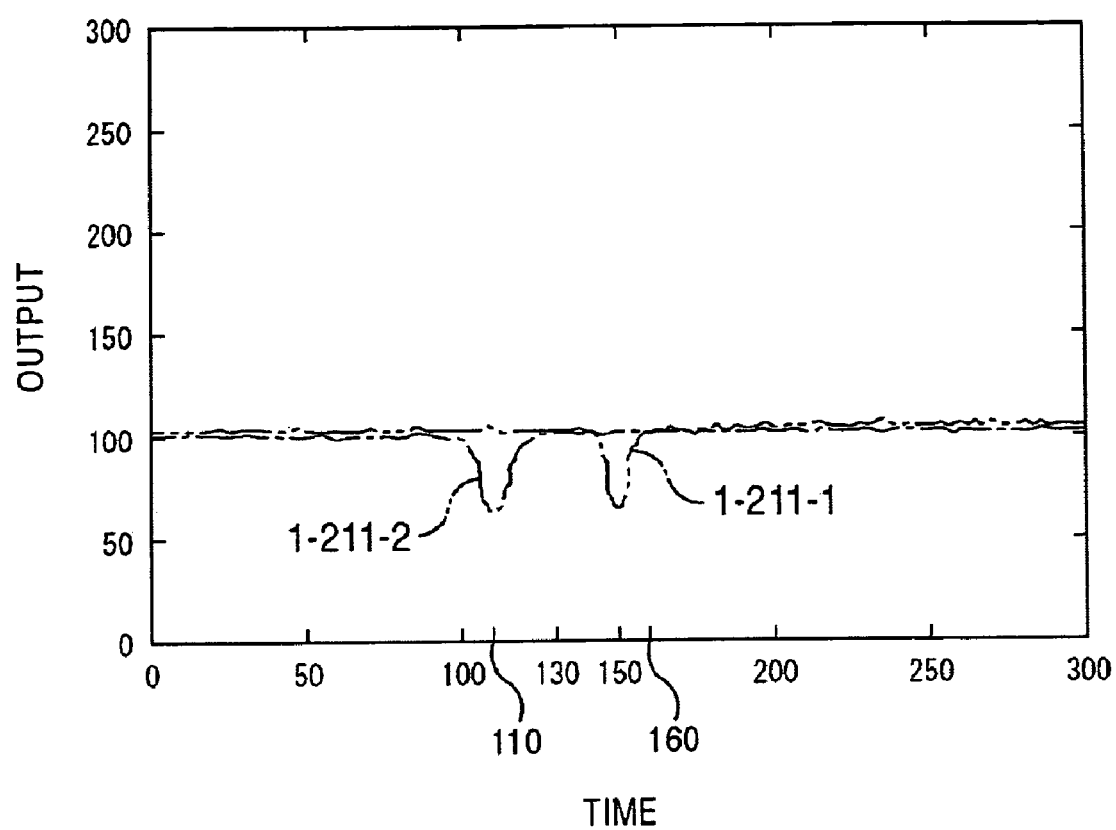
FIG. 18 is a graph showing detection signals from the photosensor shown in FIG. 17.

FIG. 18 is a graph showing the waveforms of a detection signal 1-211-1 from the photosensor 1-124-1 and a detection signal 1-211-2 from the photosensor 1-124-2, where the vertical axis indicates output and the horizontal axis indicates time. In this example, it is assumed that, when there is not particularly the object (there is only the background 1-310), the output level of each of the photosensors 1-124-1 and 1-124-2 is set to approximately 100. In addition, it is assumed that the brightness of the object is set to be lower than that of the background 1-310, and it is assumed that, when the photosensor 1-124-1 or 1-124-2 detects the object, the level of the detection signal 1-211 or 1-211-2 decreases.

As shown in FIG. 18, when the object enters the region 1-172-2 (around the time 110 on the time axis), the level of the detection signal 1-211-2 drops to approximately 60. After that, when the object goes out from the region 1-172-2 (around the time 130 on the time axis), the level of the detection signal 1-211-2 returns to approximately 100. When the object further moves to the right and enters the region 1-172-1 (around the time 150 on the time axis), the level of the detection signal 1-211-1 drops to approximately 60. After that, the object further moves to the right and goes out of the region 1-172-1 (around approximately the time 160), the level of the detection signal 1-211-1 returns to approximately 100.

In other words, as the object moves, the detection signal 1-211-2 changes at first. After that, the detection signal 1-211-1 changes. This indicates that the object has moved from left to right (in the horizontal direction).

Figure 19:
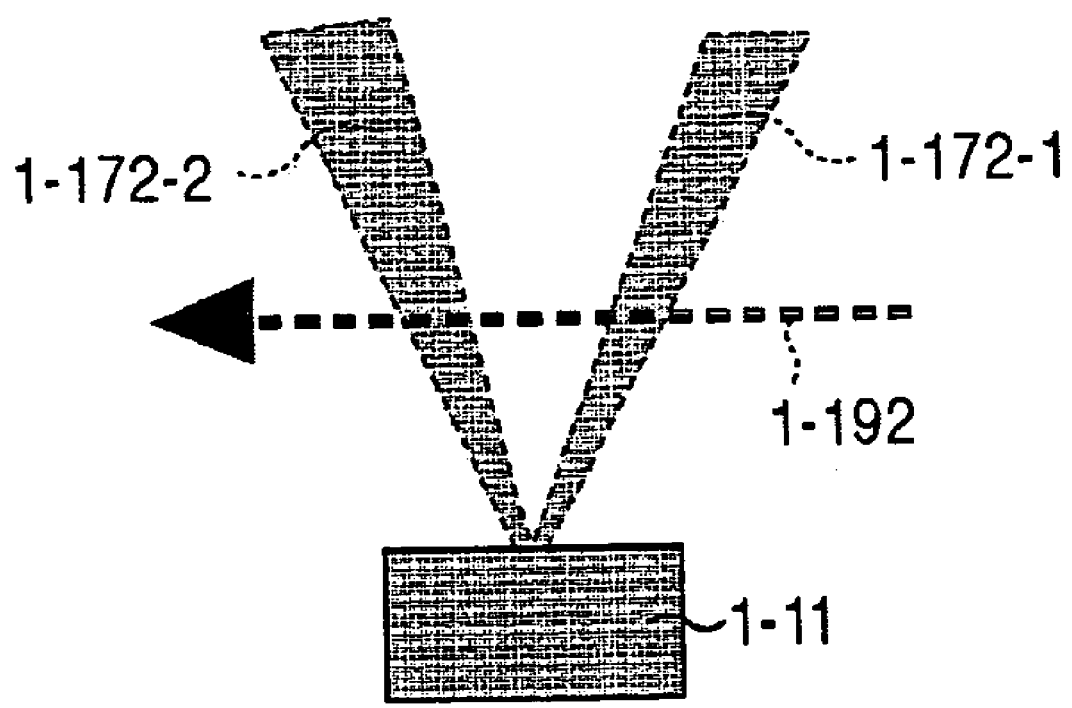
FIG. 19 is a schematic illustration of a state in which an object moving from right to left is detected by two photosensors.
Figure 20:
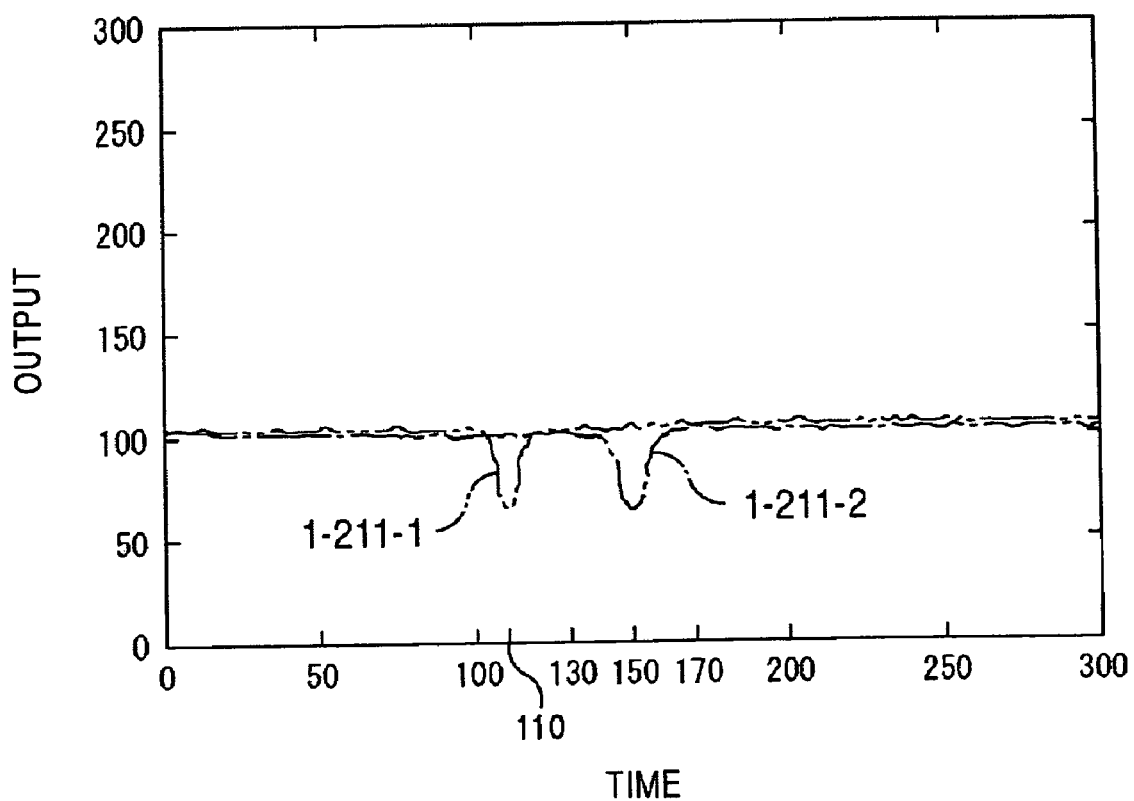
FIG. 20 is a graph showing detection signals from the photosensor shown in FIG. 19.

FIG. 19 shows a state in which an object (not shown) horizontally moves from right to left in FIG. 19, conversely to the case shown in FIG. 17. In this case, the detection signals from the photosensors 1-124-1 and 1-124-2 have the waveforms as shown in FIG. 20.

When the object enters a region 1-172-1 (around the time 110 on the time axis), the level of the detection signal 1-211-1 drops to approximately 60. After that, when the object goes out of a region 1-172-1 (around the time 130 on the time axis), the level of the detection signal 1-211-1 returns to approximately 100.

When the object moves to left and enters the region 1-172-2 (around the time 150 on the time axis), the level of the detection signal 1-211-2 drops to approximately 60. After that, when the object moves to the left and goes out of the region 1-172-2 (around the time 170 on the time axis), the level of the detection signal 1-211-2 returns to approximately 100.

In other words, as the object moves, the detection signal 1-211-1 changes at first. After that, the detection signal 1-211-2 changes. This indicates that the object has moved from right to left (in the horizontal direction).

As described above, based on detection signals output by the photosensors 1-124-1 and 1-124-2 provided on the sides of the security camera 1-11, horizontal movement of an object is determined, that is, it can be determined whether the object has moved from left to right, or whether the object has moved from right to left.

Next, detection of movement of an object by using photo and microwave sensors is described below with reference to FIGS. 21 to 24.

Figure 21:
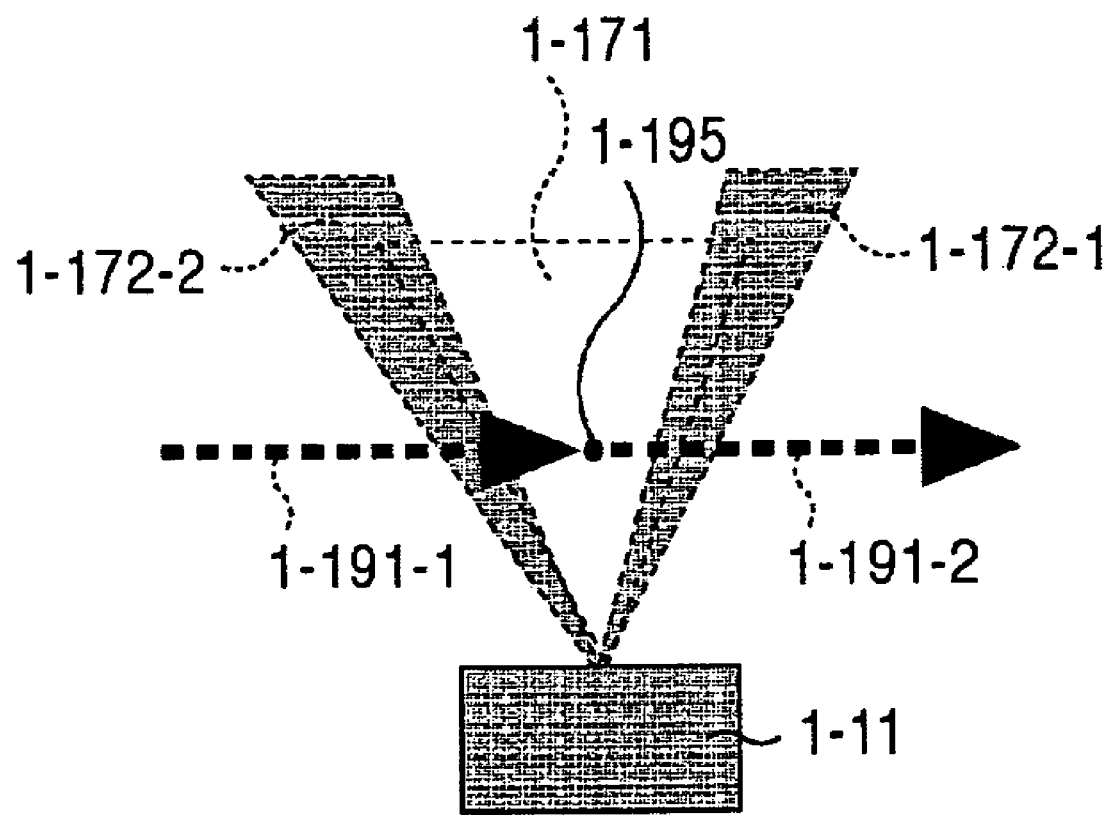
FIG. 21 is a schematic illustration of a state in which a horizontally moving object is detected by two photosensors and one microwave sensor.

Similarly to the case shown in FIG. 17, FIG. 21 shows a state in which an object (not shown) moves from left to right in front of the security camera 1-11. Although the operations of the photosensors 1-124-1 and 1-124-2 are similar to those in the case in FIG. 17, in the case in FIG. 21, when the object, which has moved from the left, enters a region 1-171, the microwave sensor 1-125 outputs a detection signal by detecting microwaves which are reflected by the object after impinging on the object.

As described above, the microwave sensor 1-125 detects reflected waves generated such that microwaves impinge on the object, determines whether the reflected waves are ahead of or behind a reference phase, and outputs a detection signal (hereinafter referred to as an "approach signal") indicating that the object approaches or a detection signal (hereinafter referred to as a "departure signal") indicating that the object goes away (departs). In the case in FIG. 21, the approach signal is output in the period after the object moving from the left in FIG. 21 enters a region 1-171 until it reaches a position 1-195 around the center of the region 1-171, that is, the position closest to the microwave sensor 1-125 provided in the center of the security camera 1-11. After that, in the period after the object moves from the position 1-195 to the right along the arrow 1-191-2 until it goes out of the region 1-171, the departure signal is output.

Figure 22:
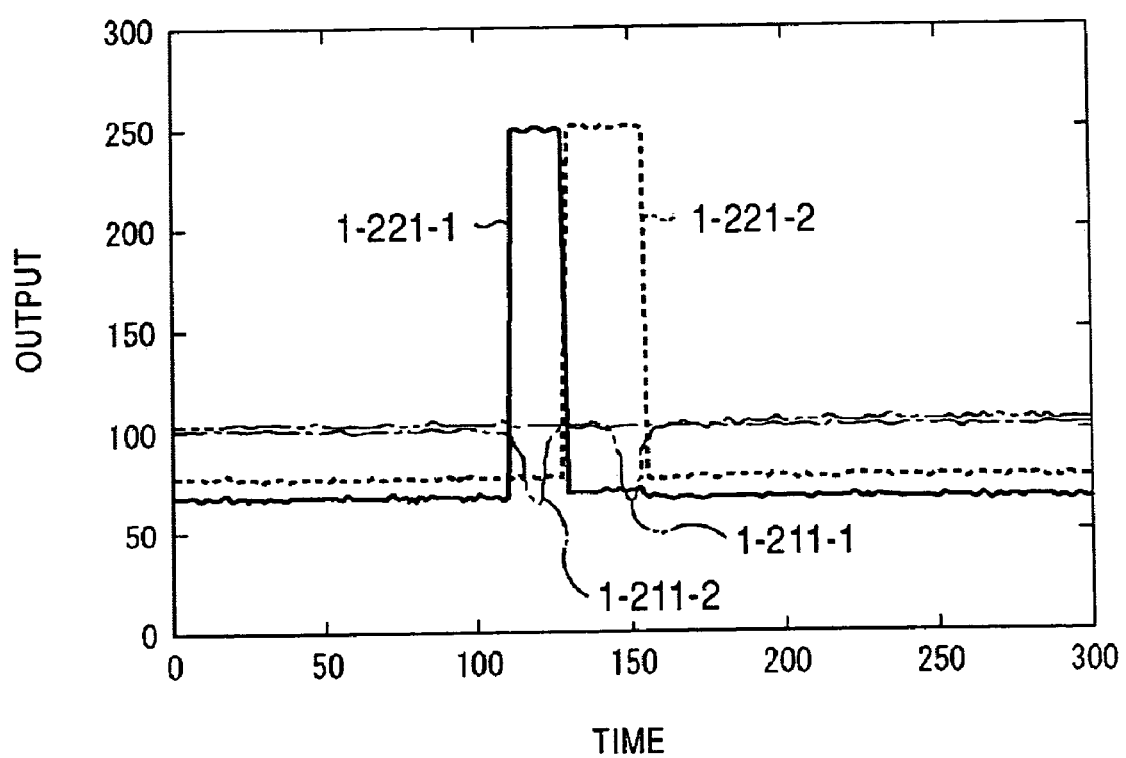
FIG. 22 is a graph showing detection signals from the photosensors and microwave sensor shown in FIG. 21.

Similarly to FIG. 18, FIG. 22 shows the waveforms of the detection signal 1-211-1 by the photosensor 1-124-1 and the detection signal 1-211-2 by the photosensor 1-124-2, and shows, at the same time, the waveforms of an approach signal 1-221-1 and a departure signal 1-221-2 by the microwave sensor 1-125. The level of each of the approach signal 1-221-1 and the departure signal 1-221-2 is set to approximately 60 to 70 in a normal mode (when approach or departure of the object is not detected), and is set to increase to approximately 250 when approach or departure of the object is detected.

In FIG. 22, the waveforms of the detection signals 1-211-1 and 1-211-2 by the photosensors 1-124-1 and 1-124-2 are similar to those in FIG. 18. However, when the object enters the region 1-171 (around the time 110 on the time axis), the level of the approach signal 1-221-1 rises to approximately 250. After that, when the object reaches the vicinity of the center of the region 1-171 (around the time 130 on the time axis), the level of the approach signal 1 -221-1 returns to approximately 60, and, with almost the same timing, the level of the departure signal 1-221-2 rises to approximately 250. When the object moves to the right and goes out of the region 1-171 (around the time 170 on the time axis), the level of the departure signal 1-221-2 returns to approximately 70.

Figure 23:
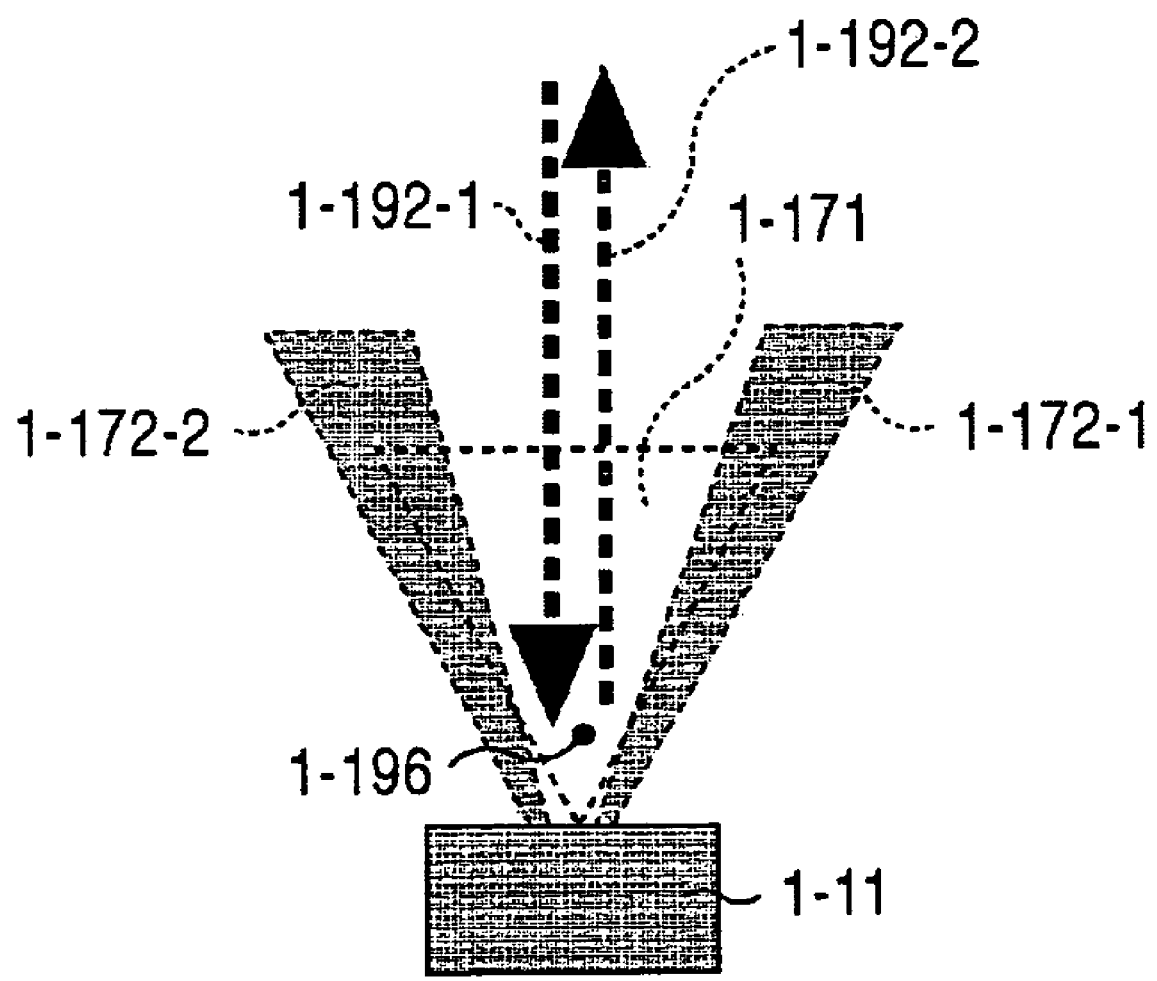
FIG. 23 is a schematic illustration of a state in which a vertically moving object is detected by two photosensors and one microwave sensor.

FIG. 23 shows a state in which, after an object (not shown) vertically approaches the security camera 1-11 along the arrow 1-192-1 and temporarily stops, it goes away from the security camera 1-11 along the arrow 1-192-2.

Figure 24:
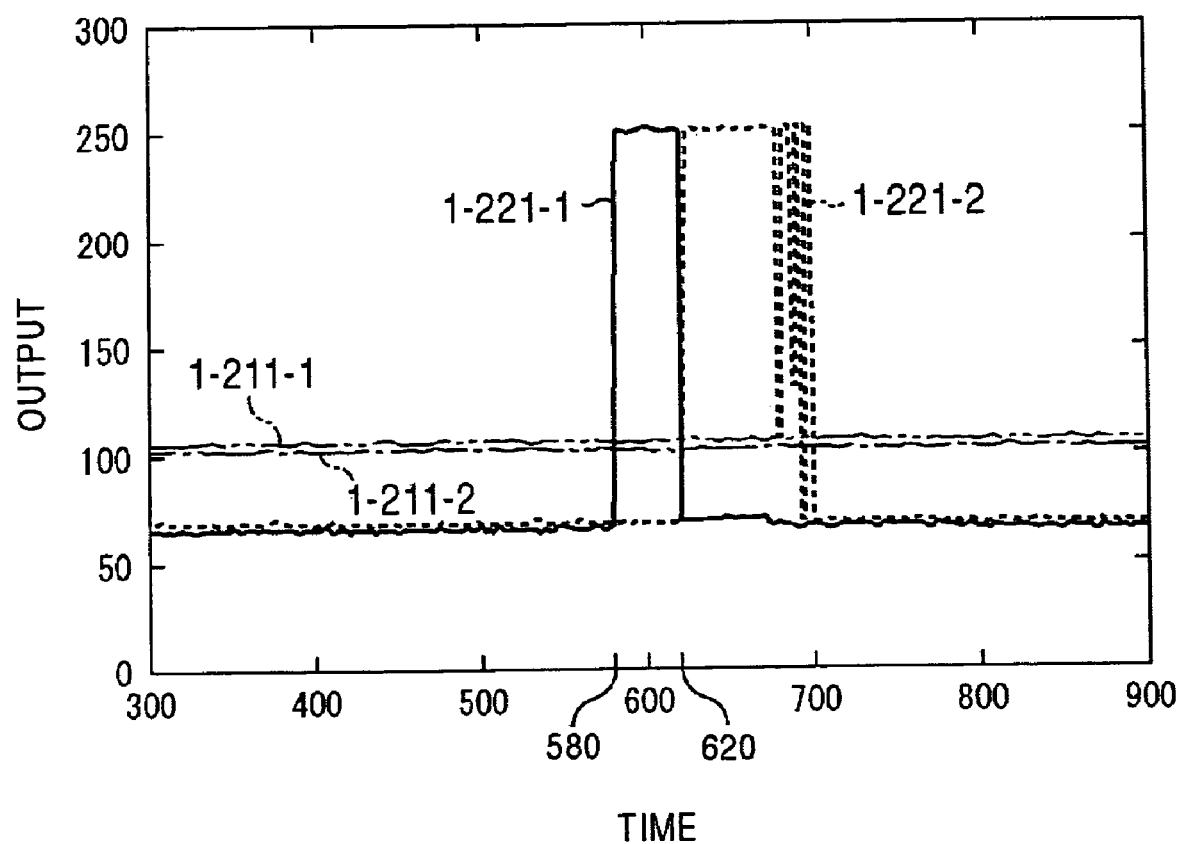
FIG. 24 is a graph showing detection signals from the photosensors and microwave sensor shown in FIG. 23.

FIG. 24 shows the waveforms of detection signals 1-211-1 and 1-211-2, an approach signal 1-221-1, and a departure signal 1-221-2. In the case shown in FIG. 23, the object does not enter the region 1-172-1 or 1-172-2. Accordingly, the levels of the detection signals 1-211-1 and 1-211-2 by the photosensors 1-124-1 and 1-124-2 are substantially constant (approximately 100), and do not change. This indicates that the object does not horizontally move (in a direction crossing the front of the security camera 1-11).

When the object, which vertically approaches along the arrow 1-192-1, enters the region 1-171 (around the time 580 on the time axis), the level of the approach signal 1-221-1 output by the microwave sensor 1-125 rises to approximately 250. After that, when the object reaches the position 1-196 closest to the security camera 1-11 (around the time 620 on the time axis), the level of the approach signal 1-221-1 returns to approximately 70. With almost the same timing, the object vertically goes away along the arrow 1-192-2, so that the level of the departure signal 1-221-2 rises to approximately 250. When the object vertically goes away and goes out of the region 1-171 (around the time 700 on the time axis), the level of the departure signal 1-221-2 returns to approximately 70.

This indicates that, after the object vertically approaches, it goes away without horizontally moving.

As described above, based on detection signals from two photosensors and one microwave sensor, approach or departure of the object can be accurately detected, if the object horizontally or vertically moves in front of the security camera 1-11. In addition, when the object horizontally moves, it can be accurately detected that the object moves from left to right, or from right to left.

Figure 25:
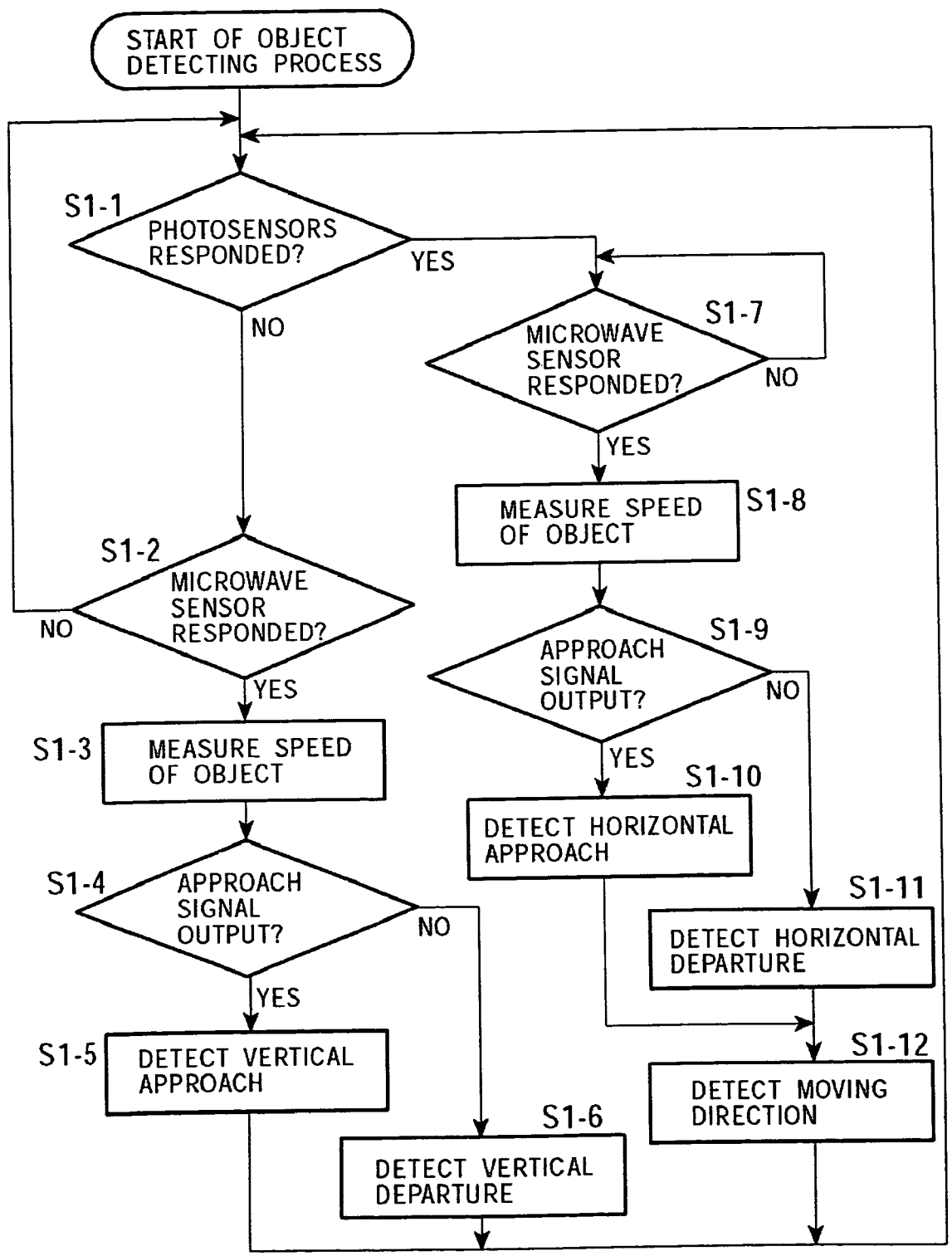
FIG. 25 is a flowchart illustrating an object detecting process.

Next, an object detecting process of the detecting section 1-151 is described below with reference to the flowchart shown in FIG. 25.

In step S1-1, by monitoring the outputs of the photosensors 1-124, the detecting section 1-151 determines whether the photosensors 1-124 have responded. As described above with reference to FIG. 18 or FIG. 20, when the photosensors 1-124 detect an object, the levels of output detection signals change. When each level of the detection signals from the photosensors 1-124 changes to be not less than a predetermined threshold value, in step S1-1, the detecting section 1-151 determines that the photosensors 1-124 have responded.

If the detecting section 1-151 has determined that the photosensors 1-124 have not responded, it proceeds to step S1-2. In step S1-2, by monitoring the output of the microwave sensor 1-125, the detecting section 1-151 determines whether the microwave sensor 1-125 has responded. As described above with reference to FIG. 22 or FIG. 24, when the microwave sensor 1-125 detects an object, it changes the level of an approach signal or a departure signal. When the level of the approach signal or the departure signal changes to be less than a predetermined threshold value, in step S1-2, the detecting section 1-151 determines that the microwave sensor 1-125 has responded.

If the detecting section 1-151 has determined in step S1-2 that the microwave sensor 1-125 has not responded, it returns to step S1-1.

If the detecting section 1-151 has determined in step S1-2 that the microwave sensor 1-125 has responded, it proceeds to step S1-3, and controls the microwave sensor 1-125 to measure the speed of the object based on the Doppler effect of reflected waves. When a speed at which the object approaches the microwave sensor 1-125 is greater than zero, the microwave sensor 1-125 determines that the object is approaching, and outputs an approach signal. Conversely, when a speed at which the object approaches the microwave sensor 1-125 is less than zero, the microwave sensor 1-125 determines that the object goes away, and outputs a departure signal.

In step S1-4, the detecting section 1-151 determines which of the approach signal and the departure signal the microwave sensor 1-125 has output.

If the detecting section 1-151 has determined in step S1-4 that the microwave sensor 1-125 has output the approach signal (the object comes close), it proceeds to step S1-5, and detects a vertical approach of the object. In other words, at this time, in step S1-1, the detecting section 1-151 has determined that the photosensors 1-124 have not responded. Thus, as described above with reference to FIG. 24, the detecting section 1-151 determines that the object is vertically approaching without horizontally moving. The detecting section 1-151 outputs, to the processing section 1-152, detection information representing "vertical approach of the object".

If the detecting section 1-151 has determined in step S1-4 that the microwave sensor 1-125 has not output the approach signal, that is, the microwave sensor 1-125 has output a departure signal (indicating that the object is going away), it proceeds to step S1-6, and detects a vertical departure of the object. At this time, in step S1-1, the detecting section 1-151 has determined that the photosensors 1-124 have not responded. Thus, similarly, the detecting section 1-151 determines that the object is vertically moving. The detecting section 1-151 outputs, to the processing section 1-152, detection information representing "vertical departure of the object".

If the detecting section 1-151 has determined in step S1-1 that the photosensors 1-124 have responded, in step S1-7, it determines whether the microwave sensor 1-125 has responded, and is on standby until it determines that the microwave sensor 1-125 has responded. If the detecting section 1-151 has determined in step S1-7 that the microwave sensor 1-125 has responded, it proceeds to step S1-B. In step S1-B, the detecting section 1-151 controls the microwave sensor 1-125 to measure the speed of the object based on the Doppler effect of reflected waves. Similarly to the case of step S1-3, when a speed at which the object approaches the microwave sensor 1-125 is greater than zero, the microwave sensor 1-125 outputs an approach signal. Conversely, when the speed at which the object approaches the microwave sensor 1-125 is less than zero, the microwave sensor 1-125 outputs a departure signal.

In step S1-9, the detecting section 1-151 determines whether it has detected the approach signal output from the microwave sensor 1-125.

If the detecting section 1-151 has determined in step S1-9 that it has detected the approach signal, it proceeds to step S1-10, and detects a horizontal approach of the object. At this time, in step S1-1, the detecting section 1-151 has determined that the photosensors 1-124 have responded. Accordingly, as described above with reference to FIG. 22, the detecting section 1-151 determines that the object is horizontally moving. The detecting section 1-151 outputs, to the processing section 1-152, detection information representing "approach of the object from the right" or "approach of the object from left".

If the detecting section 1-151 has determined in step S1-9 that it has detected the approach signal, that is, it has detected the departure signal, it proceeds to step S1-11, and detects a horizontal departure of the object. At this time, in step S1-1, the detecting section 1-151 has determined that the photosensors 1-124 have responded. Thus, similarly, the detecting section 1-151 determines that the object is horizontally moving. The detecting section 1-151 outputs, to the processing section 1-152, detection information representing "departure of the object to the right" or "departure of the object to the left".

After step S1-10 or S1-11, in step S1-12, the detecting section 1-151 determines a moving direction in which the object is moving. For example, in step S1-1, when the detecting section 1-151 determines that the left photosensor 1-124-1 has responded, and subsequently determines that the right photosensor 1-124-2 has not responded, the object is regarded as approaching the security camera 1-11 or going away from the security camera 1-11 from an oblique angle on the left side as indicated by the arrow 1-196-1 shown in FIG. 26. Accordingly, the detecting section 1-151 detects the oblique left as the object moving direction.

Figure 26:
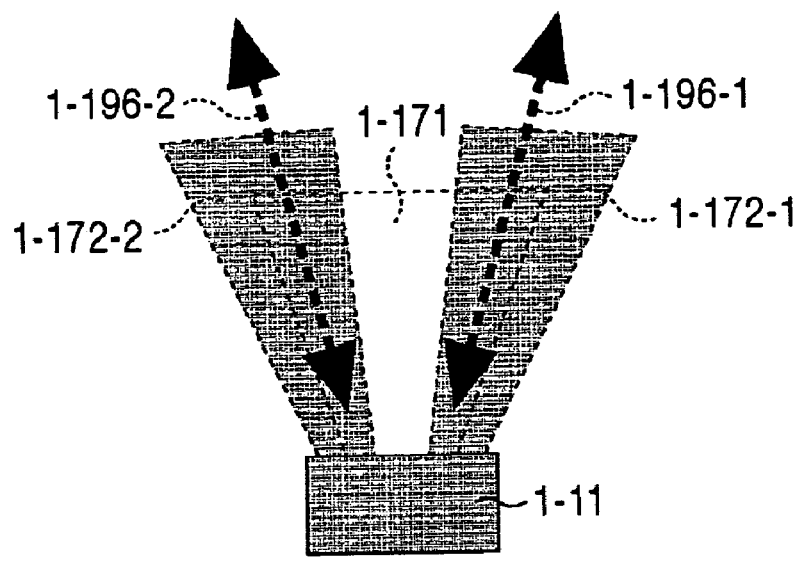
FIG. 26 is a schematic illustration of diagonally left or right approach or departure of an object.

Conversely, if, in step S1-1, the detecting section 1-151 has determined that the right photosensor 1-124-2 has responded, and has subsequently determined that the left photosensor 1-124-1 has not responded, the object is regarded as approaching the security camera 1-11 or going away from the security camera 1-11 from an oblique angle on the right side as indicated by the arrow 1-196-2 shown in FIG. 26. Accordingly, the detecting section 1-151 detects oblique right as the object moving direction.

Figure 27:
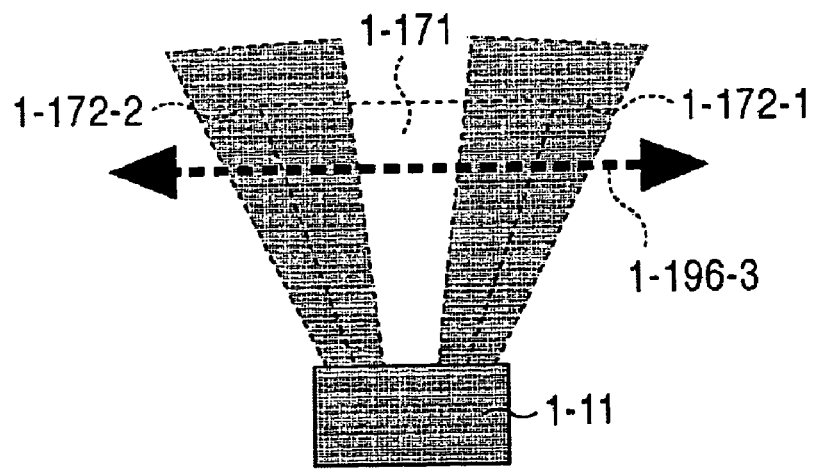
FIG. 27 is a schematic illustration of left to right movement or right to left movement of an object.

In addition, if the detecting section 1-151 has determined in step S1-1 that both photosensors 1-124-1 and 1-124-2 have responded, the object is regarded as moving in parallel in front of the security camera 1-11, as indicated by the arrows 1-196-3 shown in FIG. 27. Moreover, based on which of the photosensors 1-124-1 and 1-124-2 has first responded, the detecting section 1-151 can determine that the object is moving from right to left, or that the object is moving from left to right. Accordingly, the detecting section 1-151 detects the direction "from left to right" or the direction "from right to left" as the object moving direction.

After step S1-5, S1-6, S1-10, or S1-11, the process returns to step S1-1, and subsequent processing is repeatedly executed.

In the manner as described above, movement of the object is detected based on the detection signals from the photosensors 1-124 or the detection signal from the microwave sensor 1-125.

Figure 28:
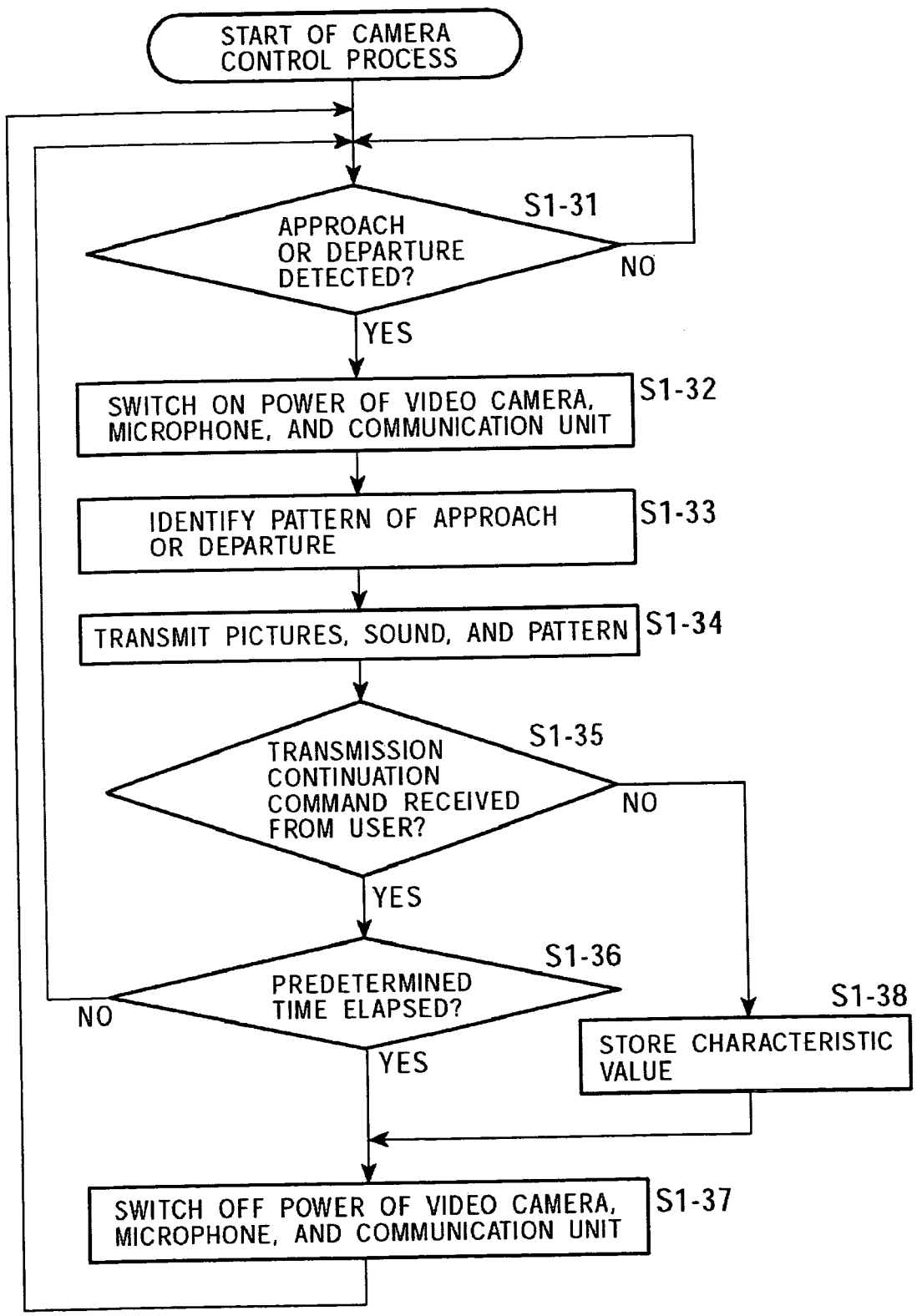
FIG. 28 is a flowchart illustrating a camera control process.

Next, a camera control process by the processing section 1-152 is described below with reference to the flowchart shown in FIG. 28.

In step S1-31, the processing section 1-152 determines whether the approach or departure is detected, and is on standby until it determines that the approach or departure is detected. As described above with reference to FIG. 25, the detecting section 1-151 outputs the detection information to the processing section 1-152. When the processing section 1-152 acquires the detection information, in step S1-31, the processing section 1-152 determines that the approach or departure is detected.

If the processing section 1-152 has determined in step S1-31 that the approach or departure is detected, it proceeds to step S1-32, and switches on the power of the video camera 1-122, the microphone 1-123, and the communication unit 1-126. This supplies power from the power supply unit 1-127 to each unit.

In step S1-33, the processing section 1-152 identifies an approach or departure pattern. At this time, identification of the approach or departure pattern is performed based on the above-described detection information. Regarding the approach and departure patterns, similarly to the detection information, for example, "vertical approach", "vertical departure", etc., may be identified. In addition, more accurate (detailed) patterns may be identified. Based on the detection information and the object speed measured by the microwave sensor 1-125 (in step S1-3 or S1-8 in FIG. 25), for example, "rapid approach from the right", "slow departure to the left", etc., may be identified.

In step S1-34, the processing section 1-152 transmits, to the receiver 1-12, through the communication unit 1-126, pictures captured by the video camera 1-122, sound collected by the microphone 1-123, and the approach or departure pattern identified in step S1-33.

In step S1-35, the processing section 1-152 determines whether it has received a transmission continuation command from a user. The pictures and sound transmitted in step S1-34 are output from the display and speaker of the receiver 1-12. The user can confirm the output pictures and sound and can command continuation of the transmission. Regarding commanding the transmission, the user inputs a command by operating an input unit (not shown) of the receiver 1-12, and the input command is transmitted and is received by the communication unit 1-126 in the security camera 1-11.

If the processing section 1-152 has determined in step S1-35 that it has received the transmission continuation command, it proceeds to step S1-36. In step S1-36, the processing section 1-152 determines whether a predetermined time (for example, 30 seconds) has elapsed. If it has determined that the time has not elapsed yet, it returns to step S1-31 and executes subsequent processing. Alternatively, if the processing section 1-152 has determined that the predetermined time has elapsed, it proceeds to step S1-37, it switches off the power of the video camera 1-122, the microphone 1-123, and the communication unit 1-126. After that, the process returns to step S1-31.

If the processing section 1-152 has determined in step S1-35 that that it has not received the transmission continuation command, it proceeds to step S1-38, and stores a characteristic value. The characteristic value may be generated based on the brightness, color difference, or motion of a picture captured by the video camera 1-122, or the frequency or the like of the sound acquired by the microphone 1-123, or may be generated based on the detection signals from the photosensors 1-124 and the detection signal from the microwave sensor 1-125.

In a case in which, in step S1-35, the processing section 1-152 has determined that it has not received the transmission continuation command from the user, the user determines that the pictures and sound do not need to be transmitted. Thus, by storing the characteristic values of the pictures and sound, and, when pictures and sound which have characteristic values close to the stored characteristic value are detected in the next time, by performing control so that the detected pictures and sound cannot be transmitted, the power consumption of the security camera 1-11 can be further reduced.

Although, in this example, in step S1-35, it is determined whether the processing section 1-152 has received the transmission continuation command from the user, in step S1-35, it may be determined whether the processing section 1-152 has received a no-transmission requiring command from the user. In this case, if it is determined in step S1-35 that the processing section 1-152 has received the no-transmission requiring command, in step S1-38, the characteristic value is stored.

In addition, in this example, if the processing section 1-152 has determined in step S1-31 that the approach or departure is detected, it switches on the power of the video camera 1-122, the microphone 1-123, and the communication unit 1-126. However, in step S1-31, the processing section 1-152 may determine whether it has acquired predetermined detection information (e.g., the "vertical approach" or the "horizontal approach"), and if it has determined that it has acquired the detection information, in step S1-32, it may switch on the power of the video camera 1-122, the microphone 1-123, and the communication unit 1-126. This can reduce power consumption.

As described above, based on the detection information from the detecting section 1-151, the video camera 1-122, the microphone 1-123, and the communication unit 1-126 are driven to transmit pictures, sound, and the approach or departure pattern to the receiver 1-12.

Although a case in which two photosensors are provided on the security camera 1-11 has been described, the number of photosensors is not limited to two.

Figure 29:
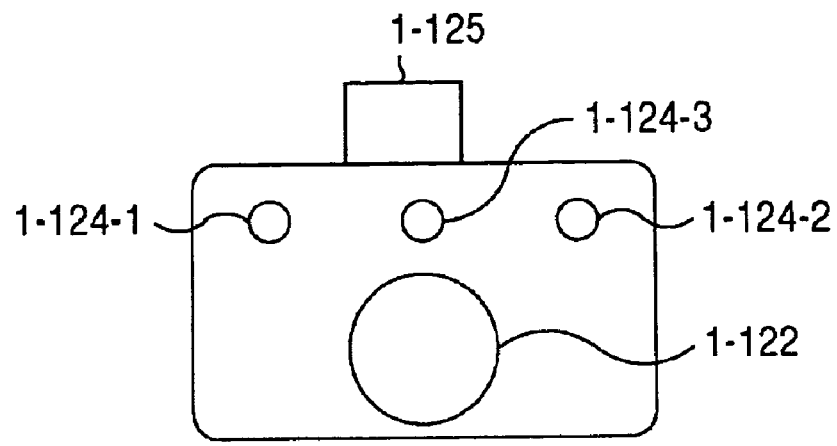
FIG. 29 is a front view showing another exterior shape of the security camera shown in FIG. 13.

FIG. 29 shows another exterior shape of the security camera 1-11. FIG. 29 corresponds to FIG. 16A, and common portions are denoted by identical reference numerals. In FIG. 29, a photosensor 1-124-3 is provided between the photosensors 1-124-1 and 1-124-2. In other words, three photosensors are provided differently from the case shown in FIG. 16A.

A state in which movement of an object is detected by three photosensors is described below with reference to FIGS. 30 to 33.

Figure 30:
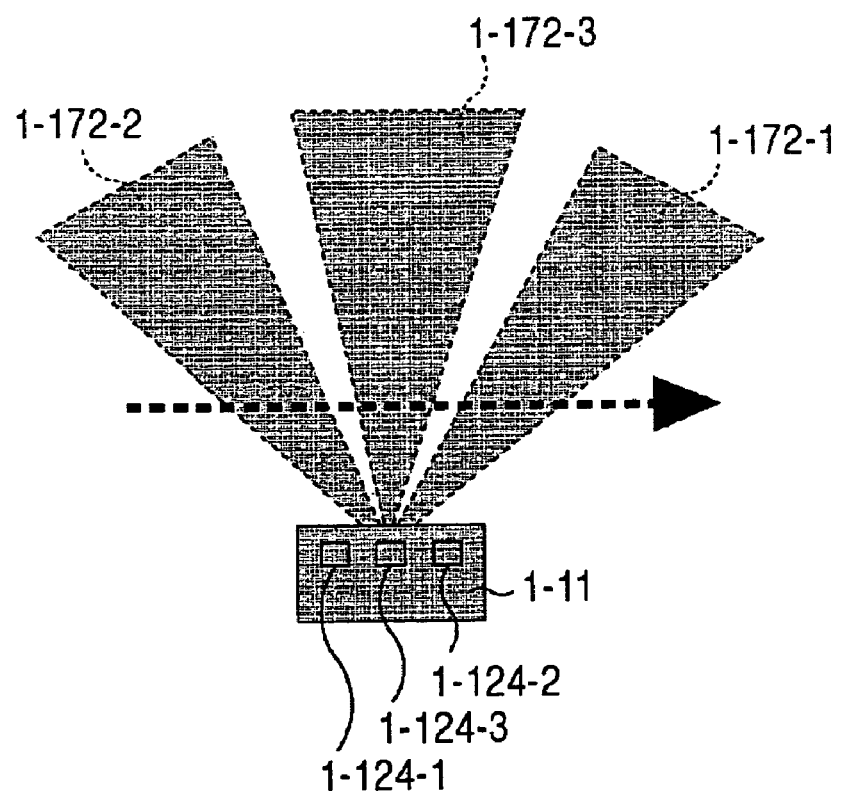
FIG. 30 is a schematic illustration of a state in which an object moving from left to right is detected by three photosensors.

Similarly to FIG. 17, FIG. 30 shows a state in which an object (not shown) horizontally moves from left to right in FIG. 30. In this case, the photosensors 1-124-1, 1-124-2, and 1-124-3 provided on the security camera 1-11 output their detection signals.

Differently from the case in FIG. 17, when the object, which moves from the left in FIG. 17, enters a region 1-172-3, the photosensor 1-124-3 detects light emitted from the object, and the level of a detection signal from the photosensor 1-124-3 changes. The operations of the photosensors 1-124-1 and 1-124-2 are similar to those in the case in FIG. 17.

Figure 31:
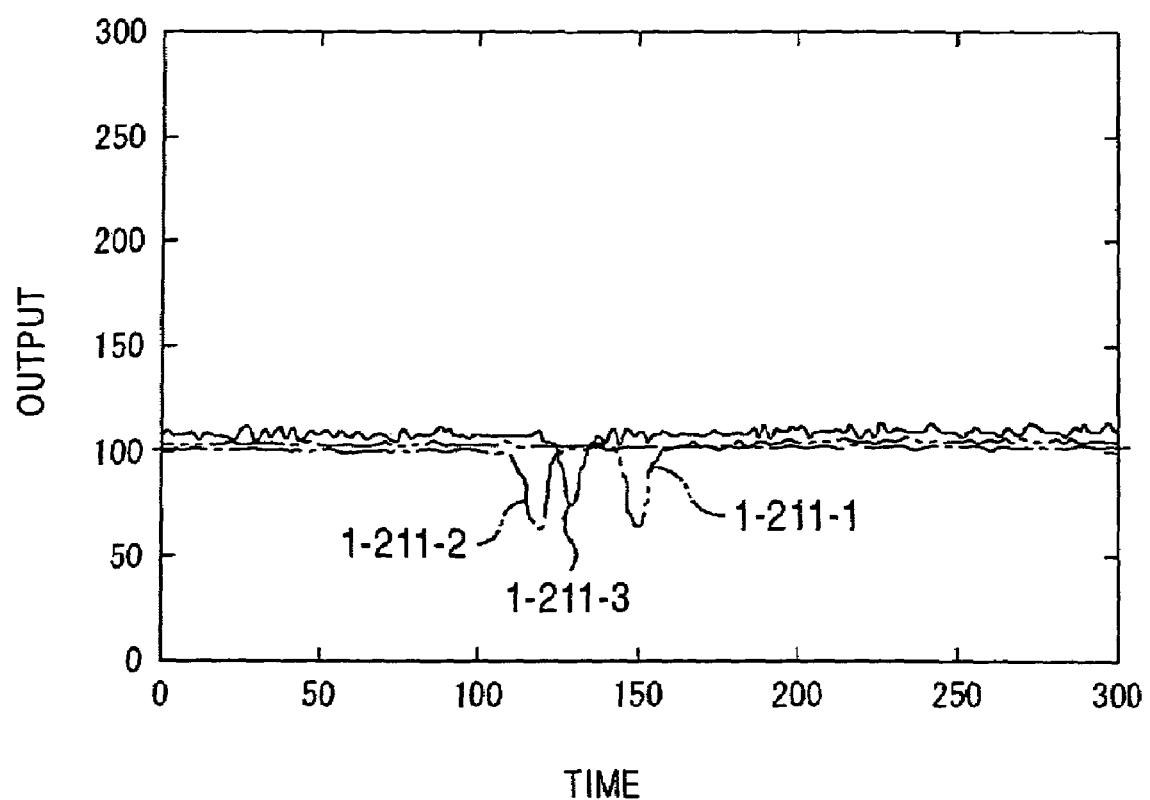
FIG. 31 is a graph showing examples of detection signals from the photosensors shown in FIG. 28.

FIG. 31 shows the waveforms of a detection signal 1-211-1 from the photosensor 1-124-1, a detection signal 1-211-2 from the photosensor 1-124-2, and a detection signal 1-211-3 from the photosensor 1-124-3, where the vertical axis indicates output and the horizontal axis indicates time.

Differently from the case in FIG. 18, when the object enters the region 1-172-3 (around the time 130 on the time axis), the level of the detection signal 1-211-3 drops to approximately 60. After that, when the object goes out of the region 1-172-3 (around the time 150 on the time axis), the level of the detection signal 1-211-3 returns to approximately 100. The waveforms of the detection signals 1-211-1 and 1-211-2 are similar to those in the case in FIG. 18, and a description thereof is omitted.

Figure 32:
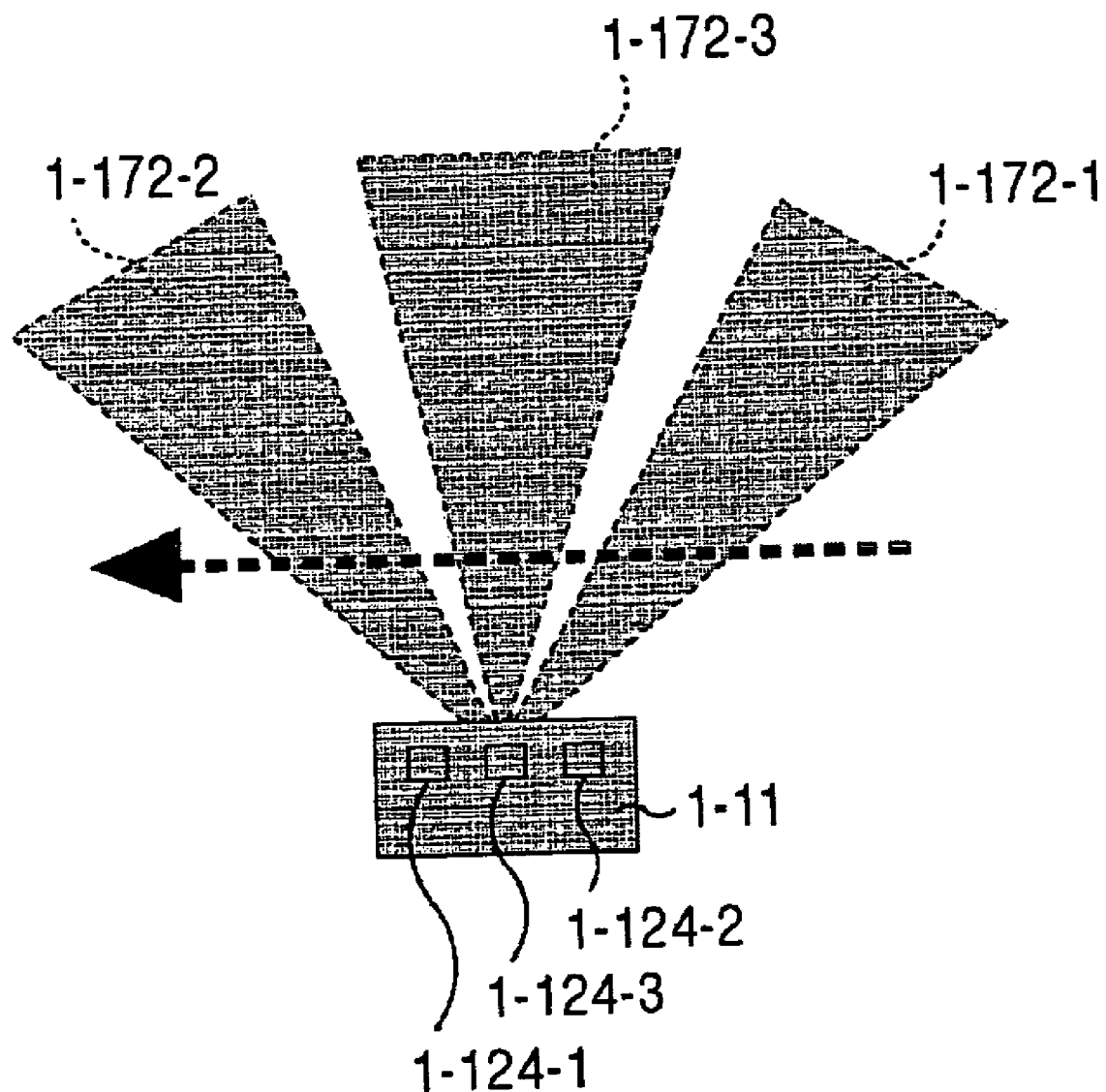
FIG. 32 is a schematic illustration of a state in which an object moving from right to left is detected by three photosensors.

Similarly to FIG. 19, FIG. 32 shows a state in which an object (not shown) horizontally moves from right to left in FIG. 32 conversely to the case in FIG. 30. In this case, the detection signals from the photosensor 1-124-1, 1-124-2, and 1-124-3 have waveforms as shown in FIG. 33.

Figure 33:
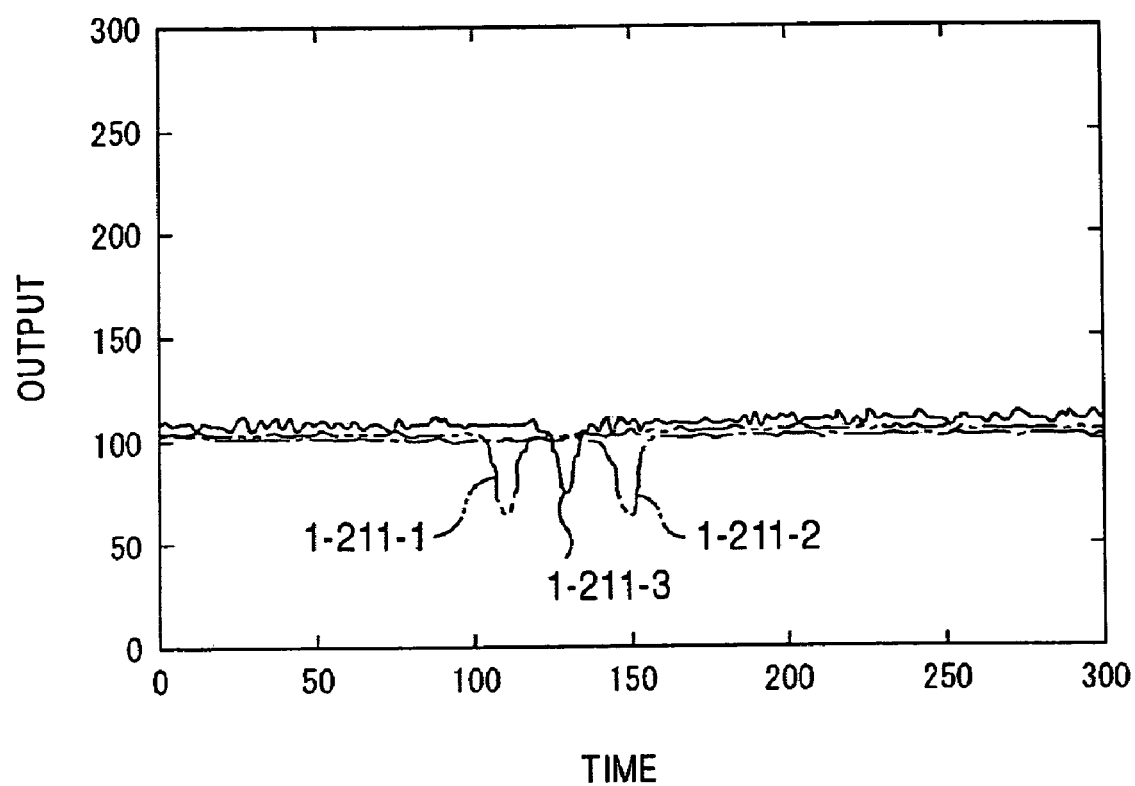
FIG. 33 is a graph showing detection signals from the photosensors shown in FIG. 32.

FIG. 33 corresponds to FIG. 20. However, differently from the case in FIG. 20, when the object enters the region 1-172-3 (around the time 130 on the time axis), the level of the detection signal 1-211-3 output from the photosensor 1-124-3 drops to approximately 60. After that, when the object goes out of the region 1-172-3 (around the time 140 on the time axis), the level of the detection signal 1-211-3 drops to approximately 100. A description of the waveforms of the detection signals 1-211-1 and 1-211-2 is omitted since the waveforms are similar to those in the case in FIG. 20.

As described above, based on the detection signals output 1-211-1 to 1-211-3 from the three photosensors 1-124-1 to 1-124-3, it can be more accurately determined whether the object has moved from left to right (from the left to the center, and from the center to the right), or whether the object has moved from right to left (from the right to the center, and from the center to the left), compared with the cases (using two photosensors) in FIGS. 17 to 20.

Next, a case in which object movement is detected by using the microwave sensor 1-125 and the photosensors 1-124-1 to 1-124-3 is described below with reference to FIGS. 34 to 37.

Figure 34:
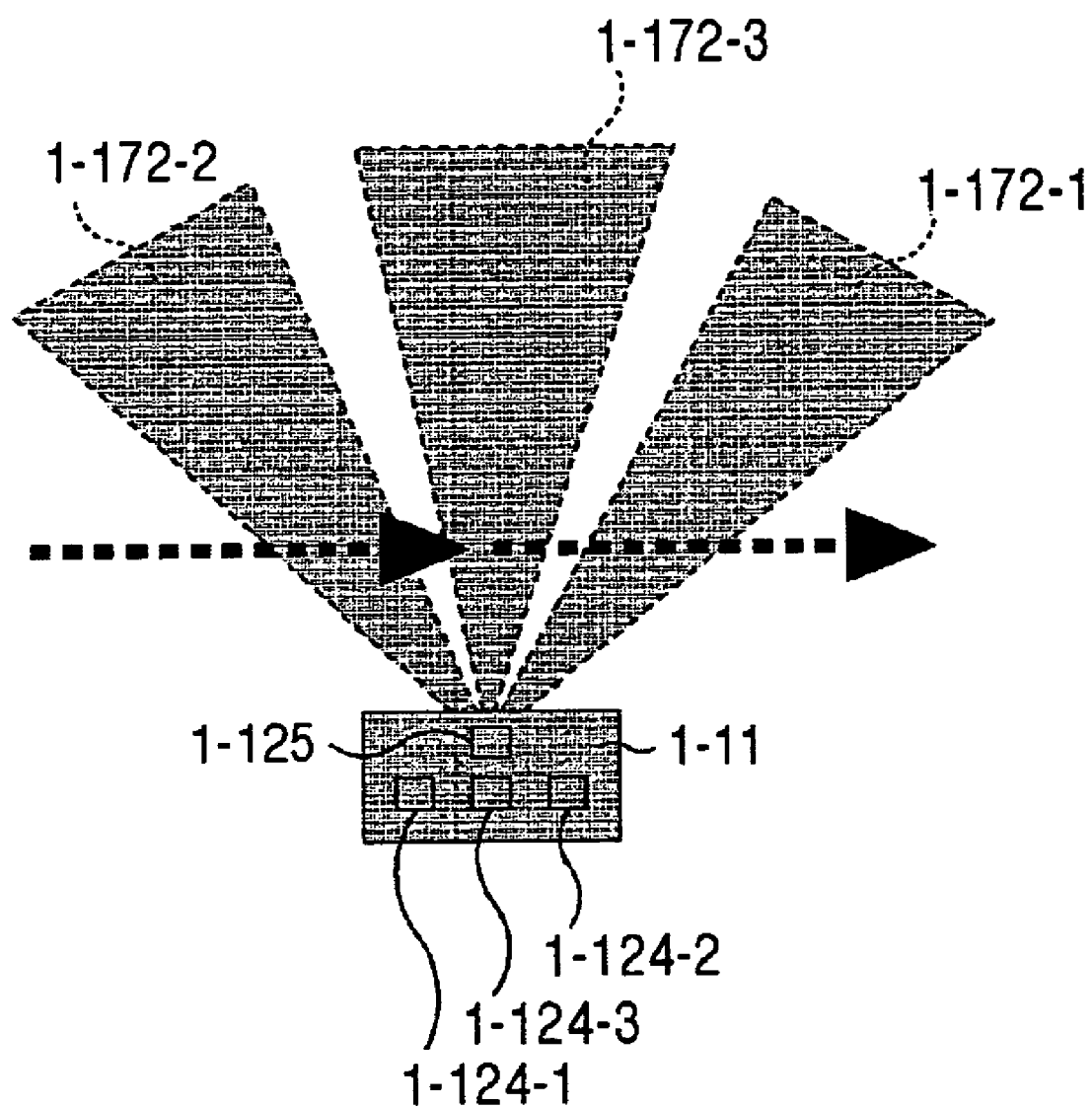
FIG. 34 is a schematic illustration of a state in which a horizontally moving object is detected by three photosensors and one microwave sensor.

Similarly to the case in FIG. 21, FIG. 34 shows a state in which an object (not shown) is moving from left to right in front of the security camera 1-11. The operations of the photosensors 1-124-1 and 1-124-2 and the microwave sensor 1-125 are similar to those in the case in FIG. 21. However, when the object enters the region 1-172-3, the level of the detection signal 1-211-3 output from the photosensor 1-124-3 changes. In this case, it is assumed that the region 1-171 of object detection by the microwave sensor 1-125 and the region 1-172-3 of object detection by the photosensor 1-124-3 are the same.

Figure 35:
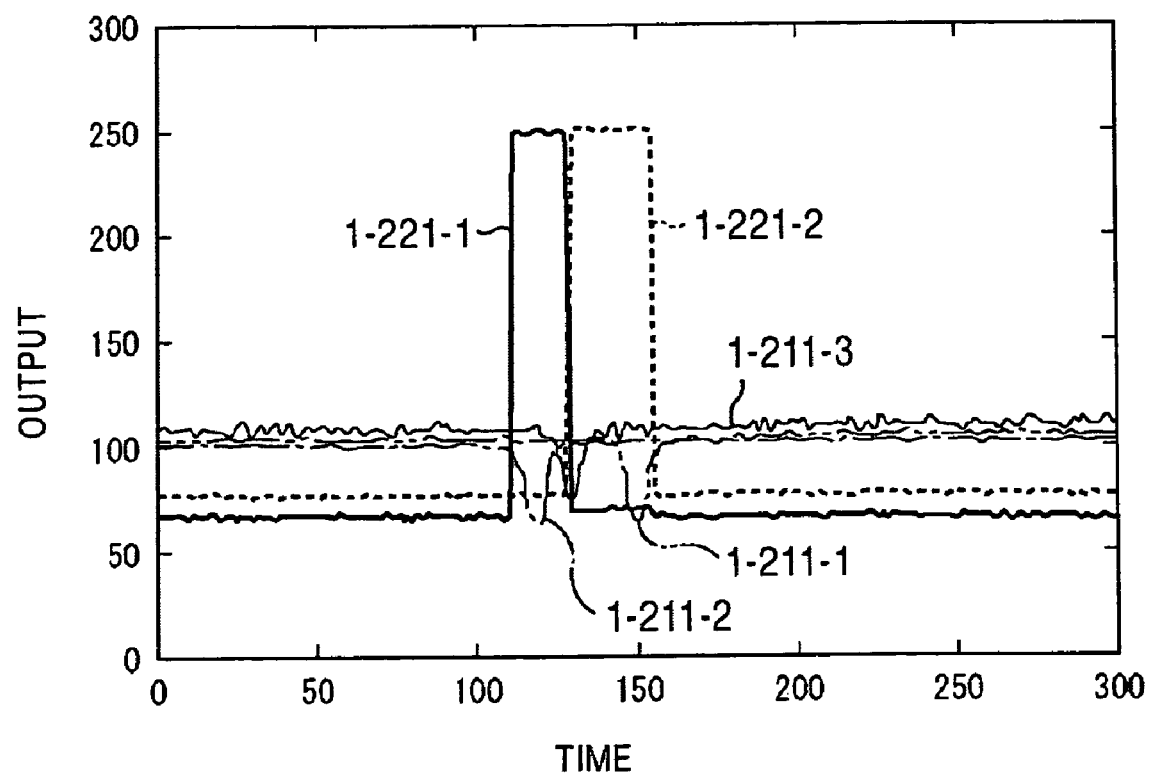
FIG. 35 is a graph showing examples of detection signals from the photosensors and microwave sensor shown in FIG. 34.

Similarly to FIG. 22, FIG. 35 shows the waveforms of the detection signal 1-211-1 from the photosensor 1-124-1, the detection signal 1-211-2 from the photosensor 1-124-2, and the detection signal from the photosensor 1-124-3, and shows, at the same time, the waveforms of the approach signal 1-221-1 and departure signal 1-221-2 from the microwave sensor 1-125, where the vertical axis indicates output and the horizontal axis indicates time.

A description of the detection signals 1-211-1 and 1-211-2, the approach signal 1-221-1, and the departure signal 1-221-2 is described since motions of these signals are similar to those in the case in FIG. 22. However, differently from the case in FIG. 22, when the object reaches the vicinity of the center of the region 1-172-3 (171) (around the time 130 on the time axis), the level of the detection signal 1-211-3 output from the photosensor 1-124-3 drops to approximately 60.

As a result, compared with the case (using two photosensors) in FIG. 22, it can be more accurately determined that the object reaches the center in front of the security camera 1-11.

Figure 36:
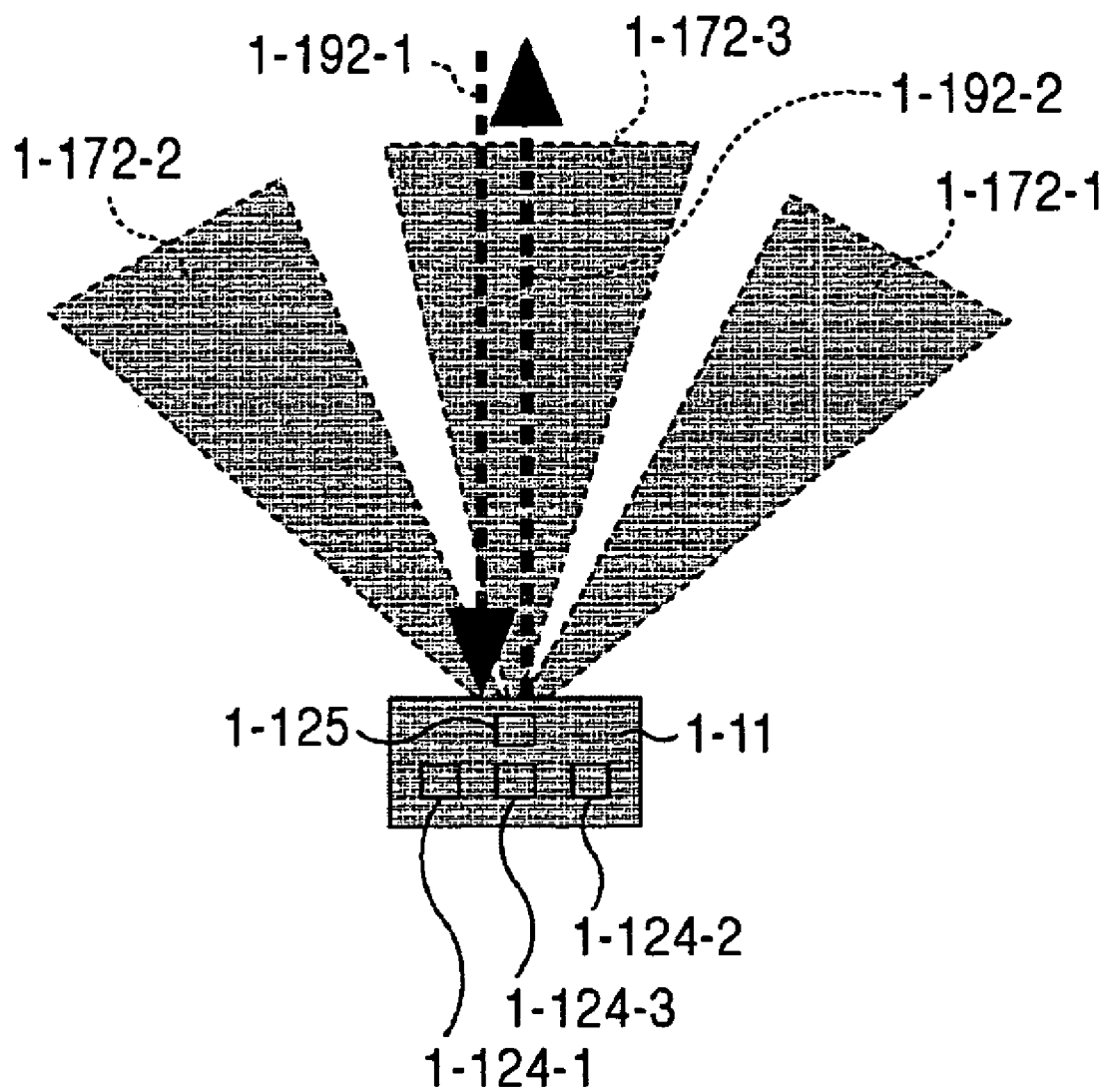
FIG. 36 is a schematic illustration of a state in which a vertically moving object is detected by three photosensors and one microwave sensor.

Similarly to FIG. 23, FIG. 36 shows a state in which, after an object (not shown) vertically approaches the security camera 1-11 along the arrow 1-192-1 shown in FIG. 36, it goes away from the security camera 1-11 along the arrow 1-192-2.

Figure 37:
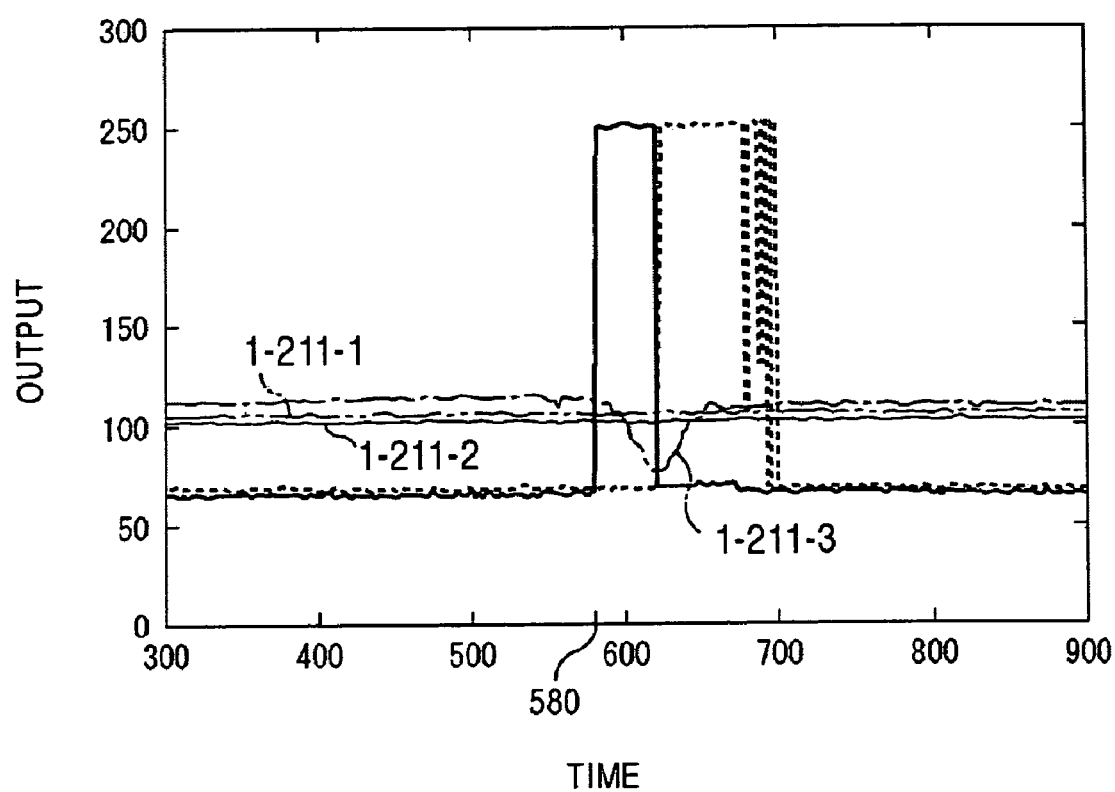
FIG. 37 is a graph showing detection signals from the photosensors and microwave sensor shown in FIG. 36.

The waveforms of the detection signals 1-211-1, 1-211-2, and 1-211-3, the approach signal 1-221-1, and the departure signal 1-221-2 are as shown in FIG. 37. FIG. 37 corresponds to FIG. 24. However, differently from the case in FIG. 24, when the object enters the region 1-172-3 (around the time 580 to the time 700 on the time axis), the level of the detection signal 1-211-3 output from the photosensor 1-124-3 changes. This makes it possible to more accurately determine an approach or departure of the object compared with the case (using two photosensors) in FIG. 24. For example, by measuring the level of the detection signal 1-211-3, it can be accurately determined how far the object has come close or gone away.

The above-described consecutive processing may be implemented by either hardware or software. In the case of using software to execute the above-described consecutive processing, programs constituting the software are installed from a network or a recording medium into a computer built into dedicated hardware or a multipurpose personal computer as shown in, for example, FIG. 38, in which various functions can be executed by installing various programs.

Figure 38:
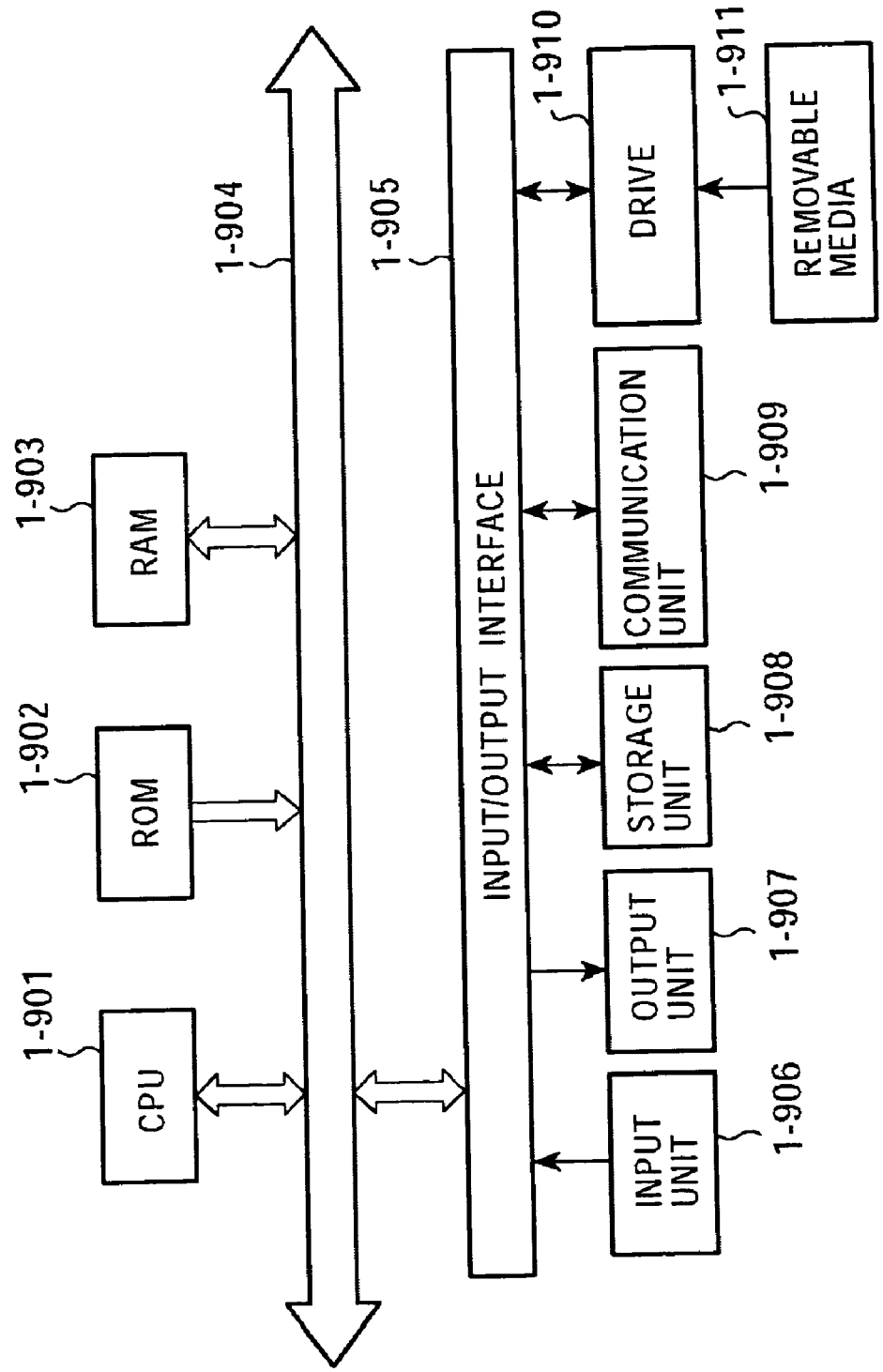
FIG. 38 is a block diagram showing a personal computer.

In FIG. 38, a central processing unit (CPU) 1-901 executes various processes in accordance with programs stored in a read-only memory (ROM) 1-902, or programs loaded from a storage unit 1-908 into a random access memory (RAM) 1-903. The RAM 1-903 stores the data required for the CPU 1-901 to execute various processes, etc., if required.

The CPU 1-901, the ROM 1-902, and the RAM 1-903 are connected to one another through a bus 1-904. The bus 1-904 also connects to an input/output interface 1-905.

The input/output interface 1-905 connects to an input unit 1-906 including a keyboard and a mouse, an output unit 1-907 including a cathode ray tube (CRT) and a liquid crystal display (LCD), a storage unit 1-908 including a hard disk, and a communication unit 1-909 including a modem and a terminal adapter. The communication unit 1-909 performs communication processing through a network such as the Internet.

The input/output interface 1-905 also connects to a drive 1-910, if required. In the drive 1-910, for example, removal media 1-911 is loaded as a recording medium having a program of the present invention recorded thereon. A computer program read from the recording medium is installed into the storage unit 1-908, if required.

A second embodiment of the present invention is described below with reference to the accompanying drawings.

Figure 39:
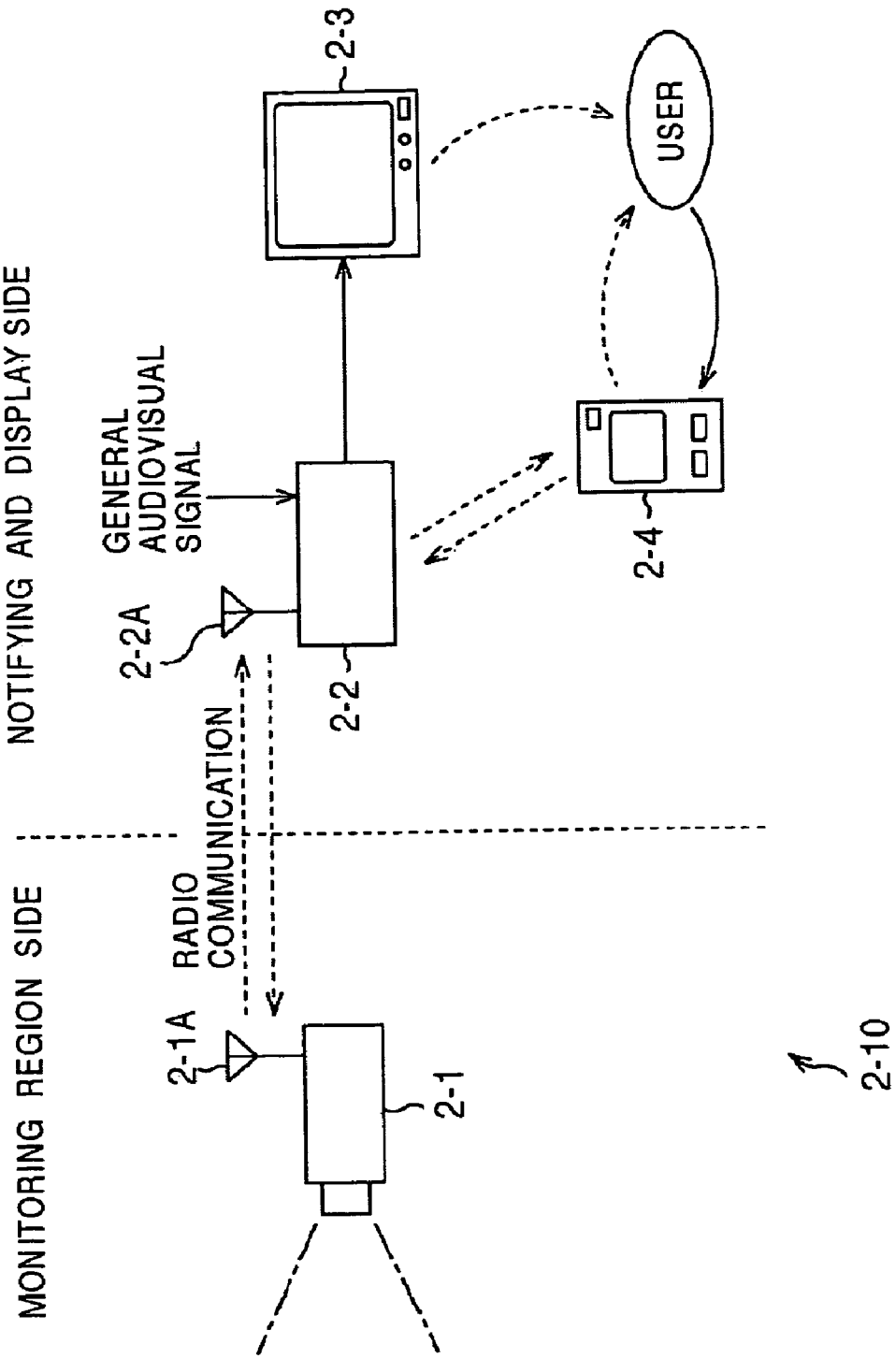
FIG. 39 is a block diagram showing a monitoring system to which the present invention is applied.

FIG. 39 is an example block diagram showing the configuration of a monitoring system 2-10 to which the present invention is applied. In this configuration of the monitoring system 2-10, the monitoring region side on the left shown in FIG. 39 includes a multi-sensor camera unit 2-1, and the notifying and displaying side on the right shown in FIG. 39 includes a processing box 2-2, a display unit 2-3, and a remote controller 2-4 for remote-controlling the processing box 2-2. The multi-sensor camera unit 2-1 and the processing box 2-2 uses radio antennas 2-1A and 2-2A to perform radio communication with each other. The processing box 2-2 and the remote controller 2-4 perform radio communication or infrared communication with each other. The processing box 2-2 and the display unit 2-3 are connected to each other by a wire, such as a bus, or by radio. The communication between the multi-sensor camera unit 2-1 and the processing box 2-2 is not limited to radio communication, but may be wired communication.

Figure 40:
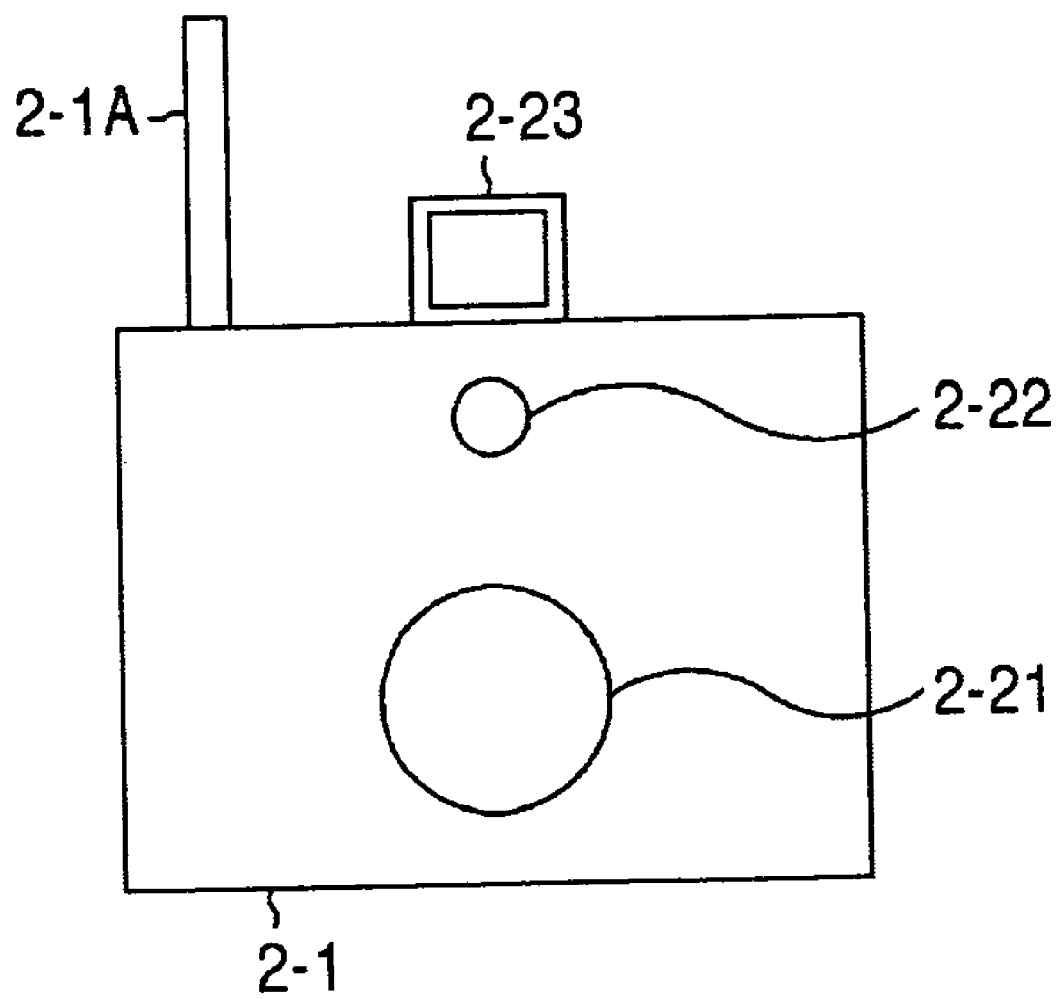
FIG. 40 is an exterior view showing a multi-sensor camera unit.

The multi-sensor camera unit 2-1 is installed in a region (necessary place) in which an event needs to be monitored. As shown in, for example, FIG. 40, the multi-sensor camera unit 2-1 has a charge coupled device (CCD) camera 2-21, a photosensor 2-22, and a microwave sensor 2-23. These sensors are driven by a battery (not shown).

The CCD camera 2-21 captures pictures of a situation in a monitoring region (angle of view), as required. The details are described later. Based on an event 2-I detected by the photosensor 2-22 and the microwave sensor 2-23, the multi-sensor camera unit 2-1 determines to notify a user of event data. If the multi-sensor camera unit 2-1 has determined to notify the user of the event data, it transmits picture data (event data) 2-G captured by the CCD camera 2-21 to the processing box 2-2.

Figure 41:
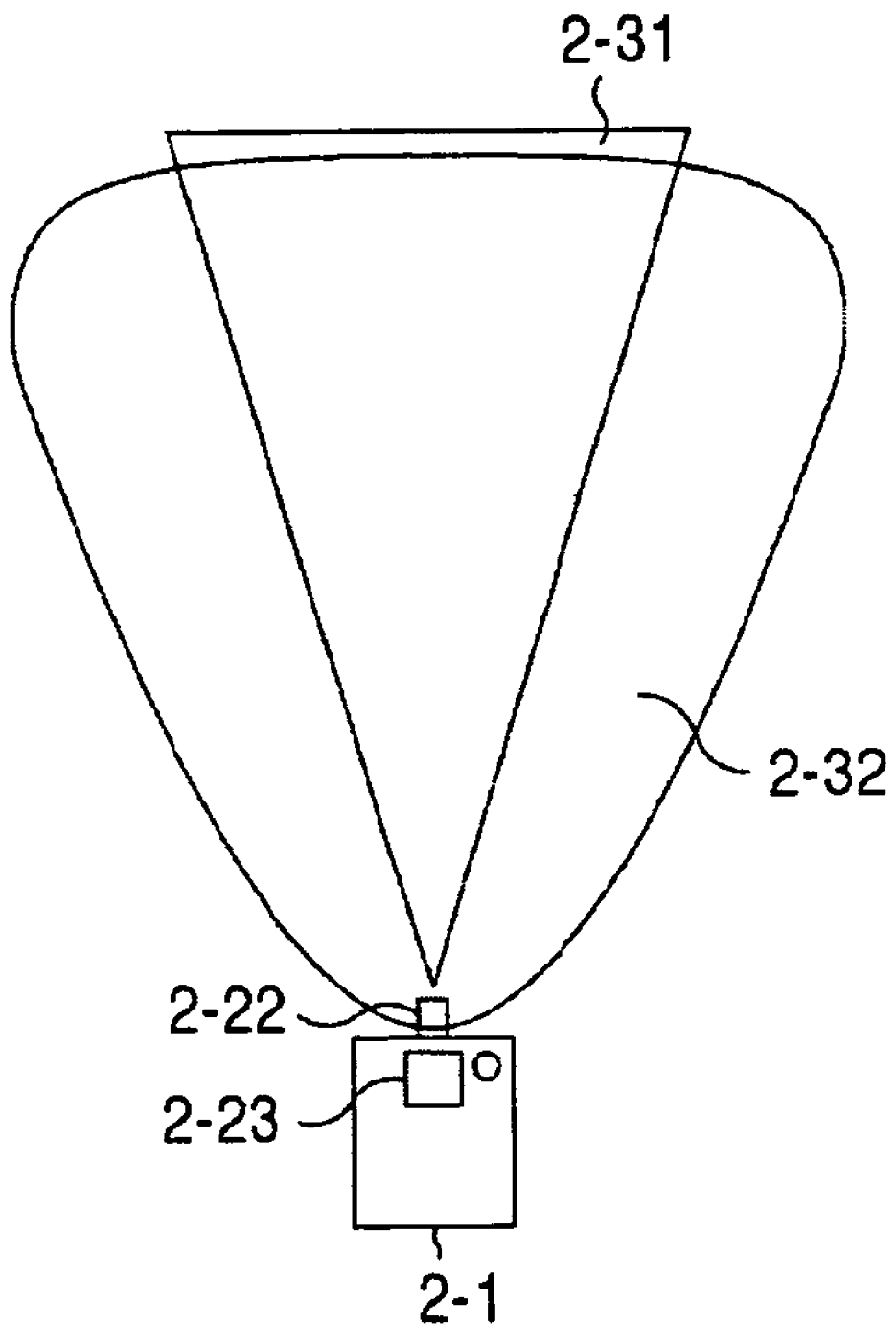
FIG. 41 is a schematic illustration of monitoring regions of a photosensor and a microwave sensor.

As FIG. 41 shows, the photosensor 2-22 outputs, as a detection signal, an average brightness in a region 2-31 which can be monitored by the photosensor 2-22. The output changes in response to a state in which a person enters or leaves the region 2-31.

The microwave sensor 2-23 generates microwaves. As shown in FIG. 41, the microwave sensor 2-23 emits the microwaves in a region 2-32 which can be monitored by the microwave sensor 2-23. By detecting reflected waves generated such that the microwaves are reflected by a person (to be monitored) after impinging on the person, the microwave sensor 2-23 generates a detection signal indicating that the reflected waves are ahead of a reference phase, or that the reflected waves are behind the reference phase. This lead and lag in phase are caused by the Doppler effect, and correspond to an approach or departure of an object. The region 2-31 which can be monitored by the photosensor 2-22 and the region 2-32 which can be monitored by the microwave sensor 2-23 are simply referred to as the "monitoring region 2-31" and the "monitoring region 2-32", respectively. In the case shown in FIG. 41, the monitoring region 2-31 of the photosensor 2-22 is narrower in region (angle of view) than the monitoring region 2-32 of the microwave sensor 2-23.

Referring back to FIG. 39, if the multi-sensor camera unit 2-1 has determined to notify the use of the event data, it uses a radio antenna 2-1A to transmit, to the processing box 2-2, the data required for displaying the event.

The processing box 2-2 uses the radio antenna 2-2A to receive the data required for displaying the event which is transmitted from the multi-sensor camera unit 2-1. Based on the received data, the processing box 2-2 creates display pictures and sound, and supplies or transmits the created pictures and sound to the display unit 2-3 and the remote controller 2-4. This displays the event.

The display unit 2-3 is, for example, an ordinary television receiver. When no event has occurred (in an ordinary case), the display unit 2-3 displays pictures based on a general audiovisual signal (broadcasting signal). When an event has occurred, the display unit 2-3 displays pictures in picture-in-picture form in which an event picture signal is inserted in part of the general audiovisual signal. The display unit 2-3 is not limited to a television receiver, but may be a dedicated monitor. In addition, the displayed picture is not of the picture-in-picture type, but may be an entire screen picture.

For the event displayed on the display unit 2-3, the user determines. Based on the determination, various commands can be input from the remote controller 2-4. For example, when the user needs to be notified from then onward of an event which will occur, the user may input that determination by operating an OK button (not shown). When the user does not need to be notified from then onward of an event which will occur, the user may input that determination by operating an NG button (not shown). Based on this determination input, a notification determination table (described later) which is created in the processing box 2-2 and which is used in determining whether to notify the user of the event changes with time. Thus, whenever the user uses the monitoring system 2-10, only an event designated by the user is detected and the user is notified of the event.

The CCD camera 2-21 of the multi-sensor camera unit 2-1 operates only if it is determined that the event is to be communicated, so that unnecessary power consumption can be reduced.

FIG. 42 is a functional block diagram showing the monitoring system 2-10 shown in FIG. 39.

The CCD camera 2-21 of the multi-sensor camera unit 2-1 captures pictures of a situation in the monitoring range, as required, and supplies a picture signal as notification picture data to the a transmitting unit 2-45 through a switch 2-44.

The photosensor 2-22 supplies, as photosensor data, an average brightness in the monitoring region 2-31 to a state description unit 2-41.

Here, the principle of the photosensor 2-22 is described below with reference to FIGS. 43A and 43B to FIG. 45.

FIG. 43B is an illustration of a detection signal output by the photosensor 2-22.

FIG. 43A is a schematic illustration of a state in which a person 2-71 enters and leaves the monitoring region 2-31 by the photosensor 2-22. The photosensor 2-22 always outputs the average brightness in the monitoring region 2-31, as the detection signal. Accordingly, as shown in FIG. 43A, when the person 2-71 acts, the output detection signal (2-81) correspondingly changes. In the graph shown in FIG. 43B, the vertical axis indicates the output level of the detection signal output by the photosensor 2-22, and the horizontal axis indicates time. In addition, reference value L is an output level of the detection signal output by the photosensor 2-22 when the person 2-71 does not enter the monitoring region 2-31. Reference value L corresponds to the average brightness of a background. In this case, the level of the detection signal 2-81 output by the photosensor 2-22 gradually increases as the person 2-71 enters the monitoring region 2-31, and gradually decreases as the person 2-71 leaves the monitoring region 2-31.

The detection signal 2-81 in FIG. 43B indicates a characteristic in a case in which the output level of the average brightness for the person 2-71 is higher than reference value L (an average brightness for the background). When the output level of the average brightness for the person 2-71 is lower than reference value L, the level of the detection signal 2-81 negatively changes.

Figure 44B:
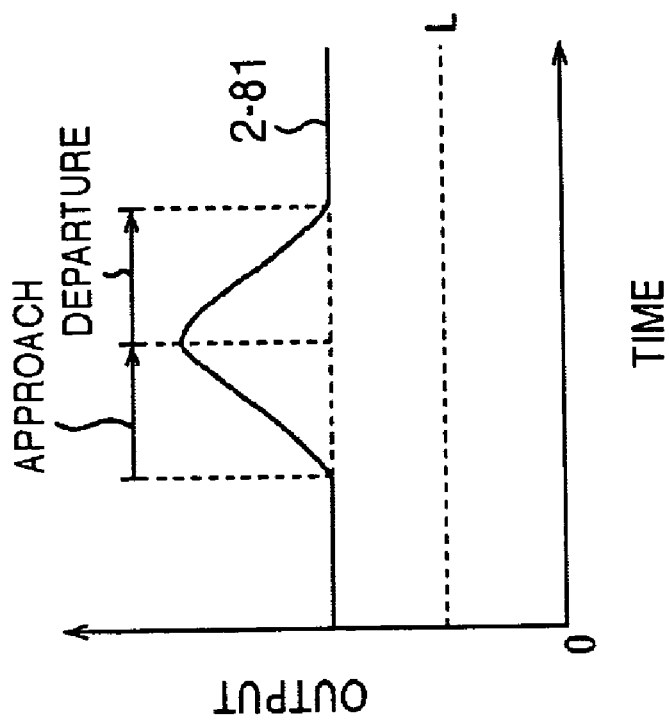
FIGS. 44A and 44B are a schematic illustration and graph of another example of the detection signal output by a photosensor.
Figure 44A:
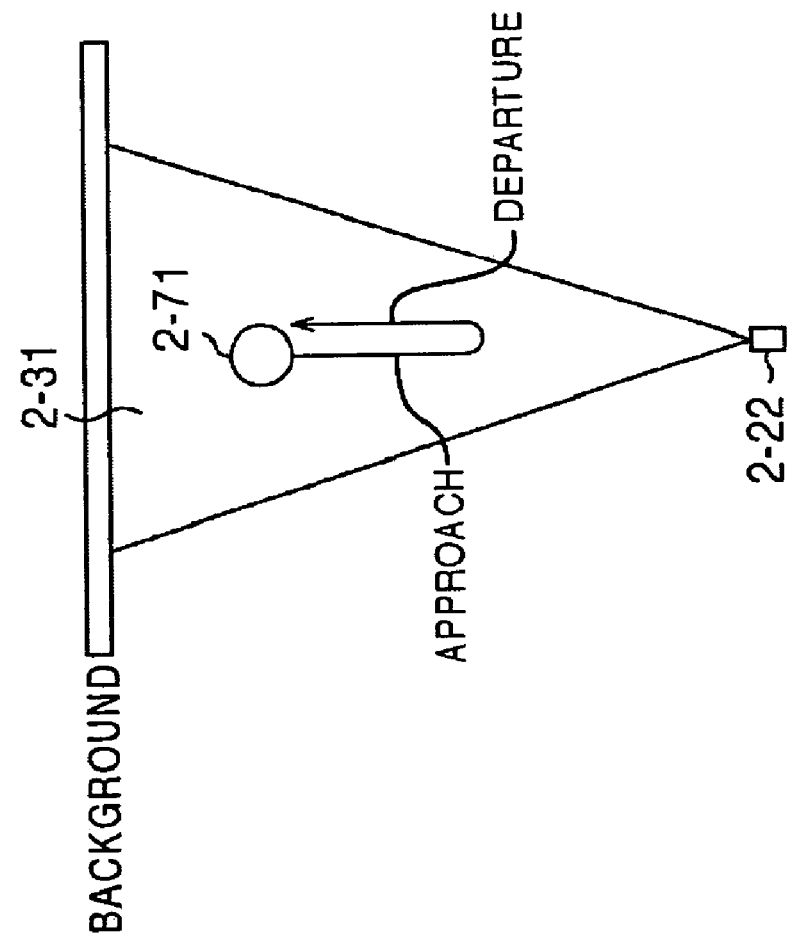

FIGS. 44A and 44B are illustrations of another example the detection signal output by the photosensor 2-22.

FIG. 44A schematically shows a state in which, as the arrow indicates, in the monitoring region 2-31 by the photosensor 2-22, the person 2-71 approaches the photosensor 2-22 and subsequently goes away from the photosensor 2-22. As described above, the photosensor 2-22 always outputs, as the detection signal 2-81, the average brightness in the monitoring region 2-31. Accordingly, when the person 2-71 acts as shown in FIG. 44A, the detection signal 2-81 output by the photosensor 2-22 correspondingly changes as shown in, for example, FIG. 44B. In this case, as the person 2-71 approaches the photosensor 2-22, the level of the detection signal 2-81 output by the photosensor 2-22 gradually increases, and as the person 2-71 goes away from the photosensor 2-22, the level of the detection signal 2-81 gradually decreases. In addition, in a state in which the person 2-71 enters the monitoring region 2-31, the person 2-71 approaches the photosensor 2-22 and goes away from the photosensor 2-22. Thus, the level of the detection signal 2-81 shown in FIG. 44B is higher than that shown in FIG. 43B.

As described above, the detection signal 2-81 shown in FIG. 44B indicates a characteristic obtained when the output level of the average brightness for the person 2-71 is higher than reference value L. Accordingly, when the output level of the average brightness for the person 2-71 is lower than reference value L, the output detection signal 2-81 negatively changes, as described above.

As shown in FIGS. 43A and 43B, and 44A and 44B, in response to actions of the person 2-71, fixed characteristics appear in level change of the detection signal 2-81 output by the photosensor 2-22 and in the direction of change (i.e., the direction in which the level of the detection signal 2-81 gradually increases or a direction in which the level of the detection signal 2-81 decreases). Therefore, by paying attention to the level change of the detection signal 2-81 output by the photosensor 2-22 and the direction of change, it can be approximately estimated how the person 2-71 acts in the monitoring region 2-31.

FIG. 45 is a graph showing the relationship between a change in level of the detection signal 2-81 output by the photosensor 2-22 and an action of the person 2-71.

In FIG. 45, a response interval 2-X is an interval (time) in which the level of the detection signal 2-81 output by the photosensor 2-22 changes from the reference value L, and represents the presence of the person 2-71 in the monitoring region 2-31. In the response interval 2-X, an interval 2-A in which the level of the output detection signal 2-81 changes so as to depart from the reference value L (although, in the example shown in FIG. 45, the detection signal 2-81 departs in a positive direction, this example includes a case in which the detection signal 2-81 departs in a negative direction) indicates that the person 2-71 has entered the monitoring region 2-31, or that the person 2-71 approaches the photosensor 2-22 in the monitoring region 2-31. An interval 2-B in which the level of the detection signal 2-81 does not change indicates that the person 2-71 is inactive (stationary). An interval 2-C in which the level of the detection signal 2-81 changes so as to come close to reference value L (although, in the example shown in FIG. 45, the level of the detection signal 2-81 approaches the negative direction, this example includes a case in which the level of the detection signal 2-81 approaches the positive direction) indicates that the person 2-71 has left the monitoring region 2-31, or that the person 2-71 departs from the photosensor 2-22 in the monitoring region 2-31.

As described above, in response to changes in level of the detection signal 2-81 output by the photosensor 2-22, and directions of the changes, an action of the person 2-71 in the monitoring region 2-31 can approximately be estimated.

Referring back to FIG. 42, the microwave sensor 2-23 emits microwaves in the monitoring region 2-32 (in FIG. 41), and supplies, as microwave sensor data, a detection signal representing an approach response and a detection signal representing a departure response to the state description unit 2-41.

Next, the principle of the microwave sensor 2-23 is described below with reference to FIGS. 46 to 49.

FIGS. 46 to 49 illustrate an example of a detection signal output by the microwave sensor 2-23.

Figure 46:
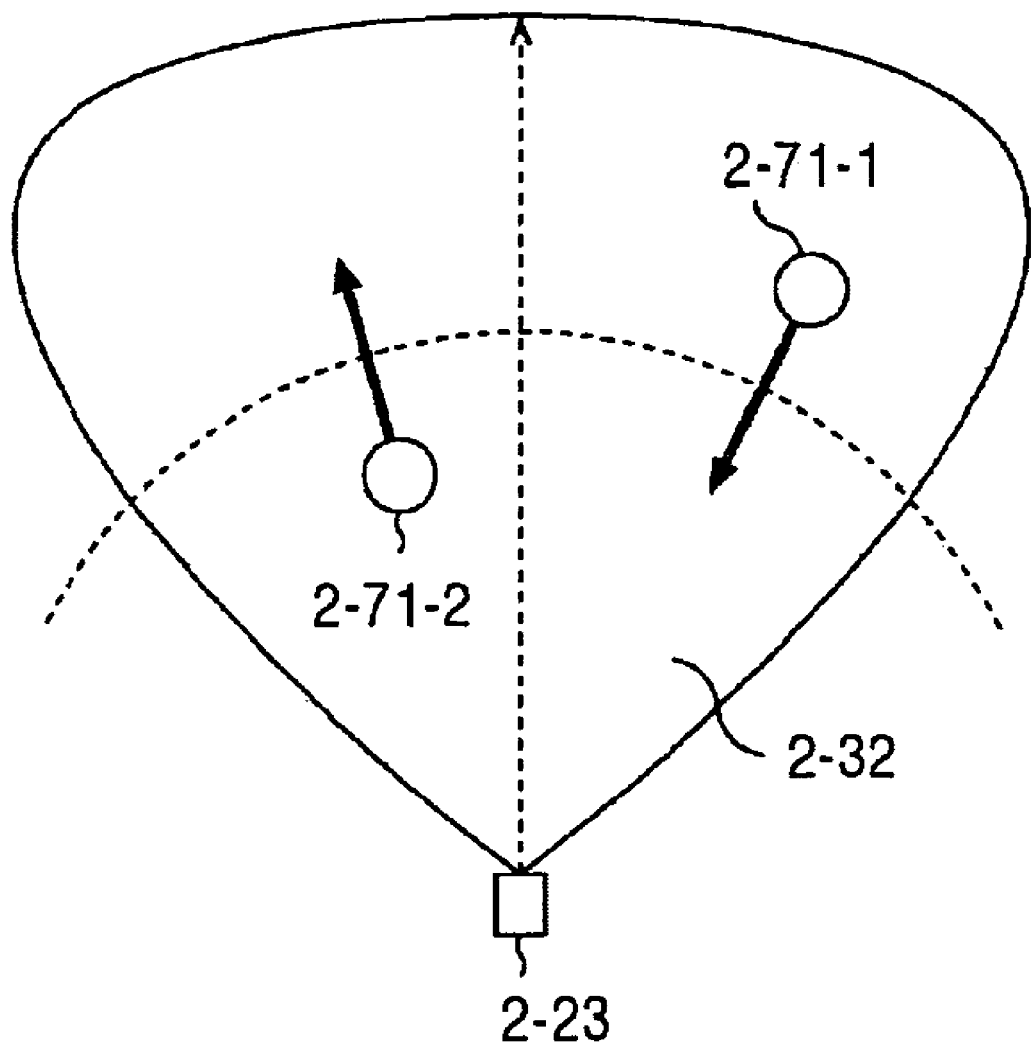
FIG. 46 is a schematic illustration of an example of a detection signal output by a microwave sensor.
Figure 47A:
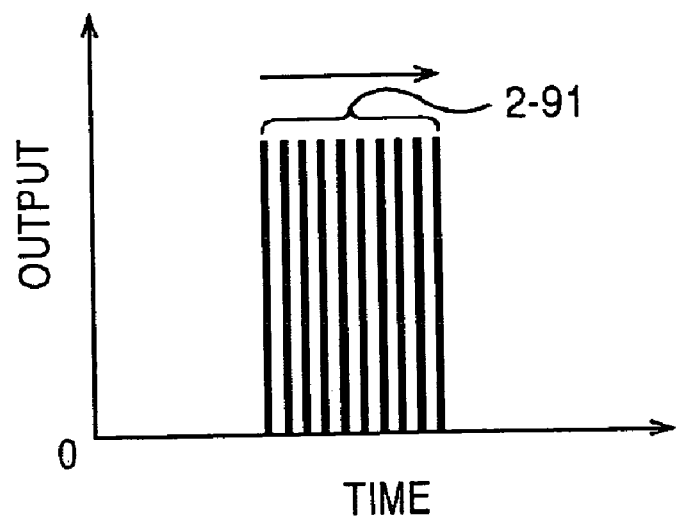
FIGS. 47A and 47B are graphs showing examples of detection signals output by a microwave sensor.
Figure 47B:
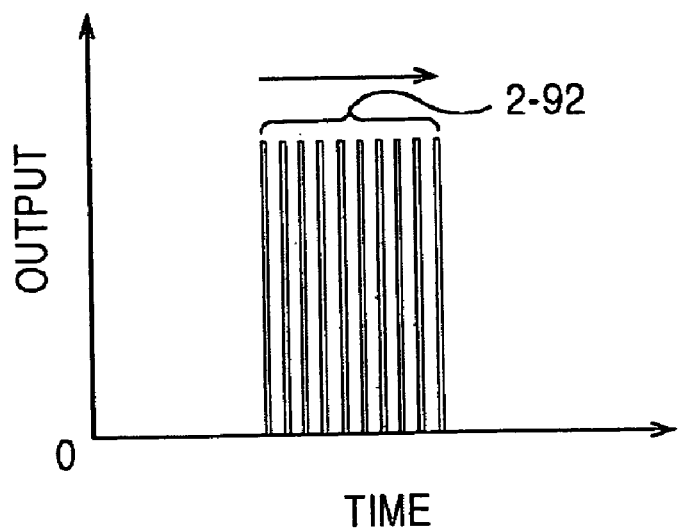

FIG. 46 schematically shows a state in which, in the monitoring region 2-32 by the microwave sensor 2-23, as the arrows indicate, a person 2-71-1 approaches the microwave sensor 2-23, and a person 2-71-2 goes away from the microwave sensor 2-23. In the monitoring region 2-32, microwaves are always emitted by the microwave sensor 2-23. As shown in FIG. 46, when the person 2-71-1 acts to vertically come close to a circumference around the microwave sensor 2-23, the microwave sensor 2-23 correspondingly outputs a detection signal 2-91 representing an approach response as shown in, for example, FIG. 47A. Also, when the person 2-71-2 acts to vertically go away from the microwave sensor 2-23, the microwave sensor 2-23 correspondingly outputs a detection signal 2-92 representing a departure response as shown in, for example, FIG. 47B. In each of FIGS. 47A and 47B, the vertical axis indicates the level of each detection signal output by the microwave sensor 2-23, and the horizontal axis indicates time. Both detection signals 2-91 and 2-92 are binary outputs.

Figure 48B:
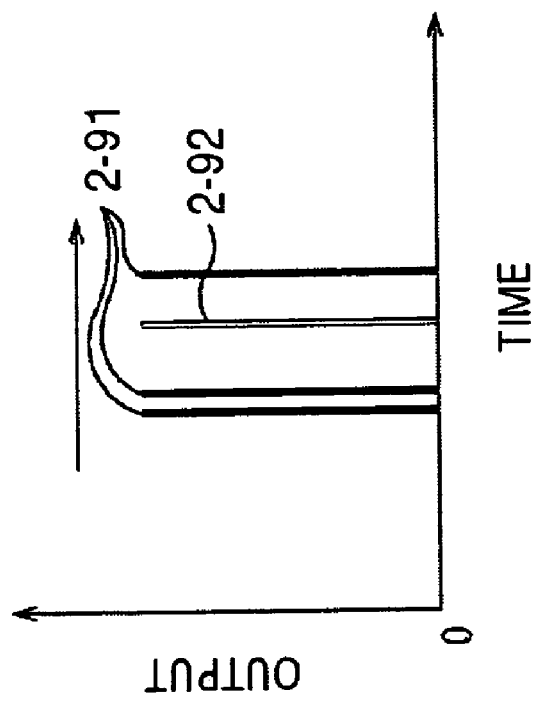
FIGS. 48A and 48B are a schematic illustration and graph of other examples of the detection signals output by the microwave sensor.
Figure 48A:
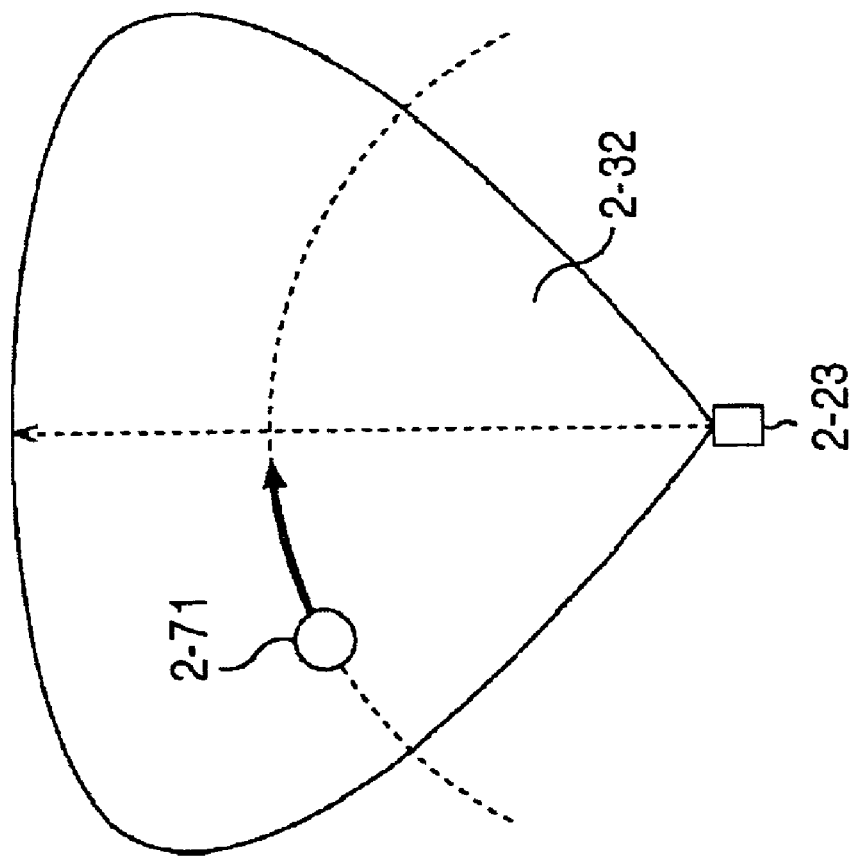

FIGS. 48A and 48B illustrate other detection signals output by the microwave sensor 2-23.

FIG. 48A schematically shows a state in which, in the monitoring region 2-32 by the microwave sensor 2-23, the person 2-71 is acting in the direction indicated by the arrow on a circumference around the microwave sensor 2-23. As described above, the microwave sensor 2-23 always emits microwaves in the monitoring region 2-32. As shown in FIG. 48A, when the person 2-71 acts on the circumference around the microwave sensor 2-23, the microwave sensor 2-23 correspondingly outputs detection signals as shown in, for example, FIG. 48B. In this case, a detection signal 2-91 representing an approach response and a detection signal 2-92 representing a departure response are irregularly output (unstable response signals are output).

FIGS. 49A and 49B illustrate other detection signals output by the microwave sensor 2-23.

FIG. 49A schematically shows a state in which, in the monitoring region 2-32 by the microwave sensor 2-23, as the arrow indicates, the person 2-71 is acting in parallel to a tangent to the circle. As described above, the microwave sensor 2-23 always emits microwaves in the monitoring region 2-32. As shown in FIG. 49A, when the person 2-71 acts in the neighborhood of the tangent to the circle around the microwave sensor 2-23, the microwave sensor 2-23 correspondingly outputs detection signals as shown in, for example, FIG. 49B. In this case, at a position D (corresponding to reference alphabet "a" in FIG. 49B) prior to a tangent 2-S on the circumference, a detection signal 2-91 representing an approach response d is output by the microwave sensor 2-23. At a position E (corresponding to reference alphabet "b" in FIG. 49B) in the neighborhood of a tangent 2-S on the circumference, both the detection signal 2-91 representing the approach response, and a detection signal 2-92 representing a departure response f are output by the microwave sensor 2-23 (a detection signal representing an unstable response e is output). In addition, at a point F (corresponding to reference alphabet "c" in FIG. 49B) posterior from the tangent 2-S on the circumference, the detection signal 2-92 representing the departure response f is output.

As the person 2-71 goes away from the tangent 2-S on the circumference, the detection signal output by the microwave sensor 2-23 comes to represent an unstable response and finally represents no response, although this is not shown.

In the case of observing each detection signal output by the microwave sensor 2-23 in a short time, the reliability is low. For example, if a detection signal represents an approach response, the type of the detection signal cannot be distinguished, that is, it cannot be determined that the detection signal is output in response to a part of an action of a stable approach, or that the detection signal is output in response to a part of an unstable response, so that it is impossible to estimate the action of the person 2-71. Accordingly, the detection signal output by the microwave sensor 2-23 must be observed in a sufficient time length. For example, the numbers of approach or departure responses in temporal direction are added up. However, in the case of observation in too long time length, an increase number of responses improves the reliability of the microwave sensor 2-23, but it takes a long time to estimate the action of the person 2-71, so that processing capability decreases.

In view of the foregoing, in this embodiment, by using the photosensor 2-22 and the microwave sensor 2-23 in integrated form, the action of the person 2-71 can be estimated in a short time and with high accuracy without increasing the power consumption.

In other words, as shown in FIG. 45, in an interval (the response interval 2-X) in which the photosensor 2-22 responds, in sub-intervals (the intervals 2-A to 2-C) corresponding to directions of changes in level of the detection signal 2-81, the detection signals 2-91 and 2-92 (respectively representing an approach and a departure) are added up, and the ratio therebetween (normalization) is described as a characteristic value.

Figure 50A:
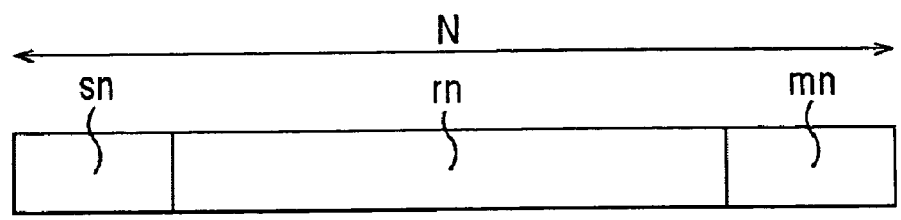
FIGS. 50A and 50B are a chart and graph showing relationships between the number of departure responses represented by the microwave sensor and the number of approach responses represented by the microwave sensor.

Specifically, in a predetermined interval in which the photosensor 2-22 responds, as FIG. 50A shows, detection signals which represent approach sn, departure rn, and no response mn are respectively added up to define the number of approach responses, the number of departure responses, and the number of no responses. A value (ratio) which is obtained by normalizing each number of responses by using the number N of all data items used in adding up the detection signals is described (plotted) as a characteristic value. Each ratio is represented by a value between 0.0 and 1.0.

Figure 50B:
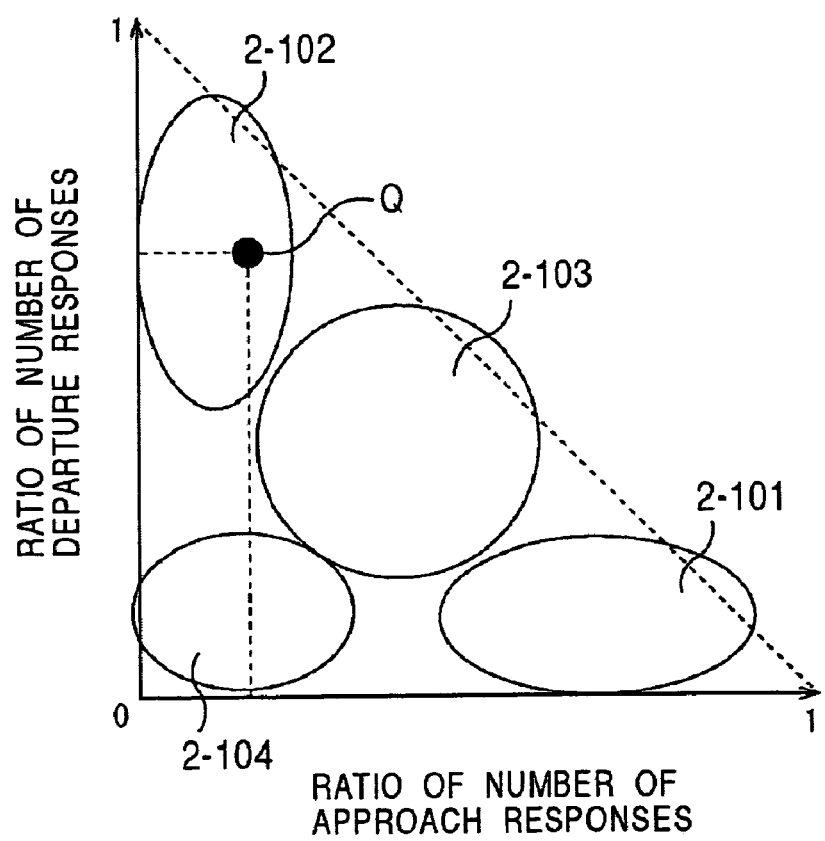

FIG. 50B shows the relationship between the ratio of departure responses (the vertical axis) and the ratio of approach responses (the horizontal axis). As shown in FIG. 50B, characteristic values plotted in a region 2-102 indicate that there are many numbers of departure responses. Characteristic values plotted in a region 2-103 indicate that there are the numbers of approach responses and the numbers of departure responses in mixed form. Characteristic values plotted in a region 2-104 indicate that there are many numbers of no responses.

By way of example, when the number of approach responses totals 15, the number of departure responses totals 70, and the number of no responses totals 15, and the number of all the data items is 100 (=15+70+15). Thus, in normalization, the ratio of the number of no responses is 0.15 (=15/100), the ratio of the number of departure responses is 0.7 (=70/100), and the ratio of the number of no responses is 0.15 (=15/100). Each characteristic value Q is plotted.

As described above, based on output responses by the microwave sensor 2-23 in the intervals 2-A to 2-C, actions of the person 2-71 can be classified.

Next, the principle of the case of using the photosensor 2-22 and the microwave sensor 2-23 in integrated form is described below with reference to FIGS. 51 to 59.

FIG. 51 and FIGS. 52A to 52C are illustrations of examples of detection signals output by the photosensor 2-22 and the microwave sensor 2-23.

Figure 51:
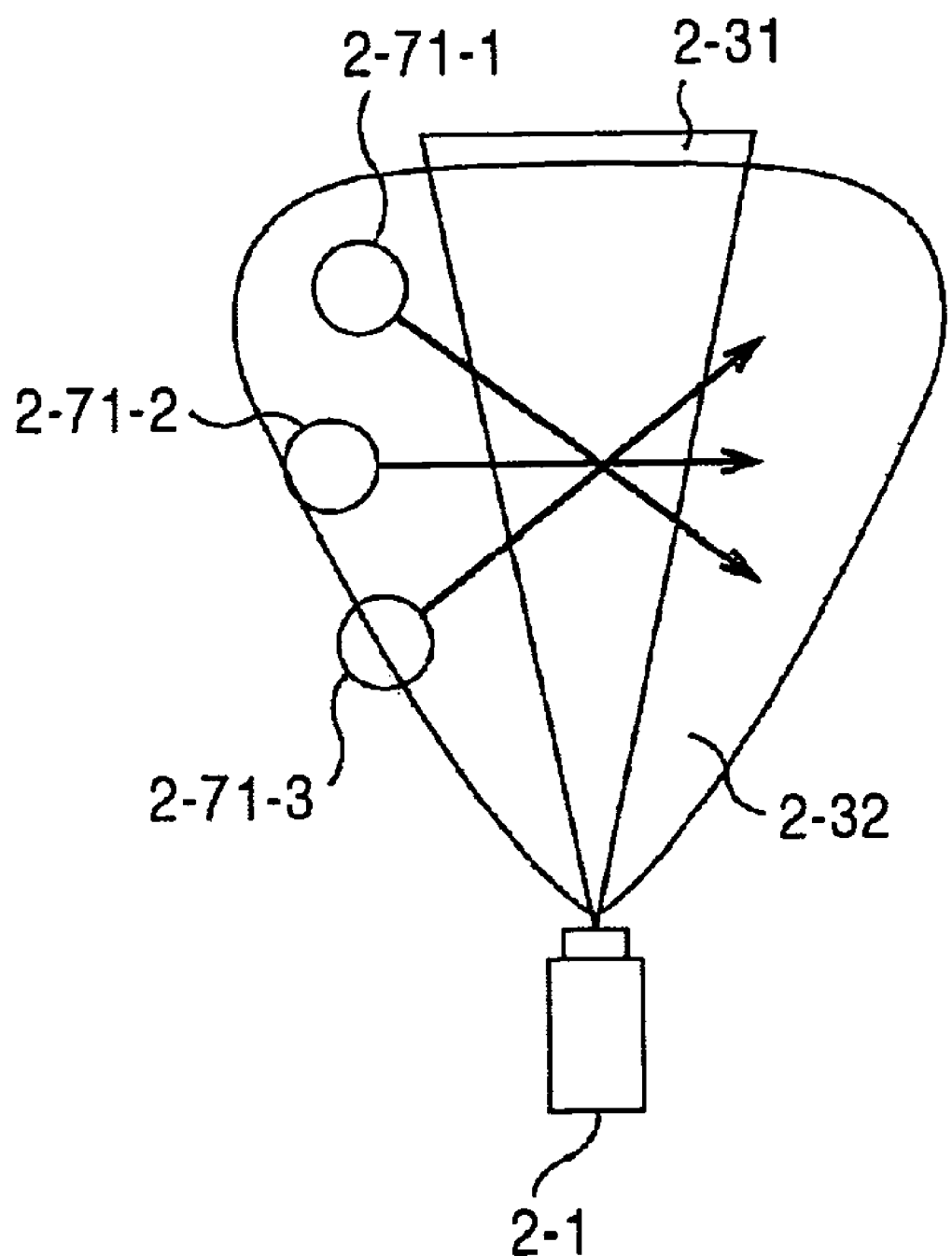
FIG. 51 is a schematic illustration of examples of detection signals output by photosensors and a microwave sensor.
Figure 52A:
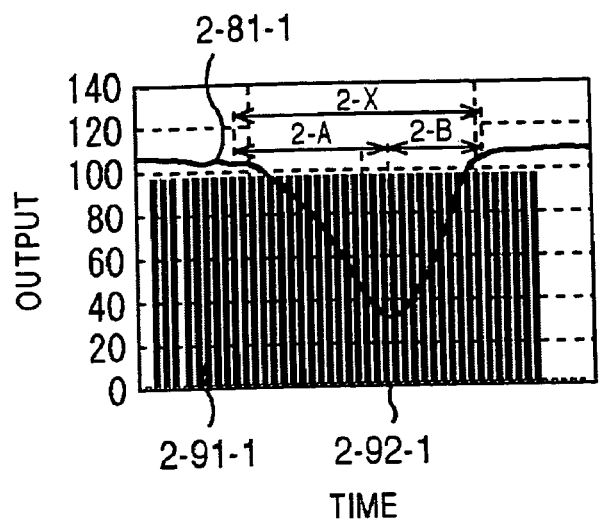
FIGS. 52A, 52B, and 52C are graphs which illustrate examples of detection signals output by the photosensors and the microwave sensor, and which follow FIG. 51.
Figure 52B:
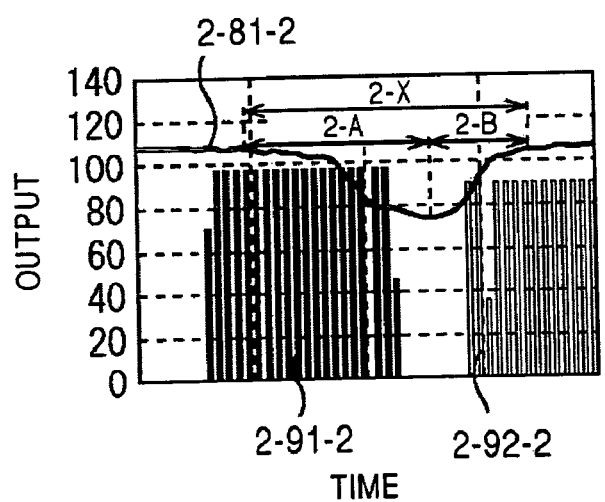
Figure 52C:
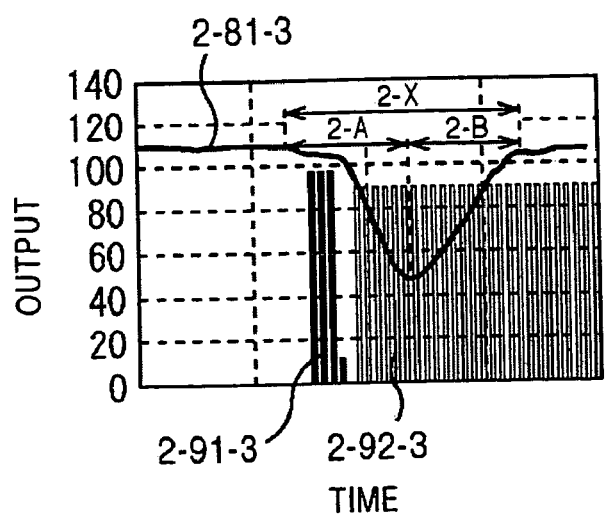

FIG. 51 schematically shows a state in which, in the monitoring region 2-32 by the microwave sensor 2-23, which includes the monitoring region 2-31 by the photosensor 2-22, persons 2-71-1 to 2-71-3 are acting in the directions (upper left to lower right, left to right, and lower left to upper right) indicated by the arrows. As described above, the photosensor 2-22 always outputs, as a detection signal, the average brightness in the monitoring region 2-31, and the microwave sensor 2-23 always emits microwaves in the monitoring region 2-32. Accordingly, as shown in FIG. 51, when the persons 2-71-1 to 2-71-3 act, detection signals as shown in FIGS. 52A to 52C are correspondingly output. In each of FIGS. 52A to 52C, the vertical axis indicates the level of a detection signal output by each of the photosensor 2-22 and the microwave sensor 2-23, and the horizontal axis indicates time. Detection signals 2-91-1 to 2-91-3 and 2-92-1 to 2-92-3 which are output by the microwave sensor 2-23 are binary outputs.

In the case shown in FIG. 52A, as the person 2-71-1 approaches from a far position to enter the monitoring region 2-31, the level of the detection signal 2-81-1 output by the photosensor 2-22 gradually decreases. Conversely, as the person 2-71-1 leaves the monitoring region 2-31, the level of the detection signal 2-81-1 gradually increases. In this case, the detection signal 2-81-1 indicates a characteristic obtained when the output level of the average brightness for the person 2-71-1 is lower than a reference value. Accordingly, the detection signal 2-81-1 changes in a negative direction (This applies to the detection signal 2-81-2 shown in FIG. 52B and the detection signal 2-81-3 shown in FIG. 52C). In addition, since the microwave sensor 2-23 outputs the detection signal 2-91-1 representing an approach response. The level of the detection signal 2-92-1 representing a departure response is zero.

In the case shown in FIG. 52B, as the person 2-71-2 horizontally moves to enter the monitoring region 2-31, the level of the detection signal 2-81-2 output by the photosensor 2-22 gradually decreases. Conversely, as the person 2-71-2 leaves the monitoring region 2-31, the level of the detection signal 2-81-2 gradually increases. The microwave sensor 2-23 irregularly outputs the detection signal 2-91-2, which represents an approach response, and the detection signal 2-92-2, which represents a departure response. In other words, detection signals representing unstable responses are output.

In the case shown in FIG. 52C, as the person 2-71-3 enters the monitoring region 2-31 while going away from a far position, the level of the detection signal 2-81-3 output by the photosensor 2-22 gradually decreases. Conversely, as the person 2-71-3 leaves the monitoring region 2-31, the level of the detection signal 2-81-3 gradually increases. In addition, the microwave sensor 2-23 outputs the detection signal 2-91-3, which represents an approach response, and the detection signal 2-92-3, which represents a departure response.

Next, a specific case in which, in the response intervals 2-X of the photosensor 2-22 shown in FIGS. 52A to 52C, values obtained by adding up and normalizing the detection signals 2-91-1 to 2-91-3, and 2-92-1 to 2-92-3 are described as characteristic values is described with reference to FIGS. 53A to 53C.

FIGS. 53A and 53B are graphs illustrating characteristic values of the microwave sensor 2-23 in the response interval 2-X of the photosensor 2-22.

FIG. 53B shows the relationship between the ratio of the numbers of departure responses (the vertical axis) and the ratio of the numbers of approach responses (the horizontal axis) in the response interval 2-X. As shown in FIG. 53A, the response interval 2-X indicates an interval in which the level of the detection signal 2-81 output by the photosensor 2-22 departs from reference value L. In this example, correspondingly to actions of the persons 2-71-1 to 2-71-3, a characteristic value of the microwave sensor 2-23 in the response interval 2-X is calculated five times and plotted.

In FIG. 53B, a plot group 2-P1 indicates a group of characteristic values calculated based on the detection signal 2-91-1 (in FIG. 52A) by the microwave sensor 2-23 in the response interval 2-X in FIG. 53A. A plot group 2-P2 indicates a group of characteristic values calculated based on the detection signals 2-91-2 and 2-92-2 (in FIG. 52B) by the microwave sensor 2-23 in the response interval 2-X. A plot group 2-P3 indicates a group of characteristic values calculated based on the detection signals 2-91-3 and 2-92-3 (in FIG. 52C) by the microwave sensor 2-23 in the response interval 2-X.

As described above, in changes in levels of the detection signals output by the photosensor 2-22 and in directions (in FIGS. 52A to 52C) of changes, a remarkable difference does not appear. However, there is a difference in characteristic values of the microwave sensor 2-23. This makes it possible to identify each of the actions of the persons 2-71-1 to 2-71-3.

Next, examples of characteristic values in a predetermined interval formed by further dividing the response interval 2-X are described below.

FIGS. 54A and 54B are graphs illustrating examples of characteristic values of the microwave sensor 2-23 in an interval 2-A included in the response interval 2-X in which the level of the detection signal 2-81 output by the microwave sensor 2-23 departs from reference value L.

FIG. 54B shows the relationship between the ratio of the numbers of departure responses (the vertical axis) and the ratio of the numbers of approach responses (the horizontal axis) in the interval 2-A (representing a departure from reference value L) in the response interval 2-X in FIG. 54A. As shown in FIG. 54A, in the interval 2-A in which the above level departs from reference value L, the level of the detection signal 2-81 output by the photosensor 2-22 changes in a direction (in the case shown in FIG. 54A, the level departs in a negative direction, but the case includes the level, which departs in a positive direction) departing from reference value L. In this example, correspondingly to the actions of the persons 2-71-1 to 2-71-3, a characteristic value of the microwave sensor 2-23 in the interval 2-A is calculated five times and plotted.

In FIG. 54B, a plot group 2-P11 indicates a group of characteristic values calculated based on the detection signal 2-91-1 (in FIG. 52A) by the microwave sensor 2-23 in the interval 2-A (representing a departure from reference value L). A plot group 2-P12 indicates a group of characteristic values calculated based on the detection signal 2-91-2 by the microwave sensor 2-23 in the interval 2-A. A plot group 2-P13 indicates a group of characteristic values calculated based on the detection signals 2-91-3 and 2-92-3 (in FIG. 52C) by the microwave sensor 2-23 in the interval 2-A.

Figure 55B:
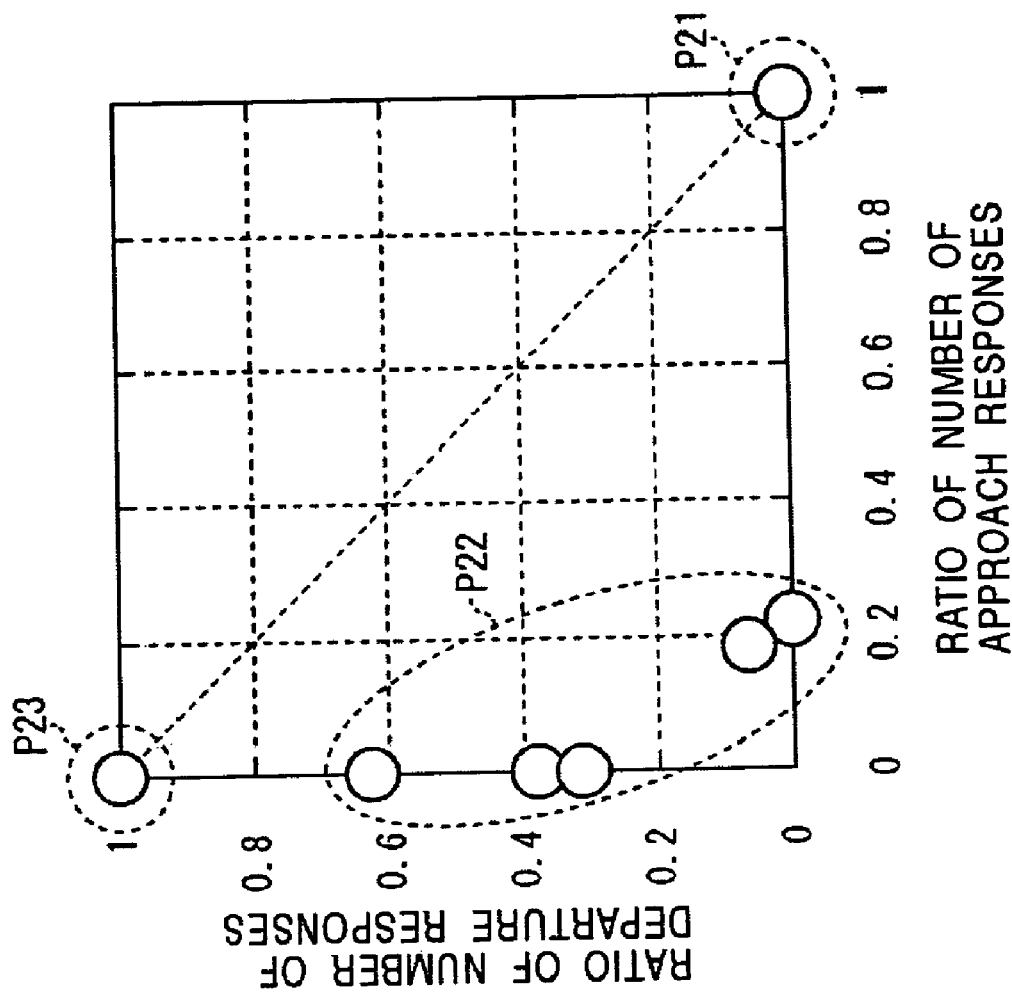
FIGS. 55A and 55B are graphs illustrating examples of characteristic values of the microwave sensor in an interval in the response interval in which the level of a detection signal output from a photosensor approaches a reference value.
Figure 55A:
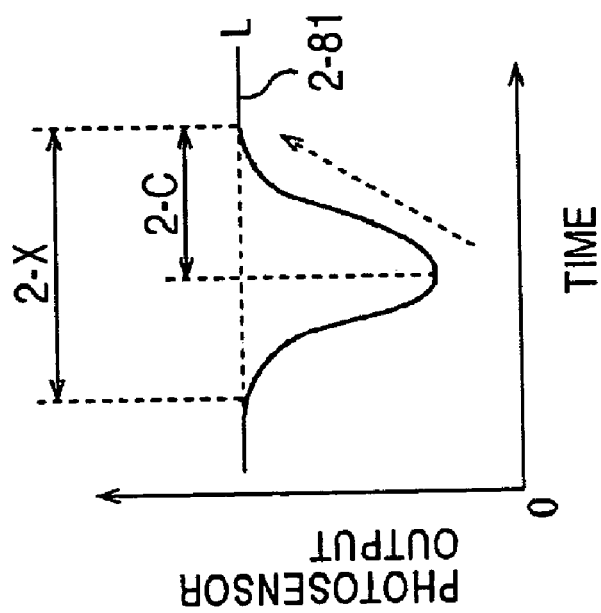

FIGS. 55A and 55B are graphs illustrating examples of characteristic values of the microwave sensor 2-23 in an interval 2-C of the response interval 2-X in which the level of the detection signal 2-81 output by the microwave sensor 2-23 approaches reference value L.

FIG. 55B shows the relationship between the ratio of the numbers of departure responses (the vertical axis) and the ratio of the numbers of approach responses (the horizontal axis) in the interval 2-C (in FIG. 55A) of the response interval 2-X. In the interval 2-C, the level of the detection signal 2-81 output by the photosensor 2-22 changes in a direction (in the case shown in FIG. 55A, the above level approaches in a positive direction, but the case includes a state in which the level approaches in a negative direction) approaching reference value L. In this example, correspondingly to the actions of the persons 2-71-1 to 2-71-3 shown in FIG. 51, a characteristic value of the photosensor 2-22 in the interval 2-C is calculated five times and plotted.

In FIG. 55B, the plot group 2-P21 indicates a group of characteristic values calculated based on the detection signal 2-91-1 (in FIG. 52A) by the microwave sensor 2-23 in the interval 2-C. The plot group 2-P22 indicates a group of characteristic values calculated based on the detection signal 2-92-2 (in FIG. 52B) by the microwave sensor 2-23 in the interval 2-C. The plot group 2-P23 indicates a group of characteristic values calculated based on the detection signal 2-92-3 (in FIG. 52C) by the microwave sensor 2-23 in the interval 2-C.

As described above, although an action of leaving, or an action of approaching and going away can only be estimated based on changes in level of the detection signal 2-81 output by the photosensor 2-22, from characteristic values calculated based on the detection signals 2-91 and 2-92 output by the photosensor 2-22, it can be found in which direction a person has come, or in which direction the person has left.

A case in which actions of a person are estimated from characteristic values of the microwave sensor 2-23 in the intervals 2-A and 2-C (of the response interval 2-X) in which the level of the detection signal 2-81 output by the photosensor 2-22 changes has specifically been described. Next, a specific case in which actions of a person are estimated from characteristic values of the microwave sensor 2-23 in the interval 2-B (in FIG. 45) having no change in level of the detection signal 2-81 is described below with reference to FIGS. 56A to 59.

Figure 56B:
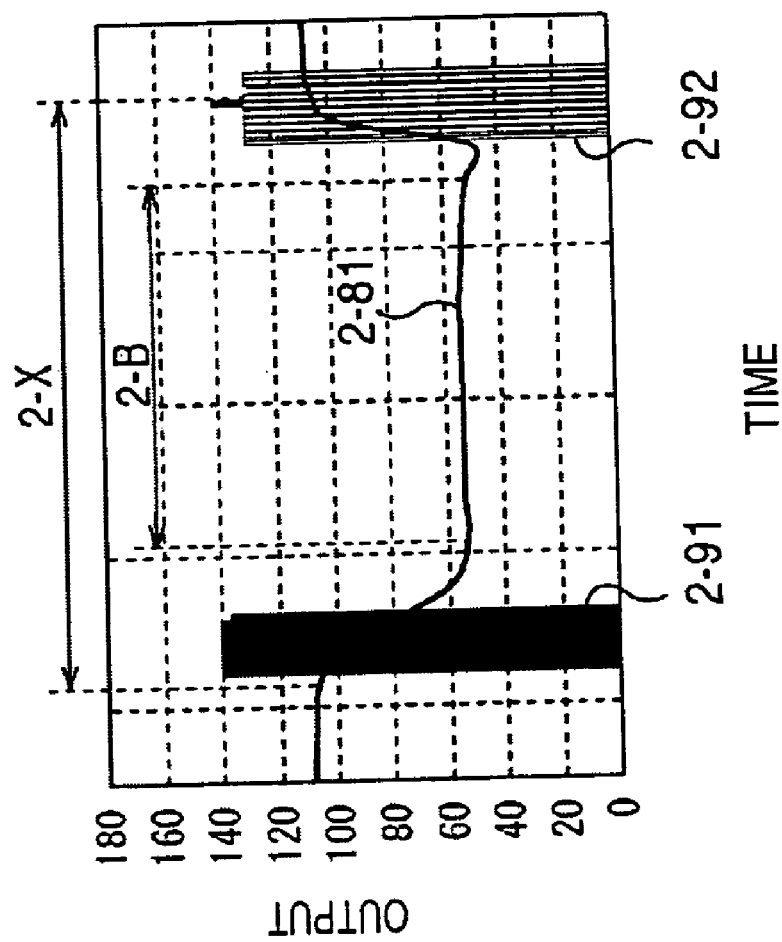
FIGS. 56A and 56B are graphs illustrating examples of detection signals output by a photosensor and a microwave sensor when a person is at a complete stop.
Figure 56A:
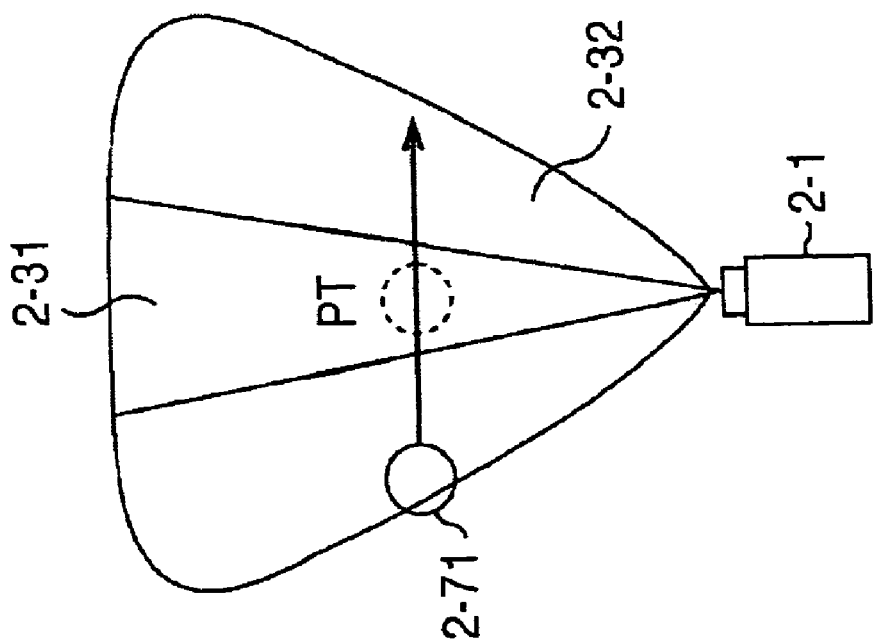

FIGS. 56A and 56B show examples of detection signals output by the photosensor 2-22 and the microwave sensor 2-23 when the person 2-71 is at a complete stop (PT) in the monitoring region 2-31.

FIG. 56A schematically shows a state in which, in the monitoring region 2-32 of the microwave sensor 2-23 which includes the monitoring region 2-31 of the photosensor 2-22, the person 2-71 acts to horizontally moves in parallel in the direction indicated by the arrow, and is brought to a complete stop in the middle of the movement. As described above, the microwave sensor 2-23 always outputs microwaves in the monitoring region 2-32. Accordingly, when the person 2-71 acts as shown in FIG. 56A, the microwave sensor 2-23 correspondingly outputs detection signals as shown in FIG. 56B. In FIG. 56B, the vertical axis indicates the level of the detection signals output by the photosensor 2-22 and the microwave sensor 2-23, and the horizontal axis indicates time. Detection signals 2-91 and 2-92 output by the microwave sensor 2-23, both, are binary outputs.

In the case in FIG. 56B, as the person 2-71 enters the monitoring region 2-31, the level of the photosensor 2-22 gradually decreases, does not change halfway in the interval 2-B in which the person 2-71 is at a complete stop, and gradually increases as the person 2-71 leaves the monitoring region 2-31. In this case, since the detection signal 2-81 represents a characteristic obtained when the output level of an average brightness for the person 2-71 is lower than a reference value, it changes in a negative direction (this applies to the detection signals 2-81 in FIGS. 57B and 58B, which are described later). In addition, the microwave sensor 2-23 outputs a detection signal 2-91 representing an approach response, and a detection signal 2-92 representing a departure response.

Figure 57B:
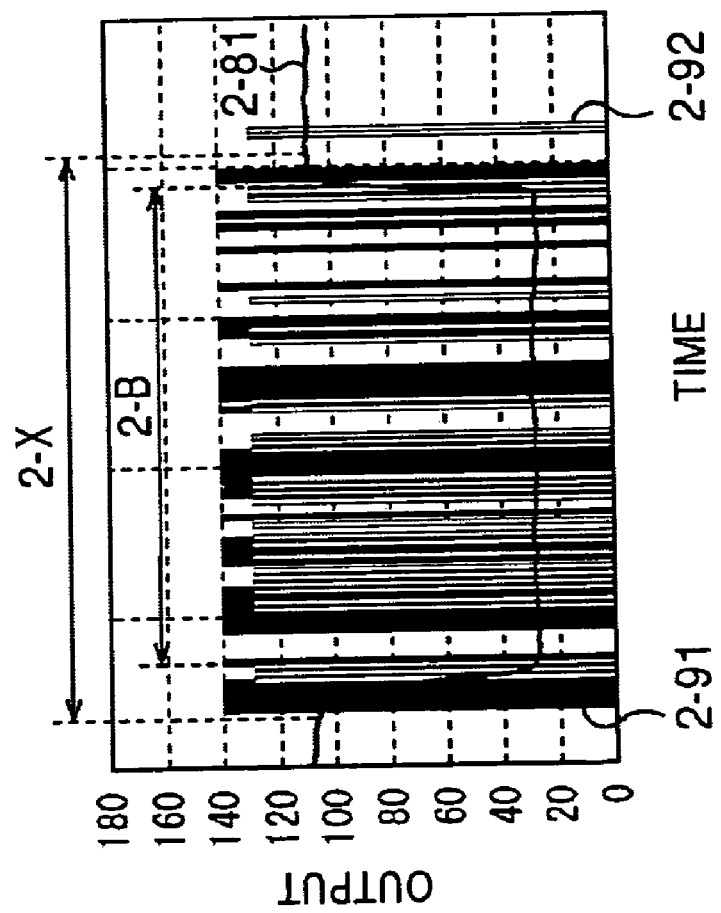
FIGS. 57A and 57B are graphs illustrating examples of detection signals output by a photosensor and a microwave sensor when a person lightly steps at the same position in a monitoring region.
Figure 57A:
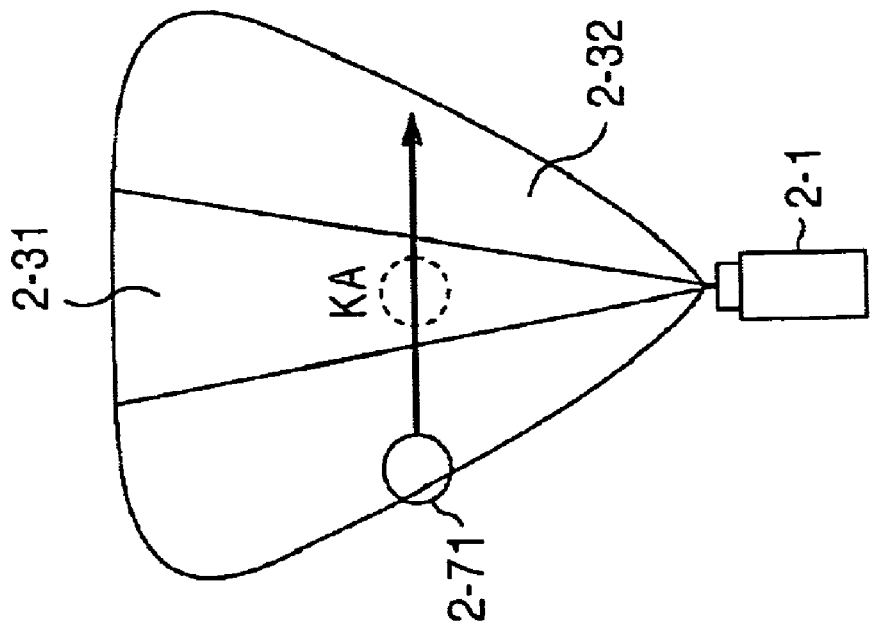

FIGS. 57A and 57B show examples of detection signals output by the photosensor 2-22 and the microwave sensor 2-23 when the person 2-71 lightly steps at the same position in the monitoring region 2-31.

FIG. 57A schematically shows a state in which, in the monitoring region 2-32 of the microwave sensor 2-23 which includes the monitoring region 2-31 of the photosensor 2-22, the person 2-71 act to horizontally moves in parallel as indicated by the arrow, and lightly steps (KA) in the middle of the movement. As described above, the photosensor 2-22 always outputs, as a detection signal, the average brightness in the monitoring region 2-31, and the microwave sensor 2-23 always emits microwaves in the monitoring region 2-32. Accordingly, when the person 2-71 acts as shown in FIG. 57A, the microwave sensor 2-23 correspondingly outputs detection signals as shown in FIG. 57B.

In the example shown in FIG. 57, as the person 2-71 enters the monitoring region 2-31, the level of the detection signal 2-81 output by the photosensor 2-22 gradually decreases, and does not change halfway in the interval B in which the person 2-71 lightly steps at the same position. As the person 2-71 leaves the monitoring region 2-31, the level of the detection signal 2-81 gradually increases. The microwave sensor 2-23 outputs a detection signal 2-91 representing an approach response and a detection signal 2-92 representing a departure response.

Figure 58B:
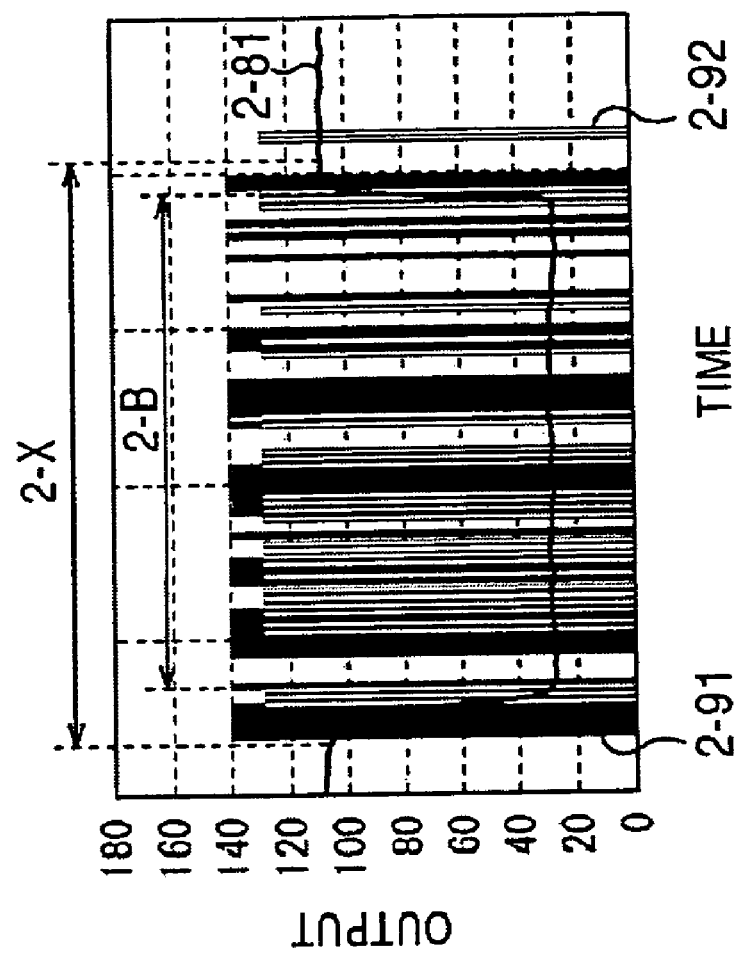
Figure 58A:
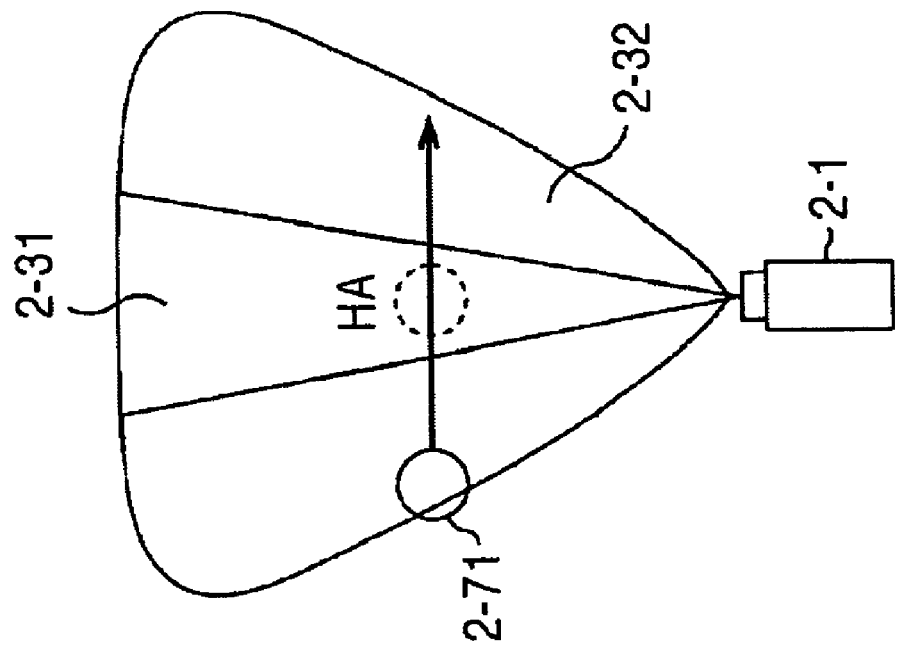

FIGS. 58A and 58B show examples of detection signals output by the photosensor 2-22 and microwave sensor 2-23 when a person violently steps (HA) at the same position.

FIG. 58A schematically shows that, in the monitoring region 2-32 by the microwave sensor 2-23 which includes the monitoring region 2-31 by the photosensor 2-22, the person 2-71 horizontally acts as indicated by the arrow and violently steps at the same position at a middle point. As described above, the photosensor 2-22 always outputs, as a detection signal, an average brightness in the monitoring region 2-31, and the microwave sensor 2-23 always outputs microwaves in the monitoring region 2-32. As shown in FIG. 58A, when the person 2-71 acts, the photosensor 2-22 and the microwave sensor 2-23 output detection signals, 2-81, 2-91, and 2-92 as shown in FIG. 58B.

In the example shown in FIG. 58B, as the person 2-71 enters the monitoring region 2-31, the level of the detection signal 2-81 gradually decreases, and does not change at all at a middle point in an interval 2-B in which the person 2-71 violently steps at the same position. The microwave sensor 2-23 outputs the detection signal 2-91, which represents an approach response, and the detection signal 2-92, which represents a departure response.

Next, a case in which, in the interval 2-B (of the response interval 2-X of the photosensor 2-22) in which nothing changes as shown in each of FIGS. 56B, 57B, and 58B, a value obtained such that the detection signals 2-91 and 2-92 are added up and normalized is described as a characteristic value is described below with reference to FIG. 59.

Figure 59:
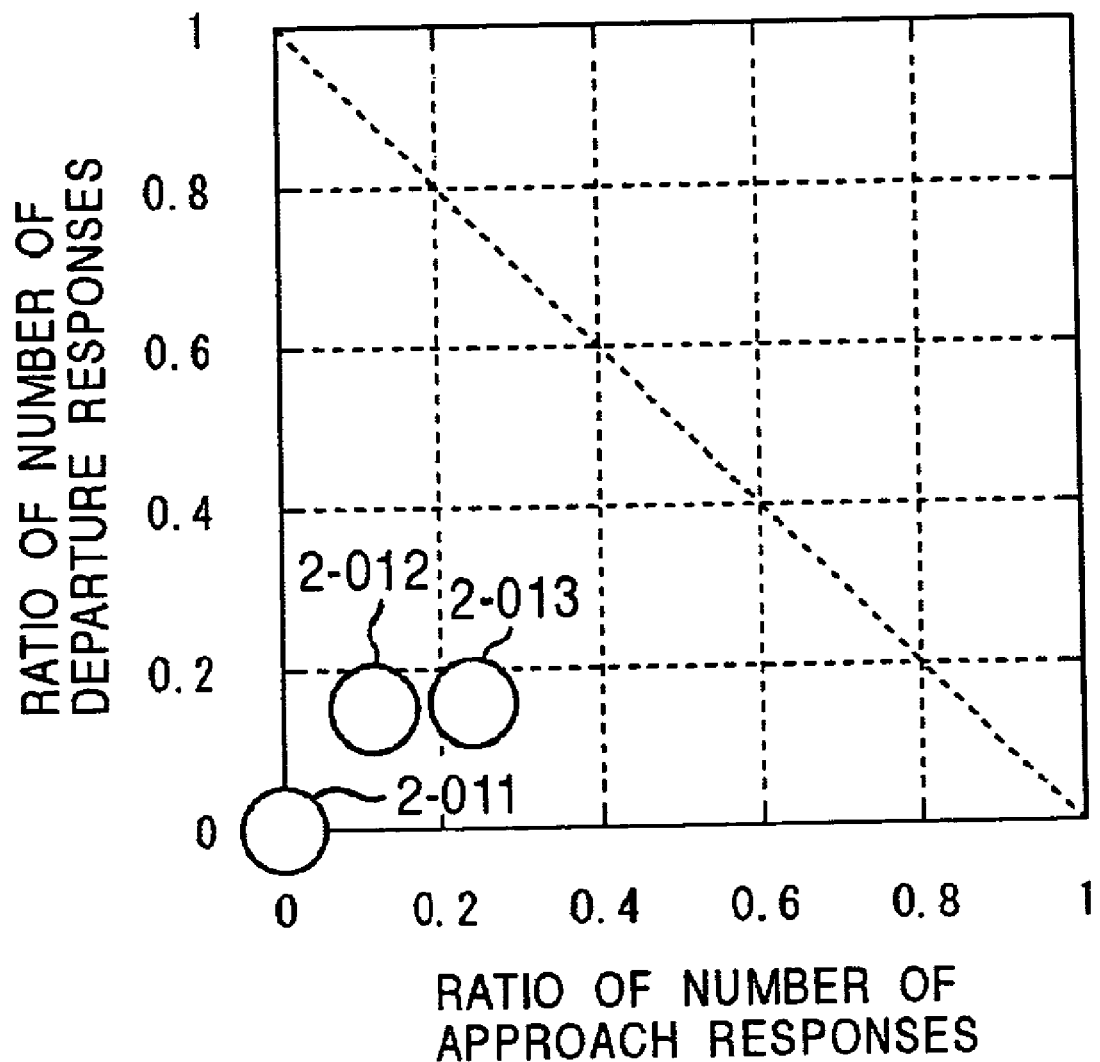
FIG. 59 is a graph showing examples of characteristic values of a microwave sensor in an interval in a response interval in which the level of a detection signal output from a photosensor does not change at all.

In the example shown in FIG. 59, correspondingly to the action of the person 2-71 which in shown in each of FIGS. 56A, 57A, and 58A, a characteristic value of the microwave sensor 2-23 in the interval 2-B in which nothing changes is calculated once and is plotted. In FIG. 59, the characteristic value 2-Q11 indicates a characteristic value based on the output (i.e., the output level zero) in the no-change interval 2-B of the microwave sensor 2-23 which is shown in FIG. 56B. The characteristic value 2-Q12 indicates a characteristic value based on the detection signals 2-91 and 2-92 in the no-change interval 2-B of the microwave sensor 2-23 which are shown in FIG. 57B. The characteristic value 2-Q13 indicates a characteristic value based on the detection signals 2-91 and 2-92 in the no-change interval 2-B of the microwave sensor 2-23 which are shown in FIG. 58B.

As described above, in the response interval 2-X of the photosensor 2-22, the responses in the no-change interval 2-B (FIGS. 56B to 58B) are mutually similar. Thus, it is difficult to identify an action in the monitoring region 2-31. However, the characteristic values (in FIG. 59) of the microwave sensor 2-23 have clear differences, so that actions of the person 2-71 in the monitoring region 2-31 can be identified.

As described above, by combining the response of the photosensor 2-22 and the characteristic values of the microwave sensor 2-23, actions of a person which cannot be identified by a single sensor can be accurately identified. In this case, the CCD camera 2-21 is not in operation, so that power consumption can be reduced.

Referring back to FIG. 42, based on photosensor data supplied from the photosensor 2-22 and microwave sensor data supplied from the microwave sensor 2-23, the state description unit 2-41 generates and describes data (hereinafter referred to as "state describing data") concerning consecutive action (sensor responses) of the person 2-71 in the monitoring region 2-31. The state description unit 2-41 supplies the generated data to an event notification determining unit 2-42 and to a transmitting unit 2-42 through a switch 2-43.

An example of state-description data is described below with reference to FIG. 60.

As described with reference to FIG. 45, the state description unit 2-41 classifies the photosensor data (the detection signal 2-81) supplied from the photosensor 2-22 into the interval 2-A in which the level of the detection signal 2-81 changes so as to depart from reference value L, the interval 2-B in which nothing changes, and the interval 2-C in which the level of the detection signal 2-81 approaches reference value L, and describes the response symbols 2-A to 2-C as states of the photosensor 2-22 correspondingly to the intervals 2-A to 2-C. At the same time, the state description unit 2-41 also describes response duration for each response interval.

In addition, as described above with reference to FIG. 50, from the microwave sensor data supplied from the microwave sensor 2-23, the state description unit 2-41 calculates the ratio (0.0 to 1.0) of numbers of approach responses and the ratio (0.0 to 1.0) of numbers of departure responses, and describes the calculated values as the state (characteristic value) of the microwave sensor 2-23.

In other words, in the state description unit 2-41, by using, as each unit, a response symbol representing a state of the photosensor 2-22, response duration, and the ratio of numbers of approach responses and the ratio of numbers of departure responses, which represent the state of the microwave sensor 2-23, the units which are arranged in a temporal direction are described as state-description data items 2-111-1 to 2-111-$n$ (hereinafter referred to as simply "state-description data 2-111" when the state-description data items 2-111-1 to 2-111-$n$ do not need to be distinguished from one another).

Referring again to FIG. 42, the event notification determining unit 2-42 compares the state-description data 2-111 supplied from the state description unit 2-41 and a notification determination table (described later) received from the processing box 2-2 through a receiving unit 2-46. When, based on the comparison, the event notification determining unit 2-42 determines to notify the processing box 2-2 of the event 2-I, it supplies a transmitting unit 2-45 with the event 2-I, which is to be reported. Also, the event notification determining unit 2-42 supplies a power control signal to switch on the power of the CCD camera 2-21, supplies a state-description-data transmission control signal to turn on a switch 2-43, and supplies a notification-picture-transmission control signal to turn on a switch 2-44. This supplies notification picture data 2-G output from the CCD camera 2-21 to the transmitting unit 2-45 through the switch 2-44, and supplies the state-description data 2-111 output from the state description unit 2-41 to the transmitting unit 2-45 through the switch 2-43.

In the initial state of the multi-sensor camera unit 2-1, the processing box 2-2 has not transmitted the notification determination table, and the event notification determining unit 2-42 does not retain the notification determination table. Thus, when being supplied with state-description data 2-91 from the state description unit 2-41, the event notification determining unit 2-42 immediately determines that each event is to be reported. In other words, in the initial state, all events are reported. This prevents the user from not being notified of necessary events.

The transmitting unit 2-45 transmits, to the processing box 2-2, the event 2-I supplied from the event notification determining unit 2-42, and the notification picture data 2-G supplied from the CCD camera 2-21 and the state-description data 2-111 supplied from the state description unit 2-41.

The receiving unit 2-46 receives the notification determination table transmitted from the processing box 2-2, and supplies the received notification determination table to the event notification determining unit 2-42.

A receiving unit 2-51 in the processing box 2-2 supplies a display picture creating unit 2-52 with the notification picture data 2-G transmitted from the multi-sensor camera unit 2-1 and the event 2-I. The receiving unit 2-51 supplies and stores the state-description data 2-111 (transmitted from the multi-sensor camera unit 2-1) in a state-description-data storage unit 2-53.

When the display picture creating unit 2-52 is notified of the event 2-I from the multi-sensor camera unit 2-1 through the receiving unit 2-51, it creates notification data 2-T in which the notification picture data 2-G is inserted in a part of a general audiovisual signal (television broadcast signal), and supplies the notification data 2-T to a display unit 2-3 for display. The display picture creating unit 2-52 creates notification data (not including the general audiovisual signal) for the remote controller 2-4 which is formed by the notification picture data, and supplies the created notification data to a transmitting unit 2-56. When the display picture creating unit 2-52 is not notified of the event (in a normal case), it supplies the general audiovisual signal (pictures based on the television signal) to the display unit 2-3 for display.

Since the notification data for the display unit 2-3 is formed such that the notification picture data is inserted in part of the general audiovisual signal, the display unit 2-3 displays in picture-in-picture form. In addition, since the notification data for the remote controller 2-4 is formed by the notification picture data, a display unit 2-62 in the remote controller 2-4 displays only an event representing picture (e.g., a picture of a place being monitored).

When a notification-determination-table updating unit 2-54 receives a signal (hereinafter referred to as a "user FB signal") concerning user feedback (FB) from the remote controller 2-4 through a receiving unit 2-57, it supplies and stores the user FB signal in the state-description-data storage unit 2-53. The notification-determination-table updating unit 2-54 reads the state-description data 2-111 stored in the state-description-data storage unit 2-53 and corresponding user feedback, compares the read data and feedback with the notification determination table, and updates the notification determination table. When the notification determination table differs from that previously transmitted to the multi-sensor camera unit 2-1, the notification-determination-table updating unit 2-54 supplies a new notification determination table to a transmitting unit 2-55.

The user feedback means a user instruction input through an input unit 2-63 of the remote controller 2-4 based on a user's determination for the displayed event. For example, when the user desires to be informed of an event from then onward, the user operates an OK button (not shown) of the input unit 2-63, while, when the user does not desire detection of an event from then onward, the user operates an NG button (not shown), whereby the determination is input as user feedback. Alternatively, only for a case in which it is not necessary to perform detection of an event, feedback may be performed.

When the state-description-data storage unit 2-53 is supplied with the state-description data 2-111 from the receiving unit 2-51, and is supplied with the user feedback from the notification-determination-table updating unit 2-54, it stores the state-description data 2-111 and the user feedback so that both are associated with each other. When being supplied with either the state-description data 2-111 or the user feedback, the state-description-data storage unit 2-53 stores the supplied one as new state-description data or new user feedback.

The transmitting unit 2-55 transmits, to the multi-sensor camera unit 2-1, the notification determination table supplied from the notification-determination-table updating unit 2-54. The transmitting unit 2-56 transmits, to the remote controller 2-4, the notification data supplied from the display picture creating unit 2-52. The receiving unit 2-57 receives the user FB signal transmitted from the remote controller 2-4, and supplies the received signal to the notification-determination-table updating unit 2-54.

A receiving unit 2-61 of the remote controller 2-4 receives the notification data transmitted from the processing box 2-2, and controls a display unit 2-62 to display a picture based on the transmitted data. The input unit 2-63 receives a user instruction input for the displayed event, and supplies a transmitting unit 2-64 with a signal concerning the input (user feedback). The transmitting unit 2-64 transmits, to the processing box 2-2, the user feedback signal supplied from the input unit 2-63.

As described above, the user feedback means, for example, a user's determination such as "an event that needs to be reported from then onward" or "an event that does not need to be reported from then onward". The multi-sensor camera unit 2-1 and the processing box 2-2 change processing, based on the user feedback.

Figure 61:
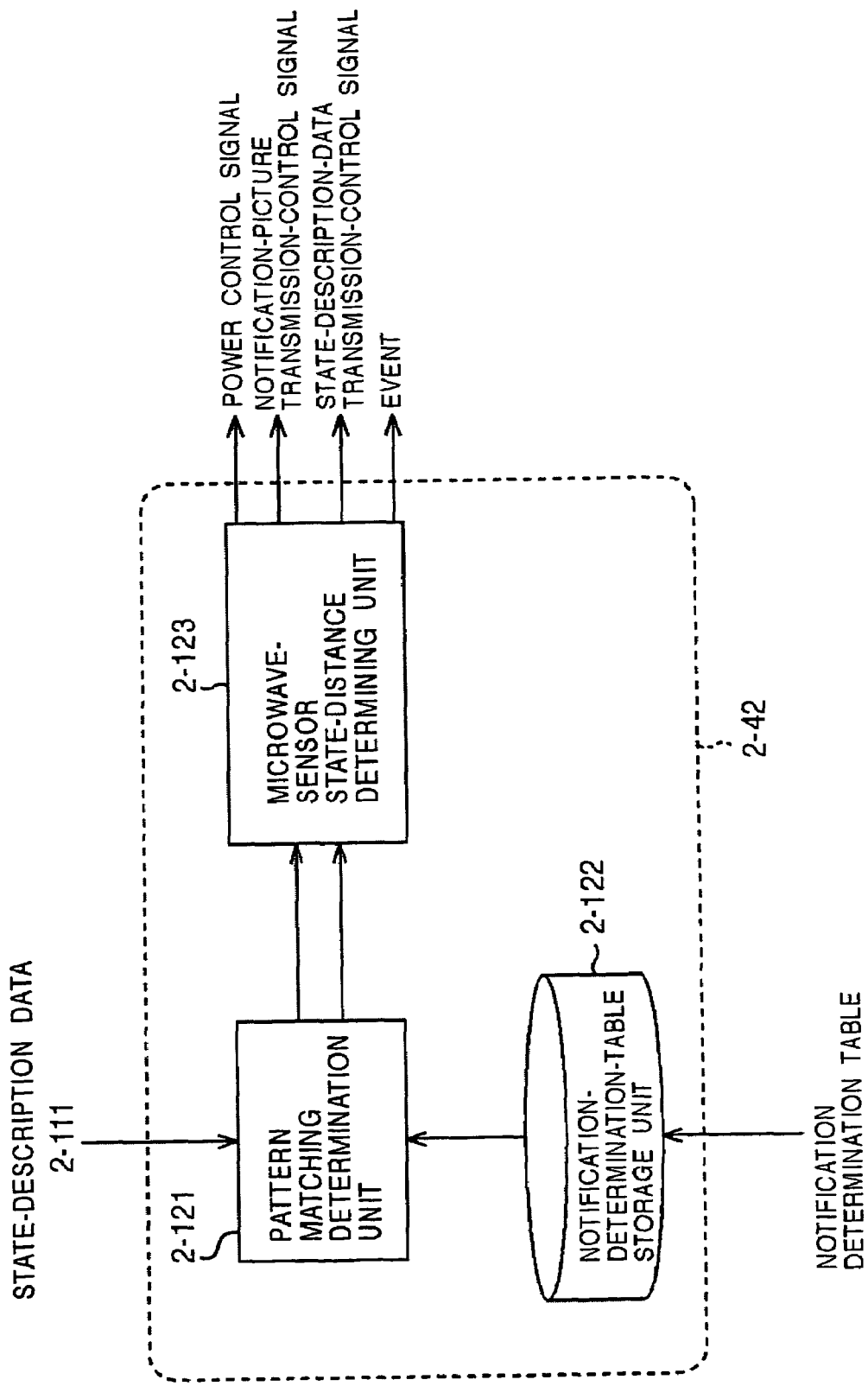
FIG. 61 is a detailed block diagram showing the event notification determining unit shown in FIG. 42.

FIG. 61 is a detailed block diagram showing the event notification determining unit 2-42 in the multi-sensor camera unit 2-1.

A pattern matching determination unit 2-121 compares the state-description data 2-111 (in FIG. 60) supplied from the state description unit 2-41 and the notification determination table stored in a notification-determination-table storage unit 2-122. If the pattern matching determination unit 2-121 detects a pattern matching the state-description data 2-111, it supplies a microwave-sensor state-distance determining unit 2-123 with all the state-description data 2-111 and the pattern, which is in the notification determination table. The pattern means the classification of a response symbol included in the state-description data 2-111.

For the state-description data 2-111 and the pattern in the notification determination table supplied for the pattern matching determination unit 2-121, the microwave-sensor state-distance determining unit 2-123 performs distance determination in the state of the microwave sensor 2-23. When the microwave-sensor state-distance determining unit 2-123 determines, based on the result of the distance determination, to notify the user of an event, it performs supplying the processing box 2-2 with the even to be reported, supplying a power control signal to the CCD camera 2-21, supplying a state-description-data transmission-control signal to the switch 2-43, and supplying a notification-picture transmission-control signal to the switch 2-44. This performs switching on the power of the CCD camera 2-21, turning on the switches 2-43 and 2-44, and transmitting, to the processing box 2-2, through the transmitting unit 2-45, the notification picture data output from the CCD camera 2-21 and the state-description data 2-111 output from the state description unit 2-41.

The notification-determination-table storage unit 2-122 stores the notification determination table transmitted from the processing box 2-2. Details of the notification determination table are described below with reference to FIG. 63.

Figure 62:
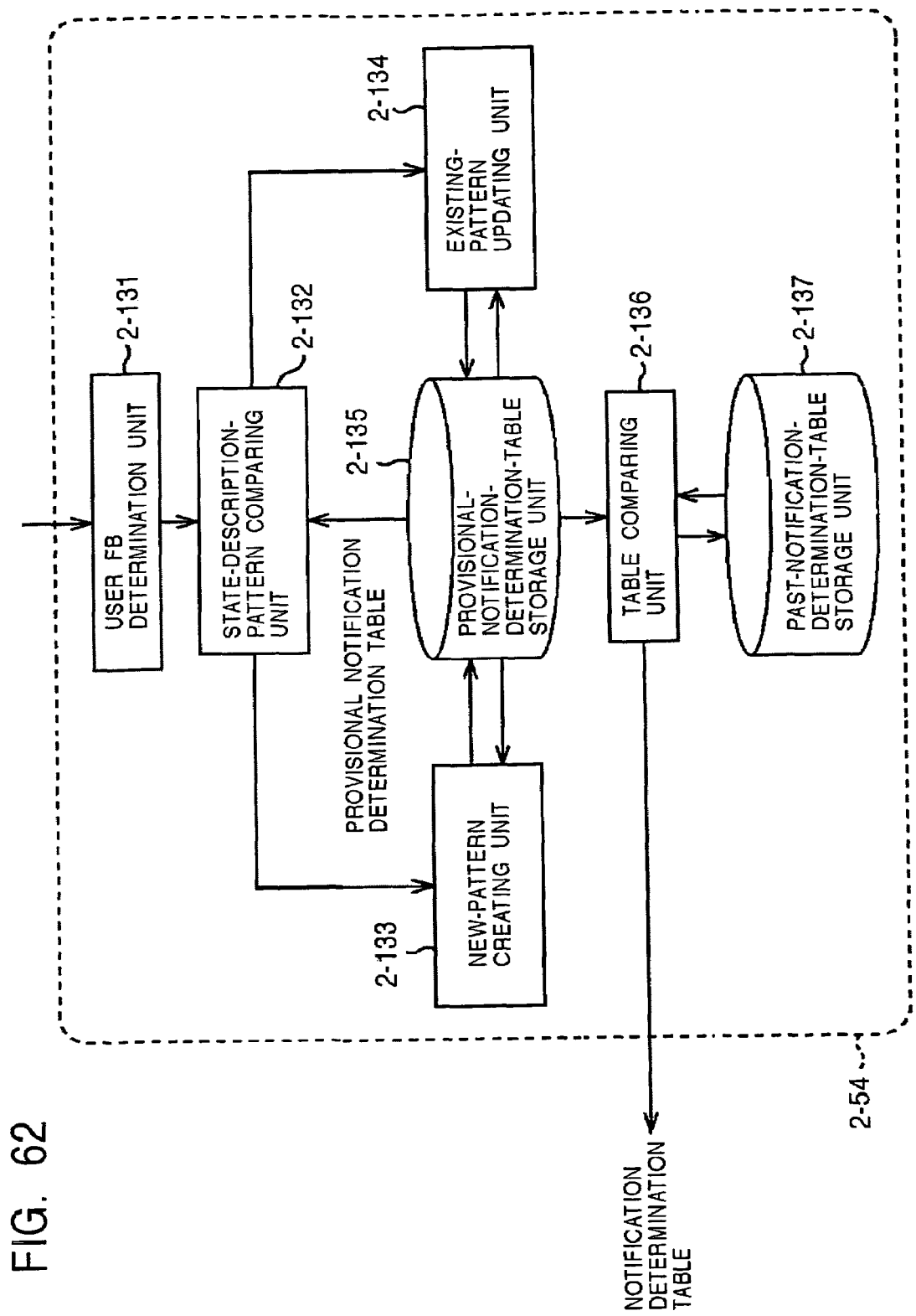
FIG. 62 is a detailed block diagram showing the notification-determination-table updating unit shown in FIG. 42.

FIG. 62 is a detailed block diagram showing the notification-determination-table updating unit 2-54 in the processing box 2-2.

A user FB determination unit 2-131 reads the state-description data 2-111 (in FIG. 60) stored in the state-description-data storage unit 2-53 and the corresponding user feedback, determines which of "OK" representing data and "NG" representing data the user feedback is, and supplies the result of determination to a state-description-pattern comparing unit 2-132 with the state-description data 2-111.

When the result of determination representing "NG (event detection does not need to be performed from then onward)" is supplied from the user FB determination unit 2-131 to the state-description-pattern comparing unit 2-132, the state-description-pattern comparing unit 2-132 compares the state-description data 2-111 together supplied, and each pattern in a provisional notification determination table stored in a provisional-notification-determination-table storage unit 2-135. When the result of comparison indicates that the state-description data 2-111 matches a pattern in the provisional-notification-determination-table storage unit 2-135, the state-description-pattern comparing unit 2-132 supplies the state-description data 2-111 and the pattern matching it to an existing-pattern updating unit 2-134. If no pattern matches the state-description data 2-111, the state-description-pattern comparing unit 2-132 supplies a new pattern to a new-pattern creating unit 2-133.

The new-pattern creating unit 2-133 additionally stores, as the maximum and minimum of duration in the new notification determination table, in the provisional-notification-determination-table storage unit 2-135, a response symbol included in the state-description data 2-111 supplied from the state-description-pattern comparing unit 2-132 and corresponding duration. For each response symbol representing the state of the photosensor 2-22, the new-pattern creating unit 2-133 also adds the ratio of numbers of approach responses and ratio of numbers of departure responses of the microwave sensor 2-23 which are included in the state-description data 2-111 at the present time.

The existing-pattern updating unit 2-134 compares the duration which is included in the state-description data 2-111 at the present time and which is supplied from the state-description-pattern comparing unit 2-132, and each of the maximum and minimum of duration corresponding to a pattern matching the state-description data 2-111. If the existing-pattern updating unit 2-134 has determined, based on the result of comparison, that the duration of the state-description data 2-111 at the present time is shorter than the minimum of the duration corresponding to the match pattern, the existing-pattern updating unit 2-134 replaces (updates) the minimum of the duration corresponding to the match pattern by the duration of the state-description data 2-111 at the present time. Alternatively, if the existing-pattern updating unit 2-134 has determined that the duration of the state-description data 2-111 at the present time is longer than the maximum of the duration corresponding to the match pattern, it replaces (updates) the maximum of the duration corresponding to the match pattern by the duration of the state-description data 2-111 at the present time. The existing-pattern updating unit 2-134 stores the replaced data in the provisional-notification-determination-table storage unit 2-135, and adds, for each response symbol representing the state of the photosensor 2-22, the ratio of numbers of approach responses and ratio of numbers of departure responses included in the present data.

The provisional-notification-determination-table storage unit 2-135 is a provisional notification determination table added by the new-pattern creating unit 2-133, and stores a notification determination table updated by the existing-pattern updating unit 2-134, as required.

A table comparing unit 2-136 compares the provisional notification determination table stored in the provisional-notification-determination-table storage unit 2-135 and a past notification determination table stored in a past-notification-determination-table storage unit 2-137. If the table comparing unit 2-136 has determined that both are identical to each other, it supplies and stores, in the past-notification-determination-table storage unit 2-137, the provisional notification determination table stored in the provisional-notification-determination-table storage unit 2-135. Conversely, if the table comparing unit 2-136 has determined that both are not identical to each other, it transmits, to the multi-sensor camera unit 2-1, through the transmitting unit 2-55, the provisional notification determination table stored in the provisional-notification-determination-table storage unit 2-135, and subsequently supplies and stores the transmitted notification determination table as an updated notification determination table in the past-notification-determination-table storage unit 2-137.

The past-notification-determination-table storage unit 2-137 stores, as a past notification determination table, the notification determination table updated by the table comparing unit 2-136.

Figure 63:
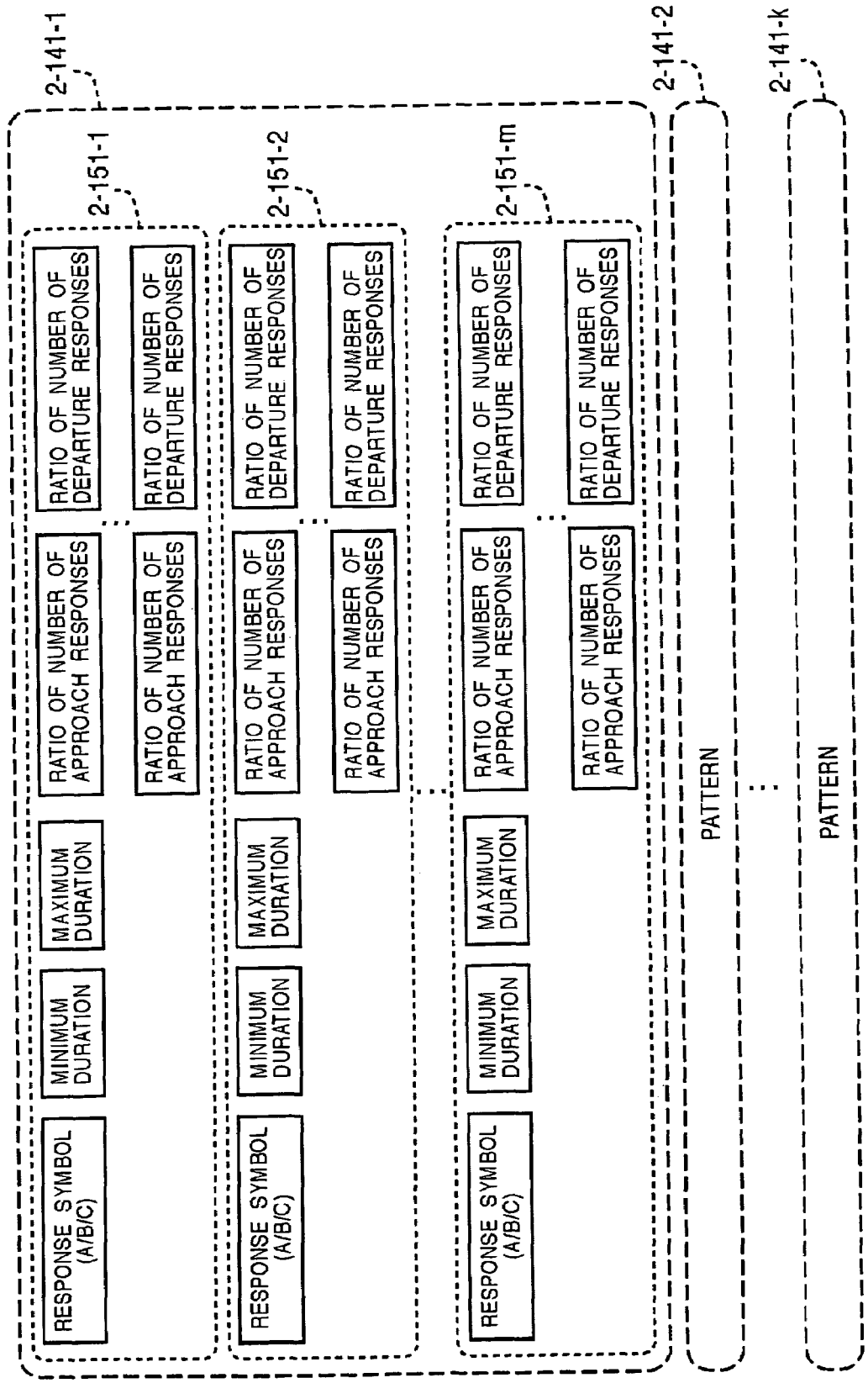
FIG. 63 is a chart showing a notification determination table.

FIG. 63 shows examples of notification determination tables stored in the past-notification-determination-table storage unit 2-137.

As shown in FIG. 63, a response symbol representing a state concerning the photosensor 2-22, the maximum and minimum of duration (that is, a response interval) in the response symbol, and the ratio of numbers of approach responses and the ratio of numbers of departure responses which represent a state concerning the microwave sensor 2-23 are specified as one item of state-description data. An action of a person which is constituted by state-description data 2-151-1 to state-description data 2-151-*m* is specified as one pattern. In addition, a notification determination table composed of patterns 2-141-1 to 2-141-*k* is stored in the past-notification-determination-table storage unit 2-137.

In the following description, when state-description data 2-151-1 to state-description data 2-151-*m* do not need to be separately distinguished, they are hereinafter referred to simply as "state-description data 2-151". When the patterns 2-141-1 to 2-141-*k* do not need to be separately distinguished, each of them is hereinafter referred to simply as the "pattern 2-141".

Next, a process of the multi-sensor camera unit 2-1 is described below with reference to the flowchart shown in FIG. 64.

This process is started when the user requests the start of monitoring in the monitoring region.

In step S2-1, the event notification determining unit 2-42 supplies a power control signal to switch off the power of the CCD camera 2-21, turns off the event notification flag, and clears the notification determination table stored in the notification-determination-table storage unit 2-122.

In step S2-2, the state description unit 2-41 acquires photosensor data from the photosensor 2-22, which is on, and acquires microwave sensor data from the microwave sensor 2-23, which is on. In step S2-3, based on the photosensor data and microwave sensor data acquired in step S2-2, the state description unit 2-41 performs a state-data description process concerning consecutive action of the person 2-71 in the monitoring region. Details of the state-data description process are described later with reference to the flowchart shown in FIG. 65. In this process, the state-description data 2-111 (in FIG. 60) is output from the state description unit 2-41 to the event notification determining unit 2-42.

In step S2-4, the event notification determining unit 2-42 determines the event notification flag is on (the notification event is being generated). If the event notification determining unit 2-42 has determined that the event notification flag is not on but off (the notification event is not being generated), it proceeds to step S2-8 and performs an event-notification-determination process, which is described later with reference to the flowchart shown in FIG. 66. In this process, the notification event is generated by the event notification determining unit 2-42, or a non-notification event is generated (no event is reported).

In step S2-9, based on the result of the process in step S2-8, the event notification determining unit 2-42 determines whether a notification event is detected. If the event notification determining unit 2-42 has determined that the notification event is detected, it proceeds to step S2-10, and supplies a power control signal to switch on the power of the CCD camera 2-21 and turns on the event notification flag. In other words, only when the event notification determining unit 2-42 determines that the notification event is detected does it switch on the power of the CCD camera 2-21. When the notification event is not detected, the power of the CCD camera 2-21 remains off. This can reduce unnecessary battery power consumption.

In step S2-11, the event notification determining unit 2-42 notifies the processing box 2-2 of the event through transmitting unit 2-45, and supplies a notification-picture transmission-control signal to switch on the power of the switch 2-44. This starts transmission of notification picture data (event pictures) from the CCD camera 2-21 to the processing box 2-2. The processing box 2-2 receives and displays the notification picture data on the display unit 2-3 (in step S2-63 shown in FIG. 63 described later).

If the event notification determining unit 2-42 has determined in step S2-9 that the type of event is not the notification event, or is a non-notification event, it skips over steps S2-10 and S2-11, and proceeds to step S2-12.

If the event notification determining unit 2-42 has determined in step S2-4 that the event notification flag is on (the notification event is being generated), it proceeds to step S2-5 and determines whether the event finishes. If it has determined that the event finishes, it proceeds to step S2-6, and supplies a power control signal to switch off the CCD camera 2-21 and turns on the event notification flag.

In step S2-7, the event notification determining unit 2-42 supplies a state-description-data transmission to turn on the switch 2-43, and supplies a notification-picture transmission-control signal to turn off the switch 2-44. Accordingly, in the process in step S2-3, the state-description data output from the state description unit 2-41 is transmitted to the processing box 2-2 through the switch 2-43 and the transmitting unit 2-45. Transmission of the notification picture data (event picture) transmitted from the CCD camera 2-21 to the processing box 2-2 through the switch 2-44 and the transmitting unit 2-45 is stopped. The processing box 2-2 receives and stores the state-description data 2-111 as a notification determination table in the state-description-data storage unit 2-53 (in step S2-68 shown in FIG. 67). In addition, the processing box 2-2 updates the notification determination table (in step S2-73 shown in FIG. 67 described later), as required, and transmits the updated notification determination table (in step S2-74 shown in FIG. 67 described later).

If the event notification determining unit 2-42 has determined in step S2-5 that the event has not finished, it skips over steps S2-6 and S2-7, and proceeds to step S2-12.

In step S2-12, the event notification determining unit 2-42 determines whether to have received the notification determination table through the receiving unit 2-46. If it has determined to have received the notification determination table, it proceeds to step S2-13. In step S2-13, the event notification determining unit 2-42 supplies the received notification determination table to the notification-determination-table storage unit 2-122 for updating.

In step S2-12, if the event notification determining unit 2-42 has determined not to have received notification determination table, or after step S2-13, it returns to step S2-2 and repeatedly executes the above-described processing.

Figure 64:
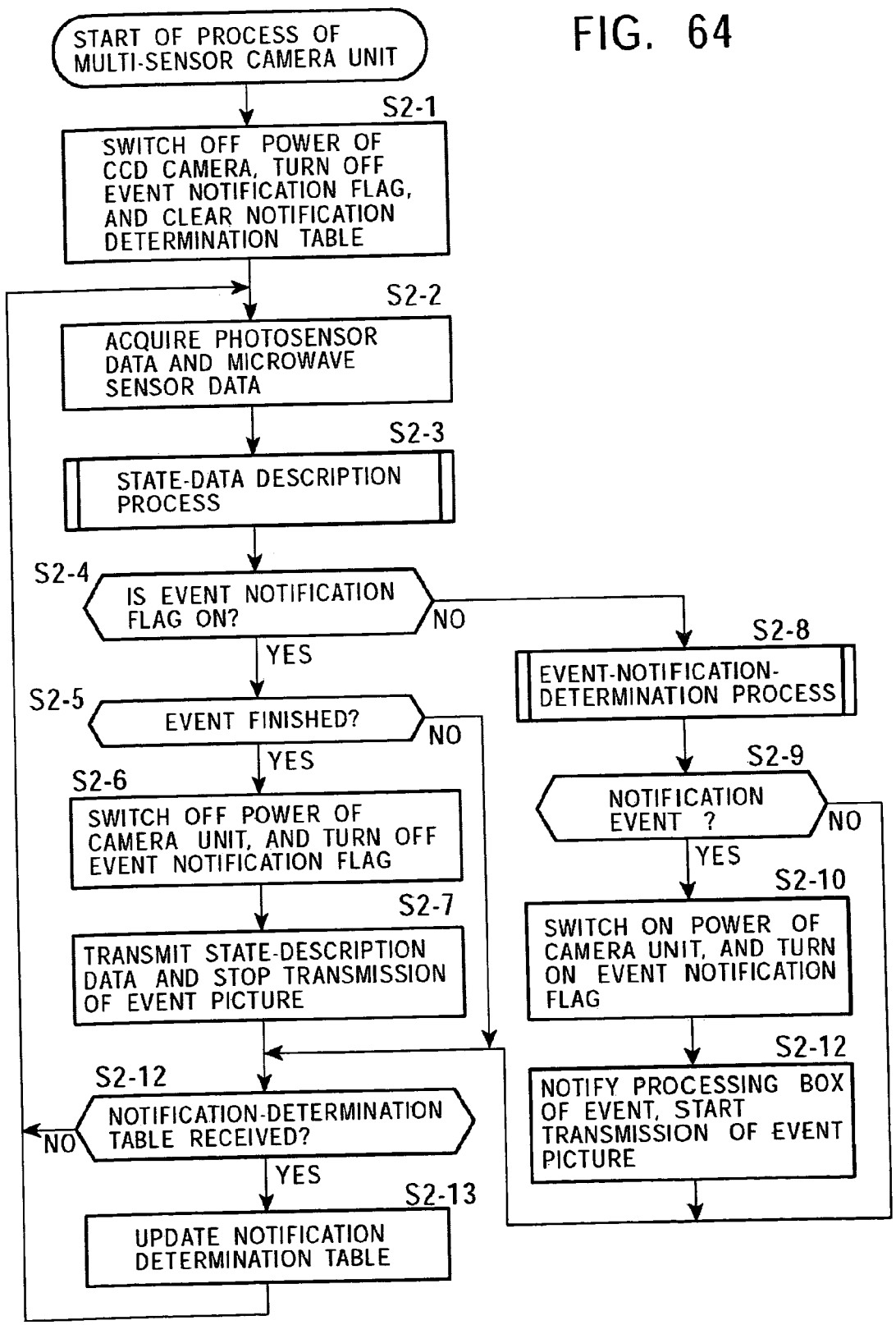
FIG. 64 is a flowchart showing a process of a multi-sensor camera unit.
Figure 65:
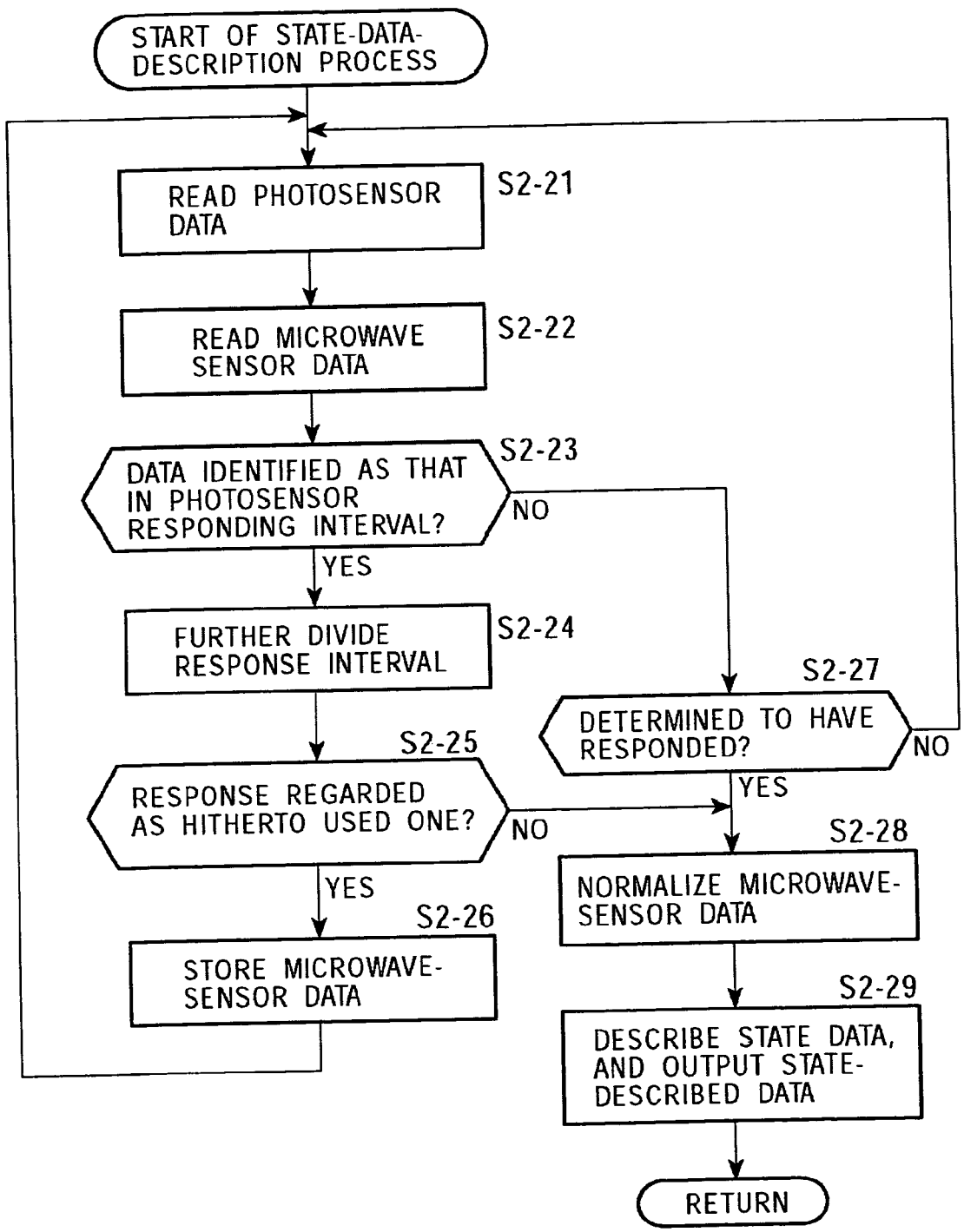
FIG. 65 is a detailed flowchart showing the state-data description process in step S2-3 shown in FIG. 64.

Details of the state-data description process in step S2-3 in FIG. 64 are described below with reference to the flowchart shown in FIG. 65.

In step S2-21, the state description unit 2-41 reads the photosensor data acquired by the photosensor 2-22. In step S2-22, the state description unit 2-41 reads the microwave sensor data acquired by the microwave sensor 2-23.

In step S2-23, from the photosensor data read in step S2-21, the state description unit 2-41 determines whether an interval in which the photosensor 2-22 responds is detected, that is, as shown in FIG. 45, the response interval 2-X in which the level of photosensor data (the detection signal 2-81) is away from reference value L is detected. If the state description unit 2-41 has determined that the interval in which the photosensor 2-22 responds is detected, it proceeds to step S2-24.

In step S2-24, the state description unit 2-41 divides the response interval of the photosensor 2-22 into the interval 2-A representing a departure from reference value L, the interval 2-B in which nothing changes, and the interval 2-C representing an approach to reference value L.

In step S2-25, based on the result of dividing the response interval of the photosensor 2-22, the state description unit 2-41 determines whether the response of the photosensor 2-22 is regarded as a response which has been detected. If the state description unit 2-41 has affirmatively determined, it proceeds to step S2-26.

In step S2-26, from the microwave sensor data read in step S2-22, the state description unit 2-41 adds up the numbers of approach responses, departure responses, or no responses, and stores the sums. After that, the state description unit 2-41 returns to step S2-21 and repeatedly executes the above-described processing.

If the state description unit 2-41 has determined in step S2-23 that the interval in which the photosensor 2-22 responds is not detected, it proceeds to step S2-27. In step S2-27, the state description unit 2-41 determines whether the photosensor 2-22 has been responding. If it has determined that the photosensor 2-22 has not been responding, it returns to step S2-21 and repeatedly executes the above-described processing.

If the state description unit 2-41 has determined in step S2-27 that the photosensor 2-22 has been responding, or if the state description unit 2-41 has determined in step S2-25 that the response of the photosensor 2-22 is regarded as a response which has been detected, it proceeds to step S2-28. In step S2-28, the state description unit 2-41 normalizes the numbers of approach responses, departure responses, and no responses stored in step S2-26 by using the number of total data items. This calculates characteristic values of the microwave sensor 2-23.

Figure 60:
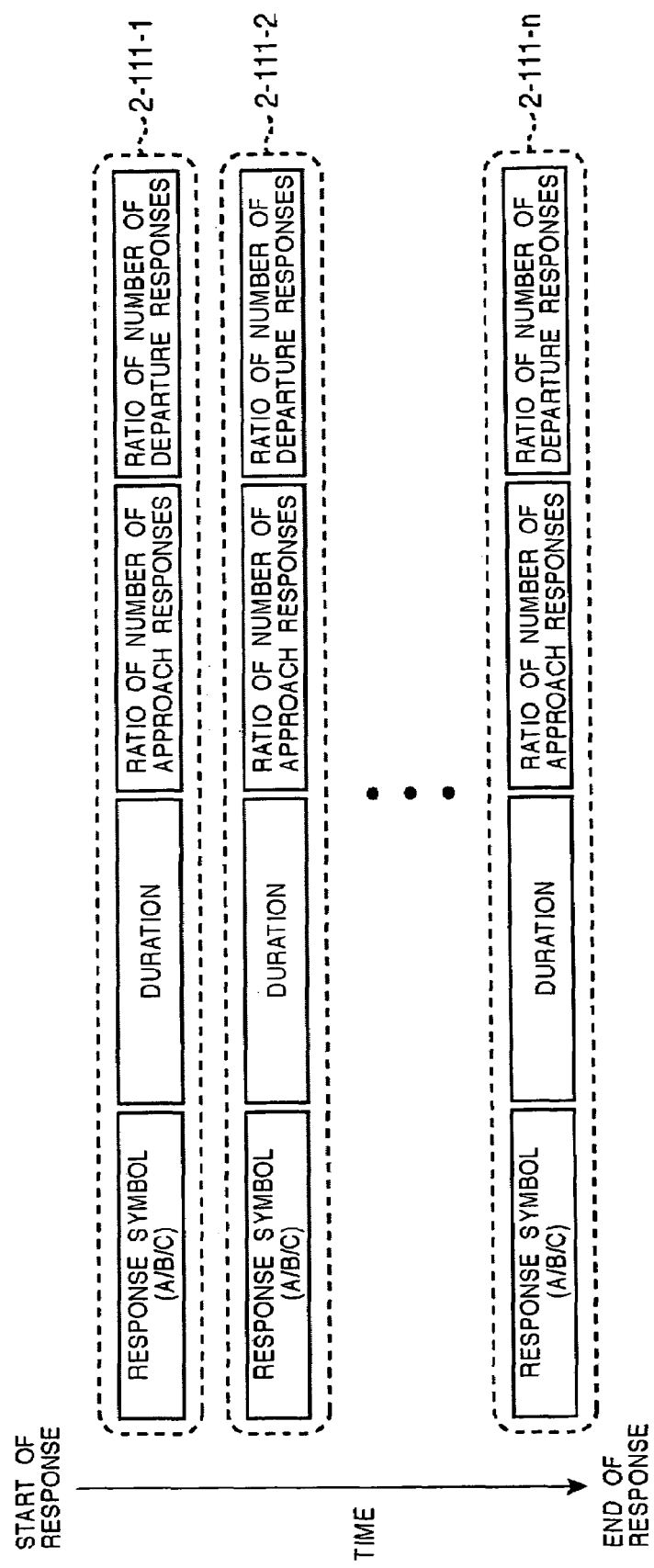
FIG. 60 is a chart showing examples of state description data.

In step S2-29, from the response symbol (2-A, 2-B, or 2-C) of the photosensor 2-22, duration of the response, and the microwave-sensor characteristic values (the ratio of numbers of approach responses and the ratio of numbers of departure responses) calculated in step S2-28, the state description unit 2-41 describes the state-description data 2-111 (FIG. 60). The state description unit 2-41 outputs the described data to the event notification determining unit 2-42 and to the switch 2-43.

In the above processing, the state-description data 2-111 output from the state description unit 2-41 is used for the event notification determination process in step S2-8, and is transmitted to the processing box 2-2 in step S2-11.

Figure 66:
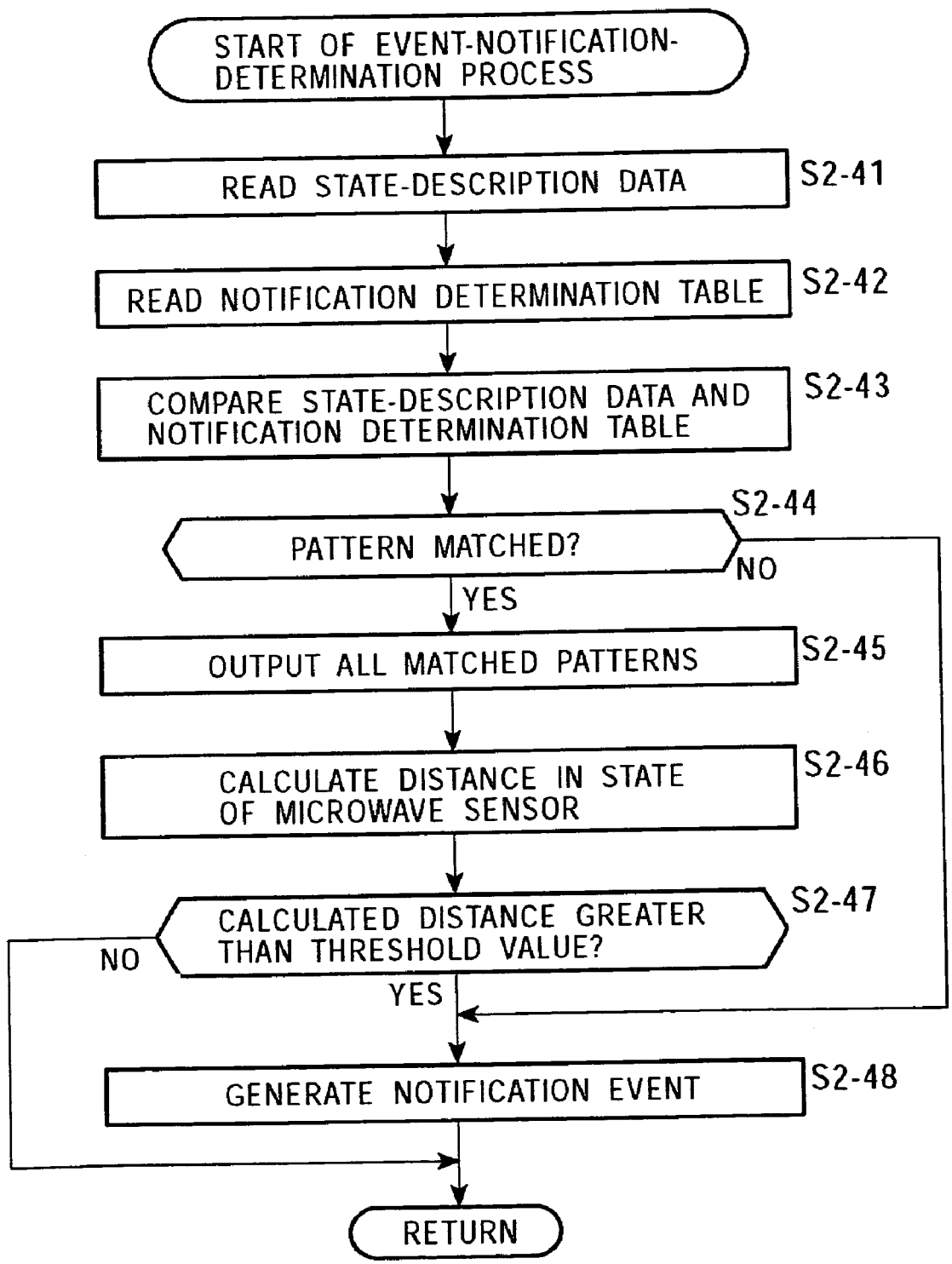
FIG. 66 is a detailed flowchart showing the event-notification-determination process in step S2-8 shown in FIG. 64.

Next, details of the event notification determination process in step S2-8 in FIG. 64 are described below with reference to the flowchart shown in FIG. 66.

In step S2-41, the pattern matching determination unit 2-121 in the event notification determining unit 2-42 reads the state-description data 2-111 (output in step S2-29 in FIG. 65) output from the state description unit 2-41. In step S2-42, the pattern matching determination unit 2-121 reads the notification determination table (FIG. 63) from the notification-determination-table storage unit 2-122.

In step S2-43, the pattern matching determination unit 2-121 compares the response symbol and duration (of the response) concerning the photosensor 2-22 which are included in the state-description data 2-111 and which are read in step S2-41 with a response symbol and the maximum and minimum of duration included in state-description data 2-151 in a pattern 2-141 in the notification determination table (FIG. 63) read in step S2-42.

In step S2-44, based on the result of determination in step S2-43, the pattern matching determination unit 2-121 determines whether there are patterns matching each other, that is, whether there is each item of the state-description data 2-151 which includes an identical response symbol and in which the range between the maximum and minimum of duration includes the duration included in the state description data 2-111.

If the pattern matching determination unit 2-121 has determined in step S2-44 that there are the patterns matching each other, it proceeds to step S2-45. In step S2-45, the pattern matching determination unit 2-121 extracts, from the notification determination table, all items of the state-description data 2-151 which match those of the state-description data 2-111, and outputs the extracted items to the microwave-sensor state-distance determining unit 2-123.

In step S2-46, based on the state-description data 2-111 output by the pattern matching determination unit 2-121 in step S2-45 and the state-description data 2-151 in the notification determination table, the microwave-sensor state-distance determining unit 2-123 performs distance determination in the state of the microwave sensor 2-23. The microwave-sensor state-distance determining unit 2-123 calculates the distance between each of pairs of the ratios of numbers of approach responses and ratios of numbers of departure responses by the microwave sensor 2-23, which correspond to the response symbols in the state-description data 2-151 in the notification determination table, and each of pairs of the ratio of numbers of approach responses and ratio of numbers of departure responses by the microwave sensor 2-23, which correspond to the response symbols in the state-description data 2-111 at the present time.

In step S2-47, the microwave-sensor state-distance determining unit 2-123 determines whether each of all the distances calculated in step S2-46 is equal to a predetermined threshold value or greater. If it has determined that each of all the distances calculated in step S2-46 is equal to the predetermined threshold value or greater, it proceeds to step S2-48. In addition, also when it is determined in step S2-44 that there are no identical patterns, the process proceeds to step S2-48.

In step S2-48, the microwave-sensor state-distance determining unit 2-123 generates an event (notification event) to be reported to the processing box 2-2. In step S2-47, when it is determined that, among the distances calculated in step S2-46, there are those that are not equal to the predetermined threshold value or greater, step S2-48 is skipped over. In this case, the notification event is not generated (non-notification event).

When the above processing allows the event notification determining unit 2-42 to generate the notification event, in step S2-9 in FIG. 64, the power of the CCD camera 2-21 is switched on and the event notification flag is turned on. In step S2-10, the processing box 2-2 is notified of the event and transmission of notification picture data (event picture) is started.

In the initial state of the multi-sensor camera unit 2-1, the notification determination table has not been transmitted from the processing box 2-2 yet, and the event notification determining unit 2-42 retains this notification determination table. Thus, when the security camera 1-11 is supplied from the state description unit 2-41, a notification event is immediately generated.

Next, a process of the processing box 2-2 which is executed correspondingly to the process (shown in FIG. 64) of the multi-sensor camera unit 2-1 is described below with reference to the flowchart shown in FIG. 67.

This process is started when the user instructs the processing box 2-2 to display pictures based on a general audiovisual signal (broadcast program signal), or when the user commands starting monitoring in the monitoring region.

In step S2-61, the notification-determination-table updating unit 2-54 clears the state-description data stored in the state-description-data storage unit 2-53 and the provisional notification determination table stored in the provisional-notification-determination-table storage unit 2-135, and turns off a user FB receiving flag. The receiving unit 2-51 turns off the event receiving flag and the state-description-data receiving flag.

In step S2-62, the receiving unit 2-51 determines whether the event receiving flag is on (the notification event is being received). If the receiving unit 2-51 has determined that the event receiving flag is on, (in step S2-11 shown in FIG. 64) it supplies the display picture creating unit 2-52 with the notification picture data and notification event transmitted from the multi-sensor camera unit 2-1, and proceeds to step S2-63.

In step S2-63, the display picture creating unit 2-52 creates notification data (picture data for picture-in-picture display) obtained by inserting, in a part of the general audiovisual signal, the notification picture data supplied from receiving unit 2-51, and controls the display unit 2-3 to display a picture based on the created data. In addition, the display picture creating unit 2-52 creates notification data (data composed of the notification data) for the remote controller 2-4 which includes no general audiovisual signal, and transmits the created signal to the remote controller 2-4. The remote controller 2-4 receives the notification data and controls the display unit 2-62 to display a picture based on the notification data (in step S2-112 in FIG. 69 described later).

If the receiving unit 2-51 has determined in step S2-62 that the event receiving flag is not on but off, it proceeds to step S2-64. In step S2-64, the receiving unit 2-51 determines whether to have received the notification event from the multi-sensor camera unit 2-1. If it has determined to have received the notification event, it proceeds to step S2-65 and turns on the event receiving flag.

After step S2-63, after step S2-65, or, in step S2-64, if the receiving unit 2-51 has determined not to have received the notification event, the process proceeds to step S2-66. In step S2-66, the receiving unit 2-51 determines whether to have received the state-description data 2-111 from the multi-sensor camera unit 2-1.

If the receiving unit 2-51 has determined in step S2-66 to have received the state-description data 2-111, it proceeds to step S2-67 and turns on the state-description-data receiving flag. In step S2-68, the receiving unit 2-51 receives the state-description data 2-111 transmitted from the multi-sensor camera unit 2-1 (in the above step S2-7 in FIG. 64), and stores the received data in the state-description-data storage unit 2-53. However, when the user FB receiving flag has already been on, the state-description data 2-111 is stored so as to be associated with the feedback.

After step S2-68, or in step S2-66, if the receiving unit 2-51 has determined not to have received state description data 2-111, it proceeds to step S2-69. In step S2-69, the notification-determination-table updating unit 2-54 determines whether to have received the user FB signal transmitted (in step S2-114) from the remote controller 2-4 through the receiving unit 2-57. If it has determined to have received the user FB signal, it proceeds to step S2-70.

In step S2-70, the notification-determination-table updating unit 2-54 turns on the user FB receiving flag and the receiving unit 2-51 turns off the event receiving flag. In step S2-71, at this time, the notification-determination-table updating unit 2-54 associates the user feedback "OK (Need to be notified from then onward)" or "NG (No need to be notified from then onward)" with the state description data 2-111 stored in the state-description-data storage unit 2-53 when the state-description-data receiving flag is on, and stores the user feedback as new user feedback when the state-description-data receiving flag is off. In addition, when the event receiving flag is off, the user feedback may be ignored.

In other words, by storing the user feedback as the notification determination table so as to be associated with the state description data 2-111, only an event desired by the user can be detected and reported.

In step S2-72, the notification-determination-table updating unit 2-54 determines whether both the state-description-data receiving flag and the user FB receiving flag are on. If it has determined that both flags are on, it proceeds to step S2-73 and performs a notification-determination-table updating process. Details of the notification-determination-table updating process are described later with reference to the flowchart shown in FIG. 68. This process updates the notification determination table stored in the past-notification-determination-table storage unit 2-137.

In step S2-74, when, in step S2-73, a notification determination table different from a past notification determination table is created and the past notification determination table is stored in the past-notification-determination-table storage unit 2-137, the notification-determination-table updating unit 2-54 transmits the new notification determination table to the multi-sensor camera unit 2-1 through the transmitting unit 2-55. The multi-sensor camera unit 2-1 receives the new notification determination table and updates the notification-determination-table storage unit 2-122 (in the above step S2-13 in FIG. 64).

In step S2-75, the notification-determination-table updating unit 2-54 turns of the state-description-data receiving flag and the user FB receiving flag.

After step S2-75, or in step S2-72, if the notification-determination-table updating unit 2-54 has determined that at least one of the state-description-data receiving flag and the user FB receiving flag is not on, it returns to step S2-62 and the above processing is repeatedly executed.

Figure 67:
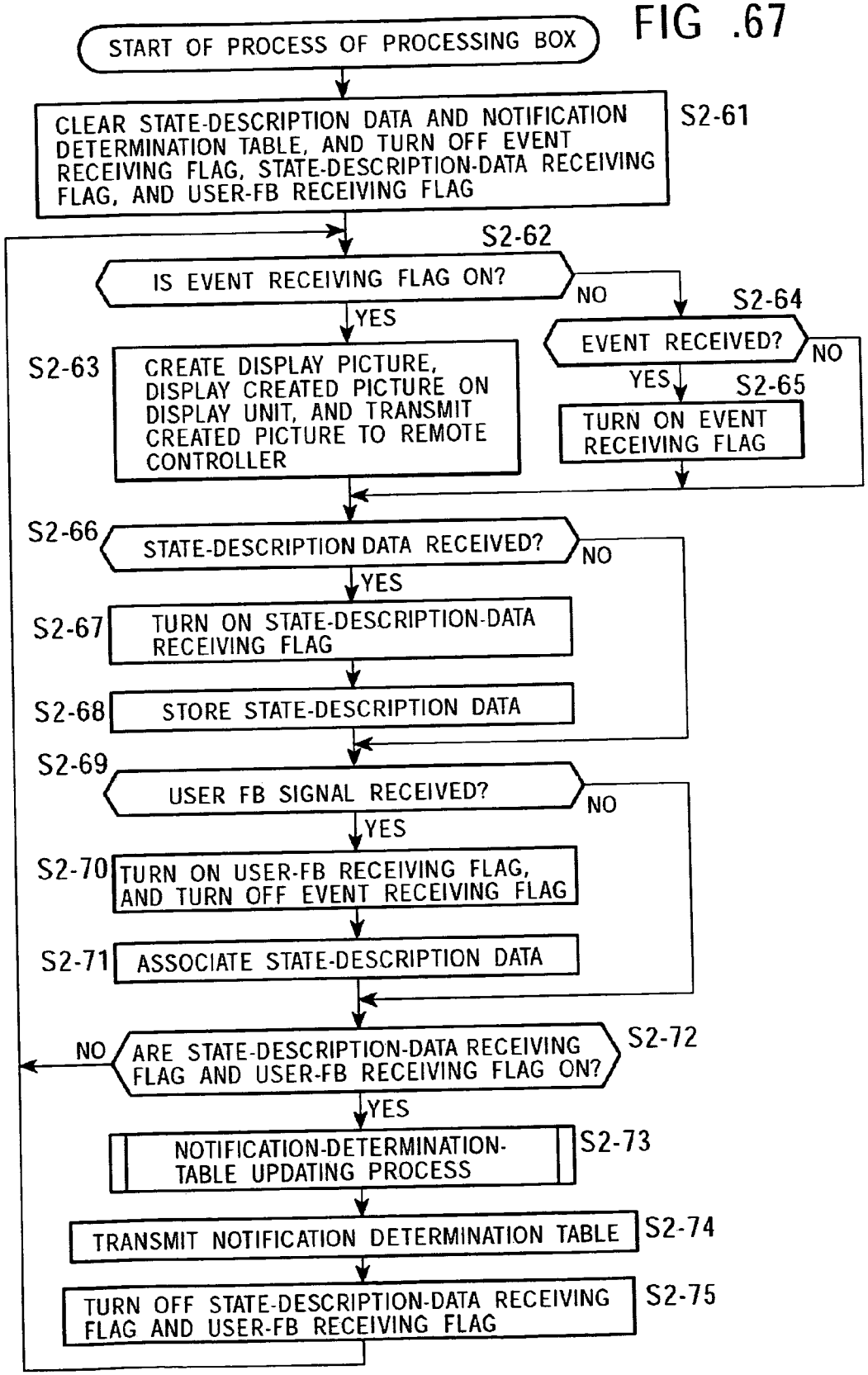
FIG. 67 is a flowchart showing a process of a processing box.
Figure 68:
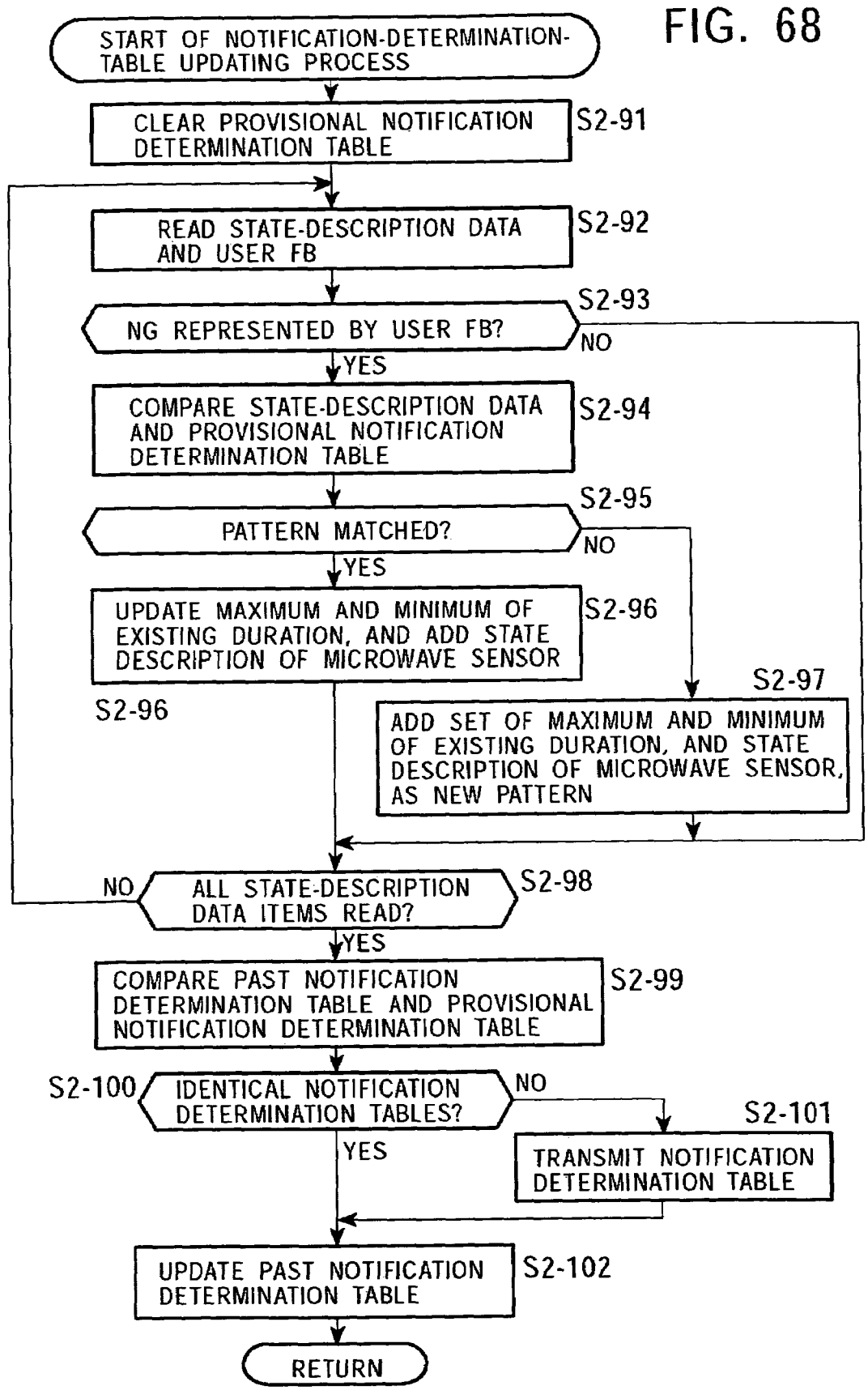
FIG. 68 is a detailed flowchart showing the notification-determination-table updating process in step S2-73 shown in FIG. 67.

Details of the notification-determination-table updating process in step S2-73 in FIG. 67 are described below with reference to the flowchart shown in FIG. 68.

In step S2-91, the state-description-pattern comparing unit 2-132 in the notification-determination-table updating unit 2-54 clears the provisional notification determination table stored in the provisional-notification-determination-table storage unit 2-135. In step S2-92, the user FB determination unit 2-131 reads the state description data 2-111 stored in the state-description-data storage unit 2-53 and the corresponding user feedback.

In step S2-93, the user FB determination unit 2-131 determines whether the user feedback read in step S2-92 is data representing "NG (No need to be notified from then onward)". If it has determined that the user feedback read in step S2-92 is data representing "NG", it supplies the result of determination to the state-description-pattern comparing unit 2-132 with the state-description data 2-111 (FIG. 60), and proceeds to step S2-94.

In step S2-94, the state-description-pattern comparing unit 2-132 compares the response symbol (2-A, 2-B, or 2-C) concerning the state of the photosensor 2-22 which is included in the state-description data 2-111 supplied from the user FB determination unit 2-131, with a response symbol included in the state-description data 2-151 in the pattern of the provisional notification determination table (FIG. 63) which is stored in the provisional-notification-determination-table storage unit 2-135.

In step S2-95, based on the result of comparison, the state-description-pattern comparing unit 2-132 determines whether there are identical patterns, that is, whether there is the pattern 2-141, which has an identical response symbol. If it has determined that there is the pattern 2-141, which has the identical response symbol, it supplies the existing-pattern updating unit 2-134 with the state-description data 2-111 and the pattern 2-142, which matches it, and proceeds to step S2-96.

In step S2-96, the existing-pattern updating unit 2-134 compares duration which is included in the state-description data 2-111 at the present time and which is supplied from the state-description-pattern comparing unit 2-132, with each of the maximum and minimum of duration corresponding to the pattern 2-141 which matches the state-description data 2-111.

Based on the result of comparison, if the existing-pattern updating unit 2-134 has determined that the duration of the state-description data 2-111 at the present time is shorter than the minimum of the duration corresponding to the matching pattern 2-141, it replaces (updates) the minimum of the duration corresponding to the matching pattern 2-141 by the duration of the state-description data 2-111. Conversely, if the existing-pattern updating unit 2-134 has determined that the maximum of the duration corresponding to the matching pattern is longer than the duration of the state-description data 2-111 at the present time, it replaces (updates) the maximum of the duration of the matching pattern 2-141 by the duration of the state-description data 2-111 at the present time, and stores the updated value as an updated notification determination table in the provisional-notification-determination-table storage unit 2-135. In addition, for each response symbol representing the state of the photosensor 2-22, the existing-pattern updating unit 2-134 adds the ratio of numbers of approach responses and ratio of numbers of departure responses (representing the state of the microwave sensor 2-23) which are included in the state-description data 2-111.

In step S2-95, based on the result of comparison, if the state-description-pattern comparing unit 2-132 has determined that there are no there are identical patterns, it supplies the state-description data 2-111 to the new-pattern creating unit 2-133, and proceeds to step S2-97.

In step S2-97, the new-pattern creating unit 2-133 additionally stores, in the provisional-notification-determination-table storage unit 2-135, as the maximum and minimum of duration in a new notification determination table, the response symbol and corresponding duration included in the state-description data 2-111 supplied from the state-description-pattern comparing unit 2-132. In addition, for each response symbol representing the state of the photosensor 2-22, the new-pattern creating unit 2-133 adds the ratio of numbers of approach responses and ratio of numbers of departure responses included in the state-description data 2-111 at the present time.

After step S2-96, or, after step S2-97, in step S2-98, the user FB determination unit 2-131 determines whether to have read all the items of the state-description data 2-111 and corresponding pieces of user feedback which are stored in the state-description-data storage unit 2-53. When there is an item which has not been read yet, the process returns to step S2-92 and the above-described processing is repeatedly executed.

If, in step S2-98, the user FB determination unit 2-131 has determined to have read all the items of the state-description data 2-111 and the corresponding pieces of user feedback, it proceeds to step S2-99. In step S2-99, the table comparing unit 2-136 compares the past notification determination table stored in the past-notification-determination-table storage unit 2-137 and the provisional notification determination table stored in the provisional-notification-determination-table storage unit 2-135.

In step S2-100, based on the result of comparison in step S2-99, the table comparing unit 2-136 determines whether the past notification determination table and the provisional notification determination table are identical to each other. If it has determined that both are not identical, it proceeds to step S2-101, and transmits, to the transmitting unit 2-55, the provisional notification determination table stored in the provisional-notification-determination-table storage unit 2-135 before proceeding to step S2-102. This allows the provisional notification determination table to be transmitted to the multi-sensor camera unit 2-1 in step S2-74.

If the table comparing unit 2-136 has determined that both tables are identical to each other, or in step S2-102 after step S2-101, the table comparing unit 2-136 supplies the past-notification-determination-table storage unit 2-137 with the provisional notification determination table stored in the provisional-notification-determination-table storage unit 2-135. The supplied notification determination table is used as an updating notification determination table for updating.

In the above-described processing, the notification determination table composed of the patterns 2-141-1 to 2-141-$k$ as shown in FIG. 63 is stored in the past-notification-determination-table storage unit 2-137. It may be said that this notification determination table stores patterns which do not need to be reported as events.

Figure 69:
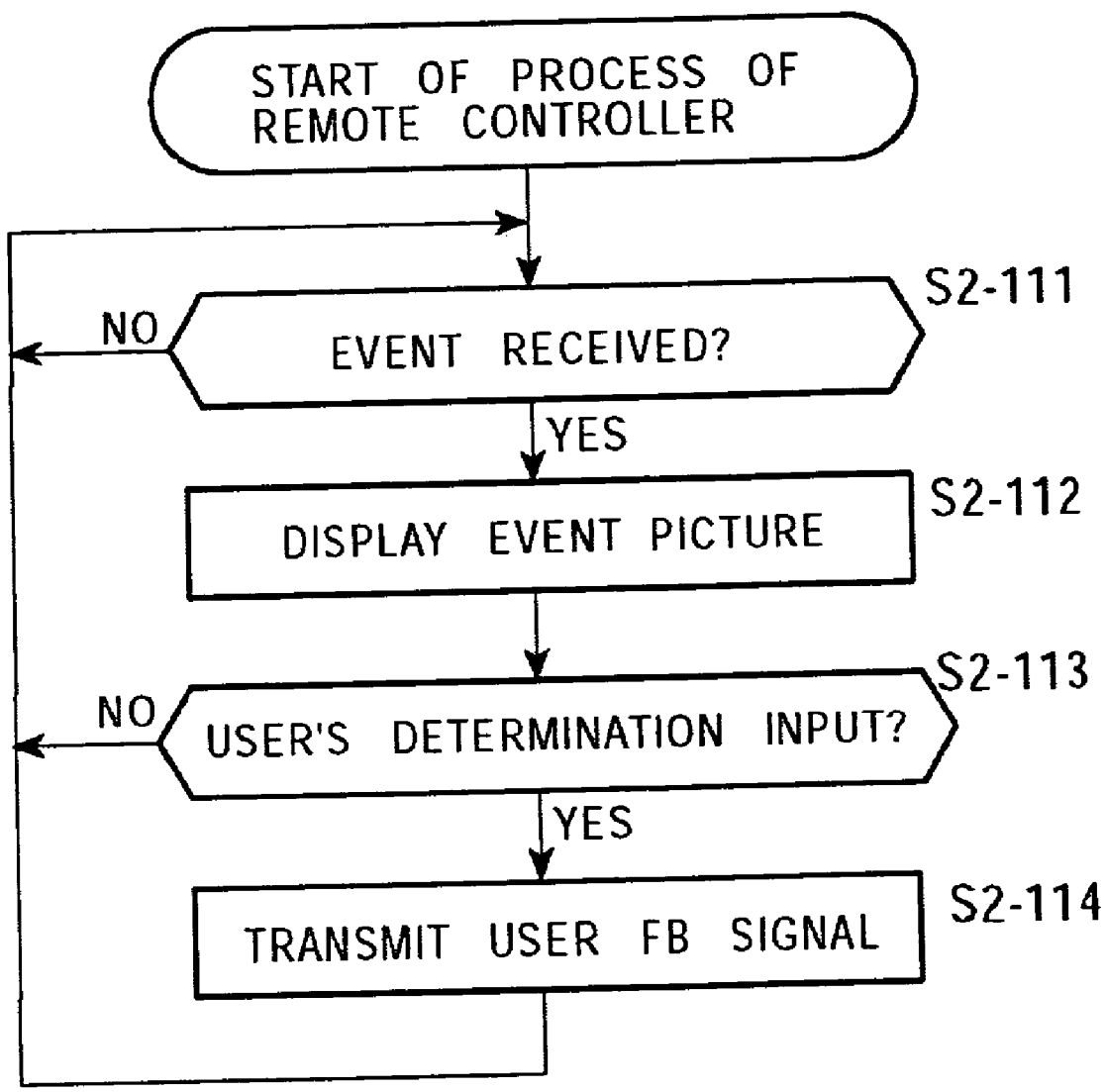
FIG. 69 is a flowchart showing a process of a remote controller.

Next, a process of the remote controller 2-4 which is executed correspondingly to the process (in FIG. 67) of the processing box 2-2 is described below with reference to the flowchart shown in FIG. 69.

This process of the remote controller 2-4 is started when the transmitting unit 2-56 in the processing box 2-2 executes step S2-63 in FIG. 67.

In step S2-111, the receiving unit 2-61 determines whether to have received the notification event from the processing box 2-2. The receiving unit 2-61 is on standby until it receives the notification event. If it has determined to have received the notification event, it proceeds to step S2-112. In step S2-112, the receiving unit 2-61 controls a display unit 2-62 to display an event picture based on notification data transmitted with the notification event from the processing box 2-2 (in the above step S2-63 in FIG. 67).

By operating an input unit 2-63 while viewing the event picture displayed on the display unit 2-62, the user inputs a determination (for example, whether the displayed event is to be reported from then onward, or whether the displayed event is not to be reported from then onward).

In step S2-113, the input unit 2-63 determines whether to have received the determination (user feedback) input for the displayed event. If it has determined to have received the determination, it supplies the user FB signal to the transmitting unit 2-64 and proceeds to step S2-114.

In step S2-114, the transmitting unit 2-64 transmits, to the processing box 2-2, the user FB signal supplied from the input unit 2-63. The processing box 2-2 receives and associates the user FB signal with the state-description data 2-111 stored in the state-description-data storage unit 2-53 (in step S2-71 in FIG. 67).

After step S2-114, or, in step S2-113, if the input unit 2-63 has determined not to have received the determination (user feedback), the process returns to step S2-111 and the above-described processing is repeatedly executed.

As described above, by combining the response of the photosensor 2-22 and the characteristic value of the microwave sensor 2-23, actions of a person which cannot be identified can be identified in a short time and with high accuracy.

Based on the response of the photosensor 2-22 and the characteristic value of the microwave sensor 2-23, the state description unit 2-41 in the multi-sensor camera unit 2-1 describes the state-description data 2-111 (FIG. 60) and uses the described data in a notification event. Thus, a very effective event notification system can be formed.

In addition, since a notification determination table for use in determination of event notification is changed (updated) based on feedback from the user, only an event desired by the user can be detected, and, since the power of the CCD camera 2-21 is switched on only if an event is reported, unnecessary power consumption of the battery can be reduced.

Although the multi-sensor camera unit 2-1 is provided with one photosensor 2-22, the present invention is not limited to this number. For example, as shown in FIG. 70, the multi-sensor camera unit 2-1 may be provided with three photosensors 2-22-1 to 2-22-3.

Figure 70:
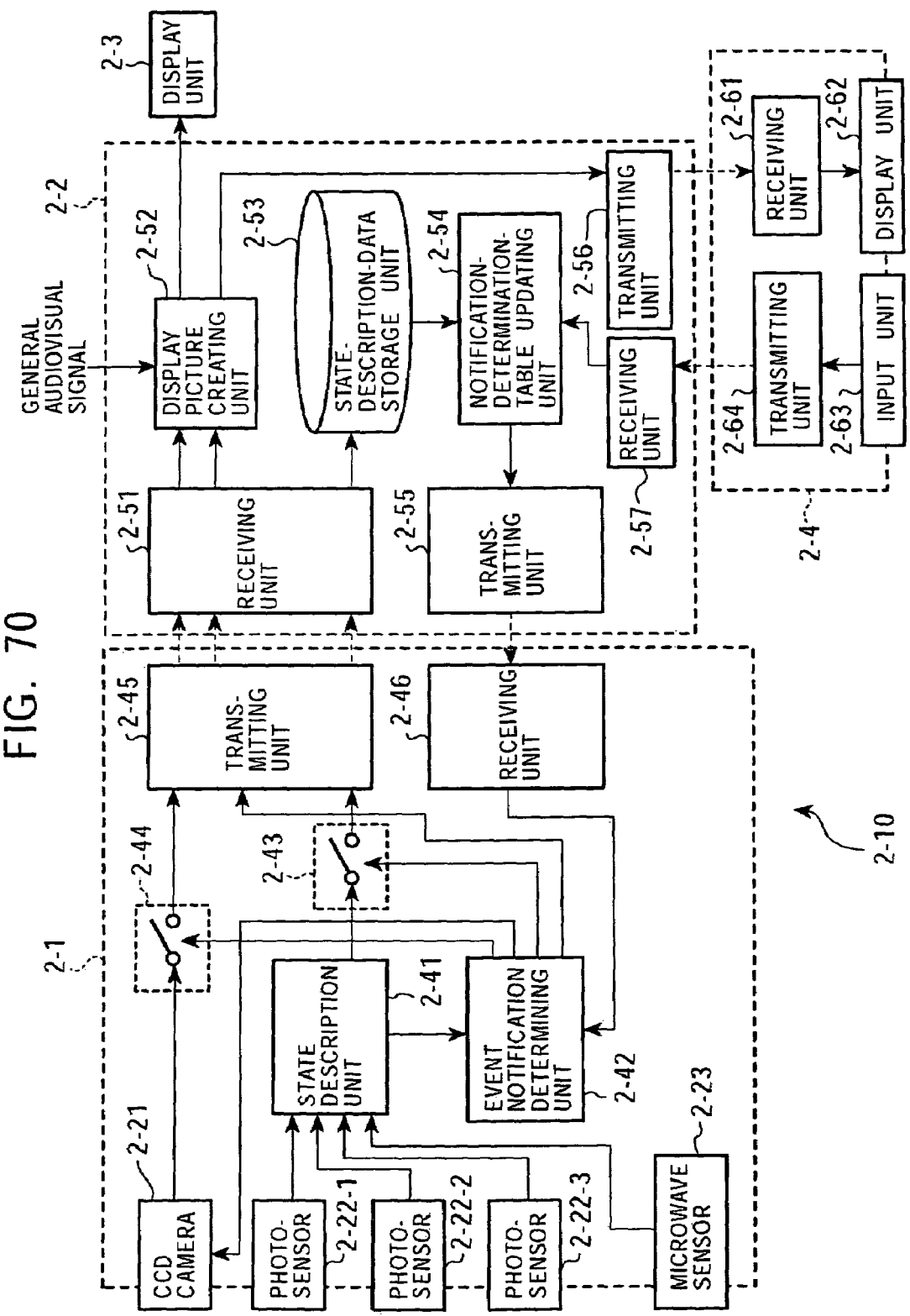
FIG. 70 is a block diagram showing another example of the configuration of the monitoring system to which the present invention is applied.

The monitoring system 2-10 shown in FIG. 70 include three photosensors 2-22-1 to 2-22-3, and the other components are similar to those in the monitoring system 2-10 shown in FIG. 42. Accordingly, a description of the components is omitted, if needed.

Figure 71:
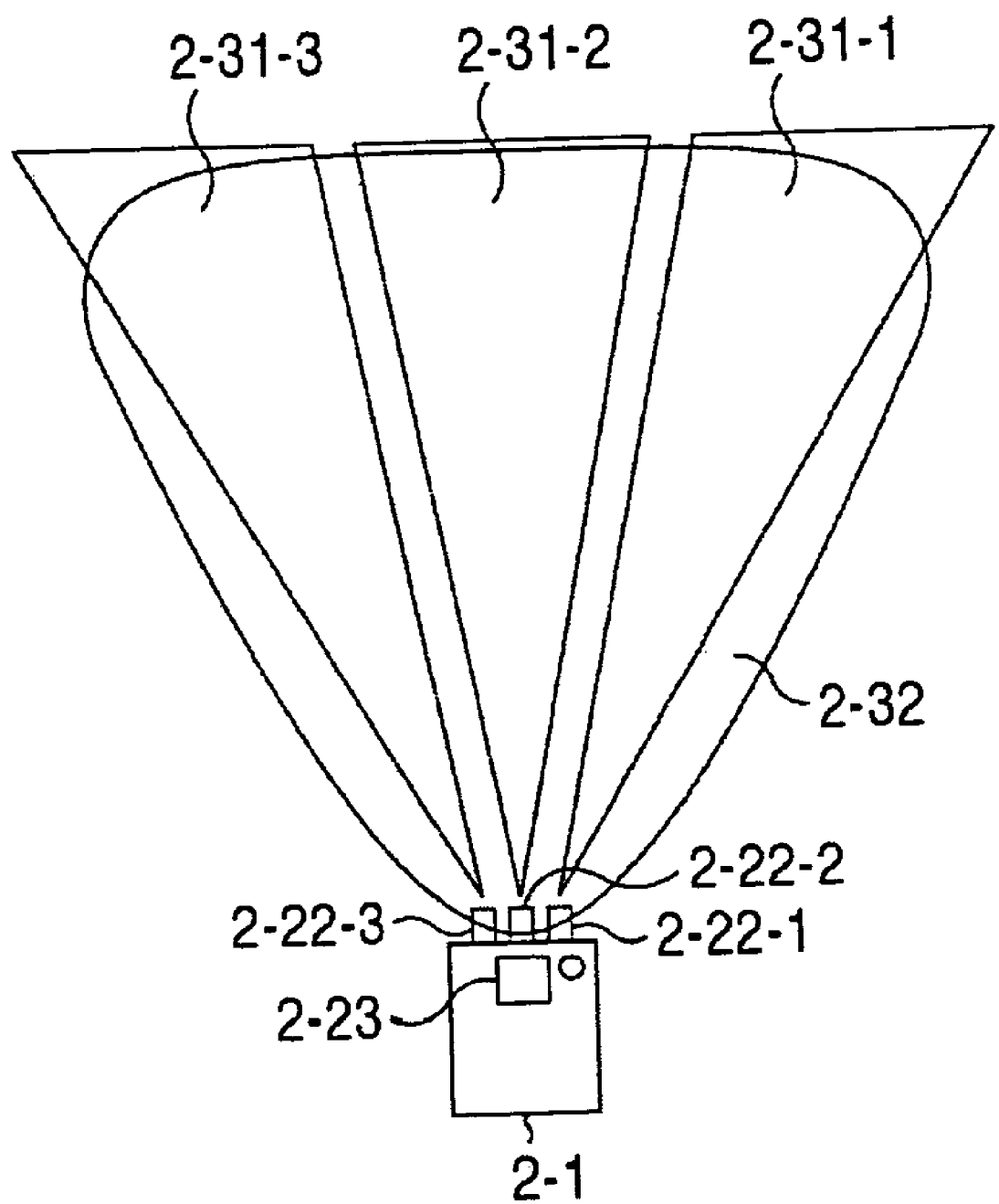
FIG. 71 is a schematic illustration of monitoring regions of photosensors as shown in FIG. 70.

FIG. 71 shows the monitoring regions of the photosensors 2-22-1 to 2-22-3 shown in FIG. 70. As shown in FIG. 71, the photosensors 2-22-1 to 2-22-3 are arranged in spatial direction array. Each of the photosensors 2-22-1 to 2-22-3 outputs an average brightness in each of monitoring regions 2-31-1 to 2-31-3. The level of the output average brightness changes when a person enters or leaves each of the monitoring regions 2-31-1 to 2-31-3.

Based on photosensor data supplied from the photosensors 2-22-1 to 2-22-3 and microwave sensor data supplied from a microwave sensor 23, the state description unit 2-41 describes state-description data 2-111 (FIG. 60) (sensor response) concerning consecutive actions of the person 2-71 in the monitoring regions 2-31-1 to 2-31-3.

FIG. 72 shows examples of response symbols of the photosensors 2-22-1 to 2-22-3 which are described in the state description unit 2-41.

From the photosensor data (the detection signal 2-81) supplied from the photosensor 2-22-1, as described above in FIG. 45, the state description unit 2-41 performs classification into the interval 2-A in which the level of the detection signal 2-81 changes in a direction departing from reference value L, the interval 2-B in which the level of the detection signal 2-81 does not change at all, and the interval 2-C in which the level of the detection signal 2-81 changes in a direction approaching reference value L. The state description unit 2-41 describes one of response symbols CA, CB, and CC as the state of the photosensor 2-22-2 correspondingly to one of the intervals 2-A to 2-C, and describes one of response symbols RA, RB, and RC as the state of the photosensor 2-22-3. In the description, the state description unit 2-41 also describes duration of the response for each response interval.

In addition, from the microwave sensor data (characteristic value) supplied from the microwave sensor 2-23, as described above with reference to FIG. 50, the state description unit 2-41 describes, as the state of the microwave sensor 2-23, the ratios (0.0 to 1.0) of numbers of approach responses and the ratios (0.0 to 1.0) of numbers of departure responses in the response intervals LA to LC of the photosensor 2-22-1, the response intervals CA to CC of the photosensor 2-22-2, the response intervals RA to RC of the photosensor 2-22-3.

In other words, in the state description unit 2-41, the response symbols and duration representing the photosensors 2-22-1 to 2-22-3, and the numbers approach responses and the numbers of departure responses which represent the state of the microwave sensor 2-23 are used as each unit, and a consecutive arrangement of the units in the temporal axis direction is described as the state-description data 2-111.

The process of the multi-sensor camera unit 2-1 in this case is basically similar to that described with reference to the flowchart shown in FIG. 64. The process of the processing box 2-2 is basically similar to that described with reference to the flowchart shown in FIG. 63. The process of the remote controller 2-4 is basically similar to that described with reference to FIG. 69. Accordingly, a description of each process is omitted. There are differences in that processing is performed based on the photosensor data acquired by the photosensors 2-22-1 to 2-22-3, and that the state-description data 2-111 and notification determination table for use in processing include the response symbol LA, LB, LC, CA, CB, CC, RA, RB, or RC.

As described above, by combining the responses of the photosensors 2-22-1 to 2-22-3 and the characteristic value of the microwave sensor 2-23, an action of a person which cannot be identified by one photosensor 2-22 can be identified in more detail.

Examples of the case of using the photosensor 2-22 and the microwave sensor 2-23 in integrated form have been described. However, the present invention is not limited to the examples. Definitely, for example, a microphone, an infrared sensor, and other types of sensors may be provided and used in integrated form.

The number of multi-sensor camera units 2-1 and the number of display units 2-3 may be not singular but plural. The processing box 2-2 and the display unit 2-3 are housed not in separate housings but in integrated form. The remote controller 2-4 may be provided with only the display unit 2-3 without being provided with the display unit 2-62. Alternatively, the processing box 2-2 may be provided with an input unit for inputting user feedback.

The above consecutive processes may be executed either by hardware or by software. In the case of using software to execute the consecutive processes, programs constituting the software are installed from, for example, a network or a recording medium into a computer built into dedicated hardware, or into, for example, a multi-purpose personal computer in which various functions can be executed by installing various programs.

Figure 73:
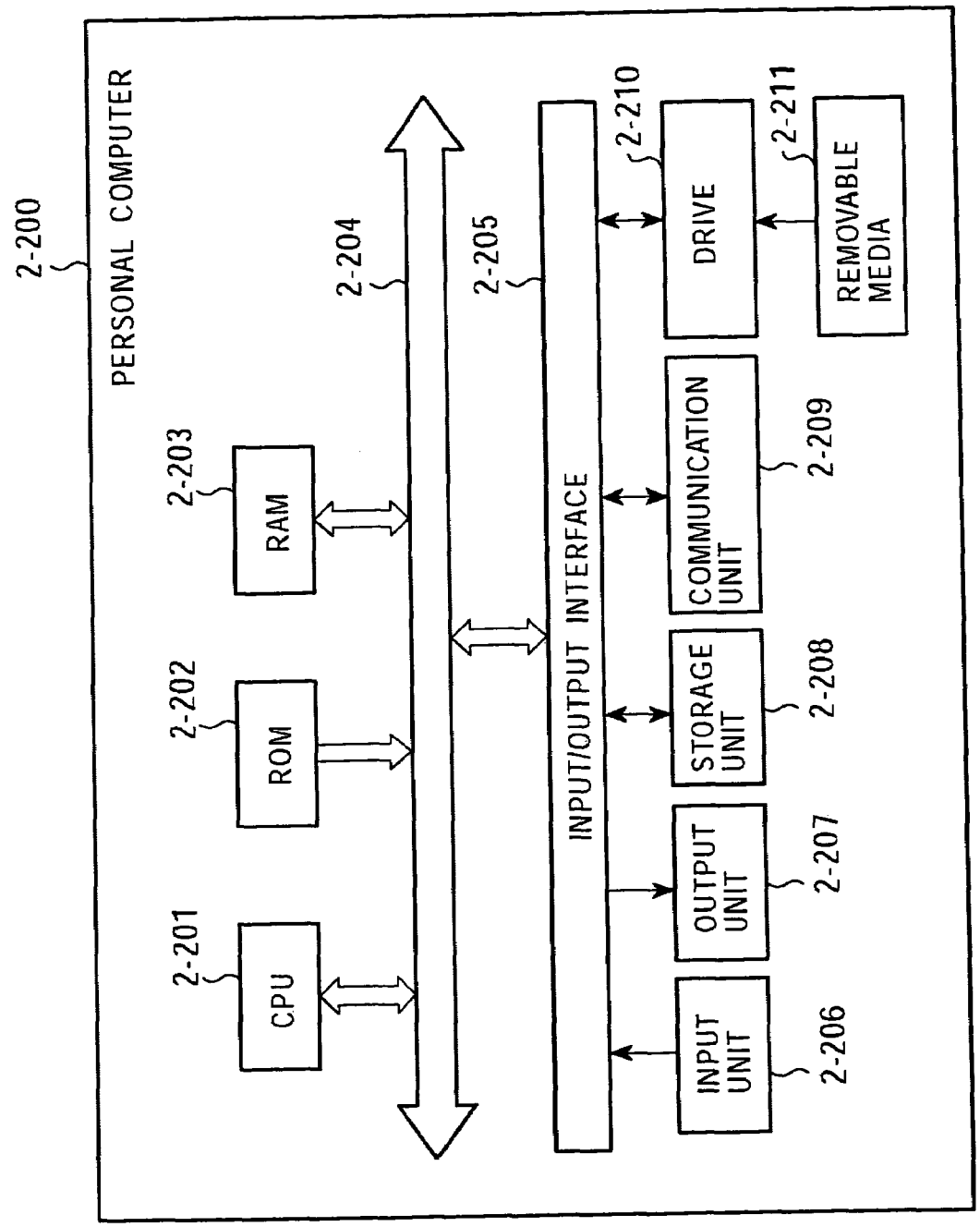
FIG. 73 is a block diagram showing a multi-purpose personal computer.

FIG. 73 is an internal block diagram showing a multi-purpose personal computer 2-200. A central processing unit (CPU) 2-201 executes various types of processing in accordance with programs stored in a read-only memory (ROM) 2-202, or a program loaded from a storage unit 2-208 into a random access memory (RAM) 2-203. The RAM 2-203 stores the data required for the CPU 2-201 to execute the various types of processing, if needed.

The CPU 2-201, the RAM 2-202, and the RAM 2-203 are connected to one another by a bus 2-204. The bus 2-204 also connects to an input/output interface 2-205.

The input/output interface 2-205 also connects to an input unit 2-206 including buttons, switches, and a keyboard, an output unit 2-207 including a display, such as a cathode ray tube or a liquid crystal display, and a speaker, the storage unit 2-208, which includes a hard disk, and a communication unit 2-209 including a modem and a terminal adapter. The communication unit 2-209 performs communication processing through networks including the Internet.

The input/output interface 2-205 also connects to a drive 2-210, if needed. Removable media 2-211 including a magnetic disk, an optical disk, a magneto-optical disk, or a semiconductor memory is loaded into the drive 2-210, and a computer program read from the removable media 2-211 is installed.

As shown in FIG. 73, recording media containing programs which are installed into a computer and set to be executable by the computer are formed, not only by the removable media 2-221, which include a program-recoded magnetic disk (including a flexible disk), optical disk (including a compact-disk read-only memory and a digital versatile disk), magneto-optical disk (MiniDisc®), and semiconductor memory, which are distributed for providing users with programs separately from the apparatus body, but also by the hard disks included in the ROM 2-203 or the storage unit 2-208, which contains programs and which is provided in a state built into the apparatus body beforehand.

Steps executing the above-described consecutive processes in this specification include, not only processing steps performed in a time-series manner in order given, but also processing steps which are not always performed in a time-series manner and which are performed in parallel or separately.

In this specification, steps constituting a program stored in a program storage medium include, not only processing steps performed in a time-series manner in accordance with order given, but also processing steps which are not always performed in a time-series manner and which are performed in parallel or separately.

In addition, in this specification, the term "system" represents entirety constituted by a plurality of apparatuses.

What is claimed is:

1. An object detecting apparatus, comprising:
a plurality of photosensors which detect a direction in which an object moves and which output a detection signal representing the direction of the object move;
a microwave sensor which performs object detection and which outputs a discrimination signal representing approach or departure of the object, the microwave sensor being configured to transmit waves toward the object, to measure Doppler shift of the waves reflected from the object, and to calculate a speed of the object based on the measured Doppler shift;
an acquiring unit which acquires information concerning the object;
a control unit configured to, based on the detection signal output from said plurality of photosensors and the discrimination signal output from said microwave sensor, generate state data representing the state of the object, and based on the state data, control activation of said acquiring unit; and
a state description unit configured to calculate a normalized ratio of number of approach responses to a total number of responses from the microwave sensor and a normalized ratio of number of departure responses to the total number of responses from the microwave sensor, and to control the activation of the acquiring unit based on the normalized ratio of number of approach responses and the normalized ratio of number of departure responses.

2. The object detecting apparatus according to claim 1, wherein the state data is detection information representing movement of the object.

3. The object detecting apparatus according to claim 1, wherein:
the plurality of photosensors output a plurality of detection signals, respectively; and
said control unit specifies, based on the detection signals output from the plurality of photosensors, a direction in which the object moves, and generates the state data by identifying, based on the discrimination signal output from said second sensor, the approach or departure of the object.

4. The object detecting apparatus according to claim 1, further comprising:
a transmitting unit configured to transmit the information acquired by said acquiring unit to an information processing apparatus,
wherein
based on a user's instruction, said control unit determines whether the information acquired by said acquiring unit needs to be transmitted, and
when said control unit determines that the information acquired by said acquiring unit needs to be transmitted, said control unit controls said acquiring unit to be driven within a preset time, and when said control unit determines that the information acquired by said acquiring unit does not need to be transmitted, said control unit stops driving of said acquiring unit.

5. An object detecting method performed by an object detector including a plurality of photosensors and an acquiring unit, the method comprising:
detecting light emitted from an object by at least one of the plurality of photosensors;
determining whether the plurality of photosensors configured to detect a direction in which an object moves and configured to output a detection signal representing the direction of the object move, have detected the light in the detecting;
emitting a wave from a microwave sensor;
determining whether the microwave sensor configured to perform object detection and to output a discrimination signal representing approach or departure of the object, has detected a response to the wave emitted in the emitting;
calculating a speed of the object by transmitting waves toward the object and measuring Doppler shift of waves reflected from the object by the microwave sensor;
generating state data representing the state of the object based on the detection signal, the discrimination signal, and the speed calculated in the calculating;
activating an acquiring unit based the generated state data;
acquiring information concerning the object based on the state data generated in the generating state data;
calculating a normalized ratio of number of approach responses to a total number of responses from the microwave sensor and a normalized ratio of number of departure responses to the total number of responses from the microwave sensor; and
controlling the activation of the acquiring unit based on the normalized ratio of number of approach responses and the normalized ratio of number of departure responses.

6. A computer-readable recording medium having stored thereon a computer-readable program, wherein the program, when executed on a processor causes the processor to perform a method comprising:
determining whether a plurality of photosensors configured to detect a direction in which an object moves and configured to output a detection signal representing the direction of the object move, have responded;
determining whether a microwave sensor configured to perform object detection and to output a discrimination signal representing approach or departure of the object, has responded;
calculating a speed of the object by transmitting waves toward the object and measuring Doppler shift of the waves reflected from the object by the microwave sensor;
generating state data representing the state of the object based on the detection signal, the discrimination signal, and the speed calculated in the calculating;
activating an acquiring unit based the generated state data;
acquiring information concerning the object based on the state data generated in the generating state data;

calculating a normalized ratio of number of approach responses to a total number of responses from the microwave sensor and a normalized ratio of number of departure responses to the total number of responses from the microwave sensor; and controlling the activation of the acquiring unit based on the normalized ratio of number of approach responses and the normalized ratio of number of departure responses.

7. The object detecting apparatus according to claim 1, further comprising:

a power supply unit configured to receive power from a battery, and to supply power from the battery to a selected unit included in the object detecting apparatus, wherein the control unit is further configured to select the selected unit and to command the power supply unit to supply power to the selected unit.

8. The object detecting apparatus according to claim 1, wherein the state description unit does not activate the acquiring unit when the normalized ratio of the number of approach responses and the normalized ratio of number of departure responses are both less than 0.2.

* * * * *